(12) United States Patent
Mikami et al.

(10) Patent No.: US 7,386,364 B2
(45) Date of Patent: Jun. 10, 2008

(54) OPERATION CONTROL DEVICE FOR LEG-TYPE MOBILE ROBOT AND OPERATION CONTROL METHOD, AND ROBOT DEVICE

(75) Inventors: Tatsuo Mikami, Kanagawa (JP); Jinichi Yamaguchi, Tokyo (JP); Atsushi Miyamoto, Kanagawa (JP)

(73) Assignees: Sony Corporation, Tokyo (JP); Yamaguchi, Jinichi, Tokyo (JP)

( * ) Notice: Subject to any disclaimer, the term of this patent is extended or adjusted under 35 U.S.C. 154(b) by 789 days.

(21) Appl. No.: 10/477,452

(22) PCT Filed: Mar. 17, 2003

(86) PCT No.: PCT/JP03/03131

§ 371 (c)(1),
(2), (4) Date: Aug. 23, 2004

(87) PCT Pub. No.: WO03/078109

PCT Pub. Date: Sep. 25, 2003

(65) Prior Publication Data

US 2005/0055131 A1 Mar. 10, 2005

(30) Foreign Application Priority Data

Mar. 15, 2002 (JP) .............................. 2002-073390
Mar. 18, 2002 (JP) .............................. 2002-073499

(51) Int. Cl.
*G06F 19/00* (2006.01)
(52) U.S. Cl. ...................... 700/245; 700/247; 700/249; 700/250; 700/258; 700/264; 318/568.12; 318/568.22; 318/580; 318/653; 318/443; 701/23; 701/25; 901/1; 901/9; 901/46; 901/47

(58) Field of Classification Search .................. 700/66, 700/245, 246, 247, 248, 249, 250, 253, 257, 700/260, 262, 264, 275, 261, 300; 318/9, 318/443, 568.12, 568.22, 580, 653, 800; 701/23, 25; 901/1, 9, 46, 47
See application file for complete search history.

(56) References Cited

U.S. PATENT DOCUMENTS 5,432,417 A 7/1995 Takenaka et al.

(Continued)

FOREIGN PATENT DOCUMENTS

EP 0 856 457 8/1998

(Continued)

*Primary Examiner*—Khoi H. Tran
*Assistant Examiner*—McDieunel Marc
(74) *Attorney, Agent, or Firm*—Frommer Lawrence & Haug LLP; William S. Frommer

(57) ABSTRACT

A legged mobile robot gives up a normal walking motion and starts a tumbling motion when an excessively high external force or external moment is applied thereto and a behavior plan of a foot part thereof is disabled. At this time, the variation amount ΔS/Δt of the area S of a support polygon of the body per time t is minimized and the support polygon when the body drops onto a floor is maximized to distribute an impact which acts upon the body from the floor when the body drops onto the floor to the whole body to suppress the damage to the body to the minimum. Further, the legged mobile robot autonomously restores a standing up posture from an on-floor posture thereof such as a supine posture or a prone posture.

56 Claims, 97 Drawing Sheets

U.S. PATENT DOCUMENTS

| | | |
|---|---|---|
| 5,929,585 A | 7/1999 | Fujita |
| 6,064,167 A | 5/2000 | Takenaka et al. |
| 6,243,623 B1 * | 6/2001 | Takenaka et al. ............ 700/245 |
| 6,289,265 B1 * | 9/2001 | Takenaka et al. ............ 700/245 |
| 6,330,494 B1 * | 12/2001 | Yamamoto .................. 700/261 |
| 6,463,356 B1 | 10/2002 | Hattori et al. |
| 6,480,761 B2 * | 11/2002 | Ueno et al. .................. 700/245 |
| 6,493,606 B2 * | 12/2002 | Saijo et al. .................. 700/245 |
| 6,505,098 B1 * | 1/2003 | Sakamoto et al. ........... 700/245 |
| 6,567,724 B2 * | 5/2003 | Yamamoto .................. 700/261 |
| 6,697,709 B2 * | 2/2004 | Kuroki et al. ............... 700/245 |
| 6,711,469 B2 * | 3/2004 | Sakamoto et al. ........... 700/245 |
| 2002/0116091 A1 | 8/2002 | Yamamoto |

FOREIGN PATENT DOCUMENTS

| | | |
|---|---|---|
| EP | 1 081 026 | 3/2001 |
| EP | 1 103 450 | 5/2001 |
| EP | 1 103 451 | 5/2001 |
| JP | 10-202562 | 8/1998 |
| JP | 11-48170 | 2/1999 |
| JP | 2000-61872 | 2/2000 |
| JP | 2001-62760 | 3/2001 |
| JP | 2001-150370 | 6/2001 |
| JP | 2001-157972 | 6/2001 |
| JP | 2001-212785 | 8/2001 |
| JP | 2001-225289 | 8/2001 |

* cited by examiner

F I G. 1
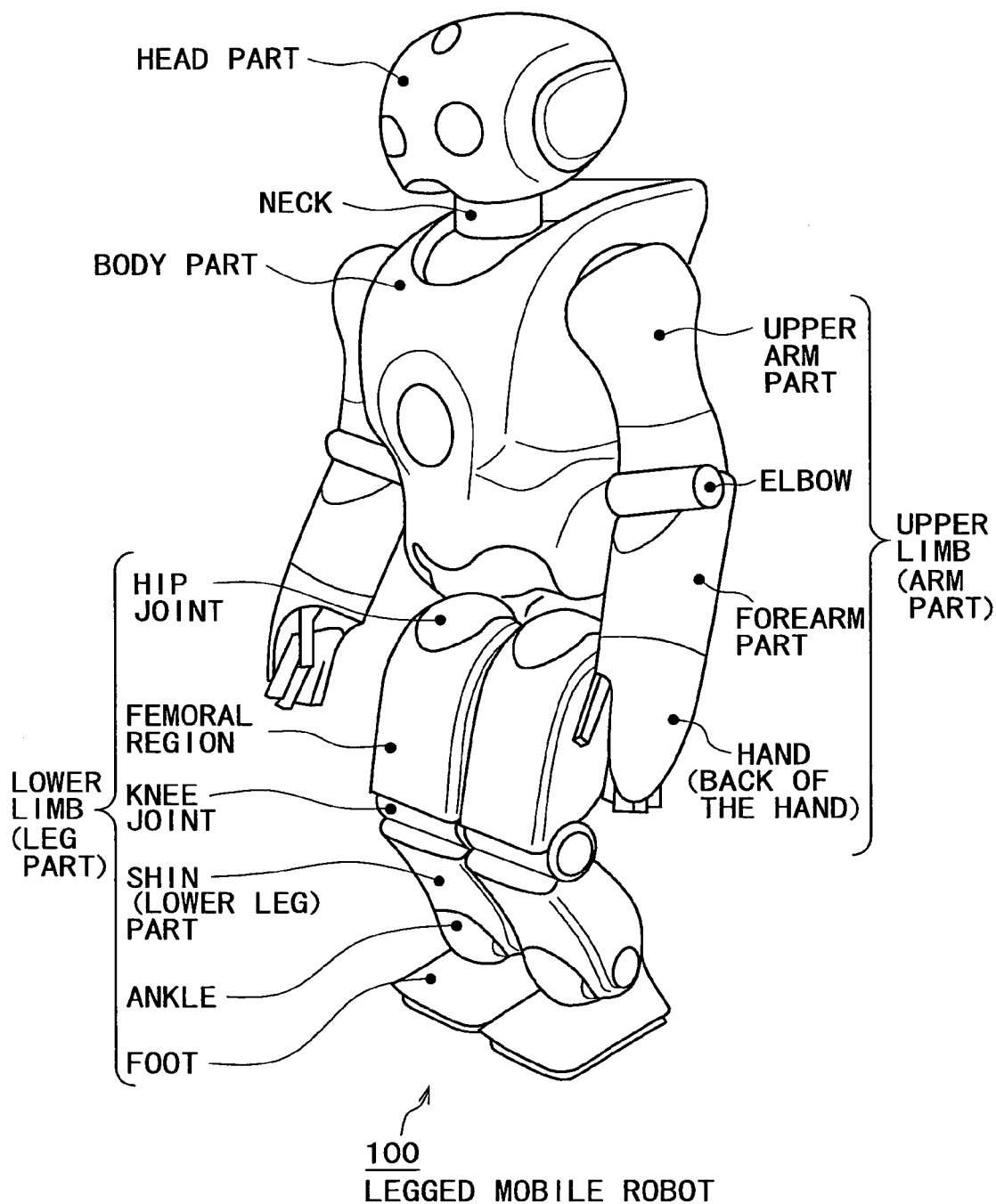

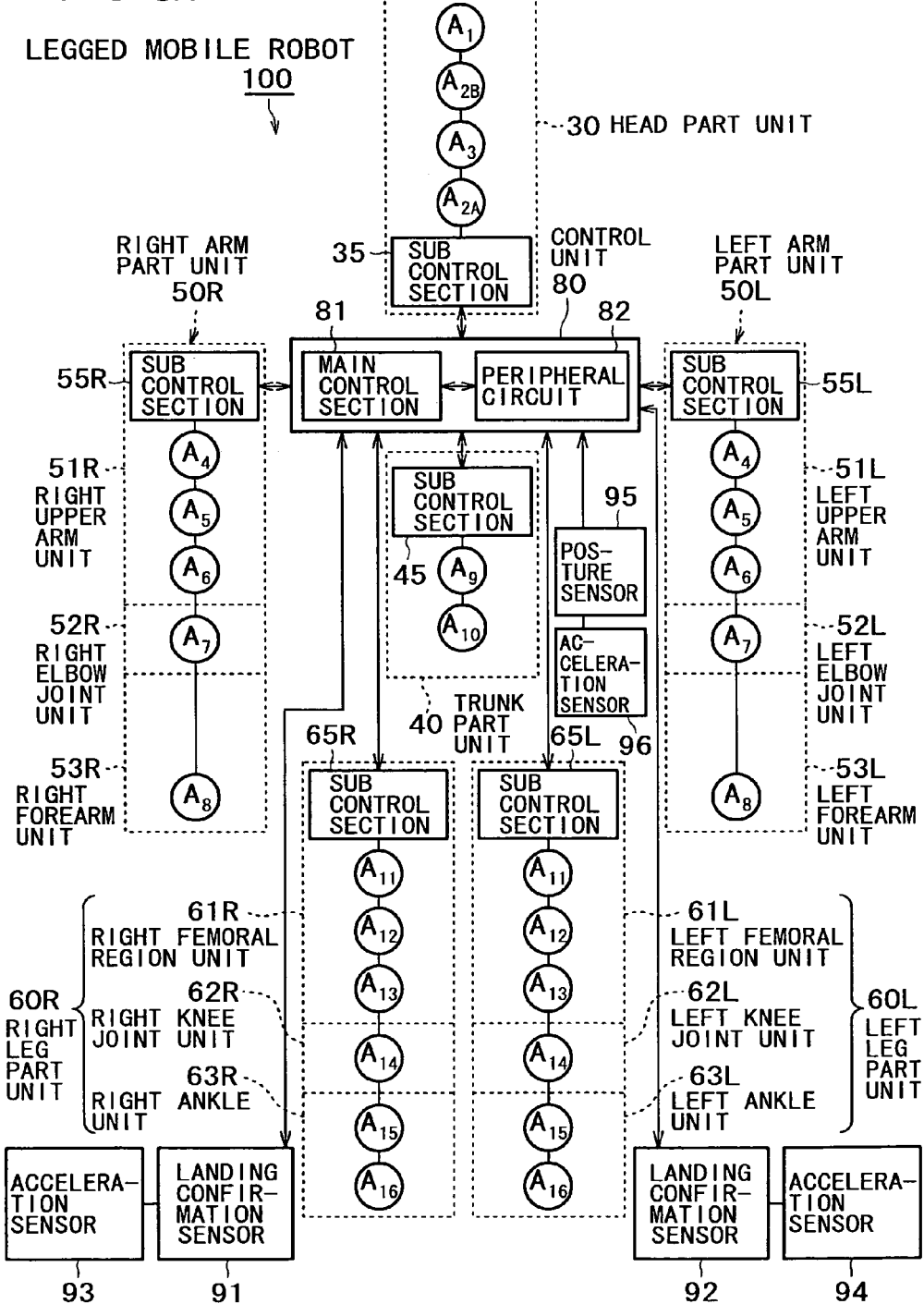

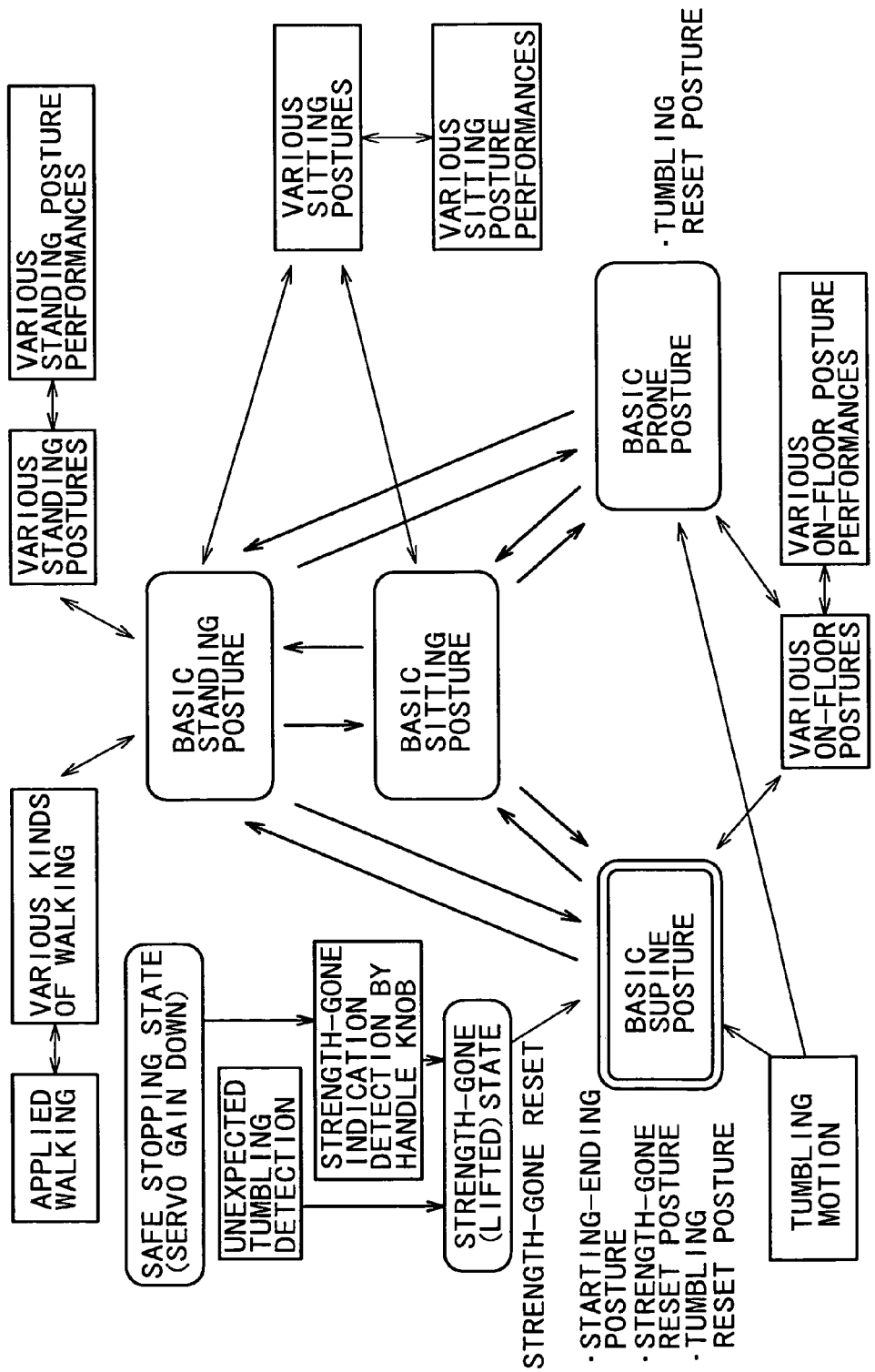

F I G. 1 1
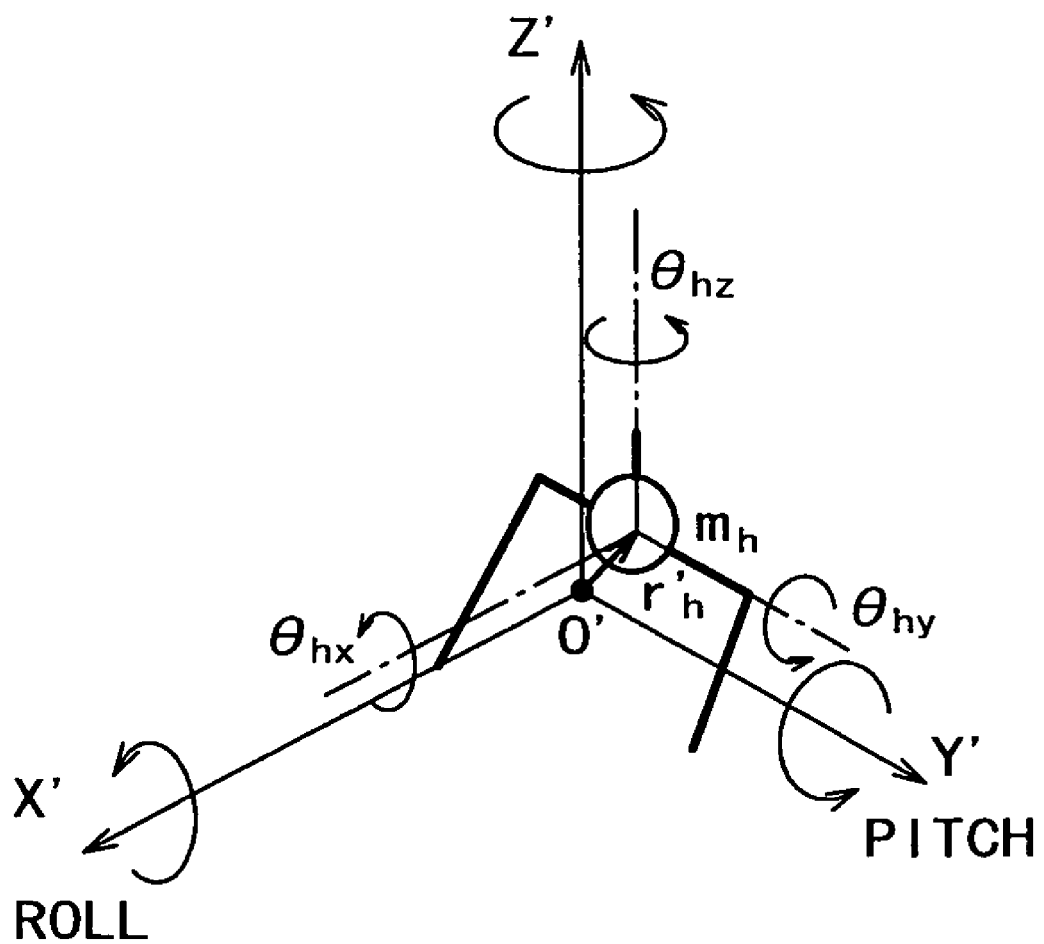

F I G. 1 4
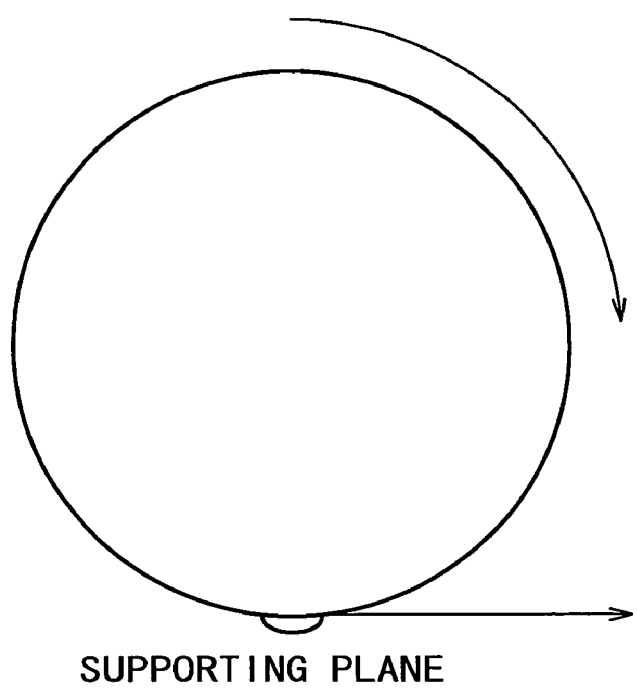
SUPPORTING PLANE
F I G. 1 5
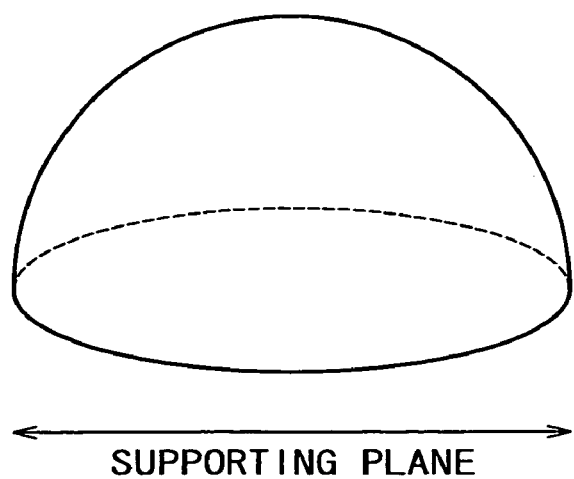
SUPPORTING PLANE

F I G. 4 1
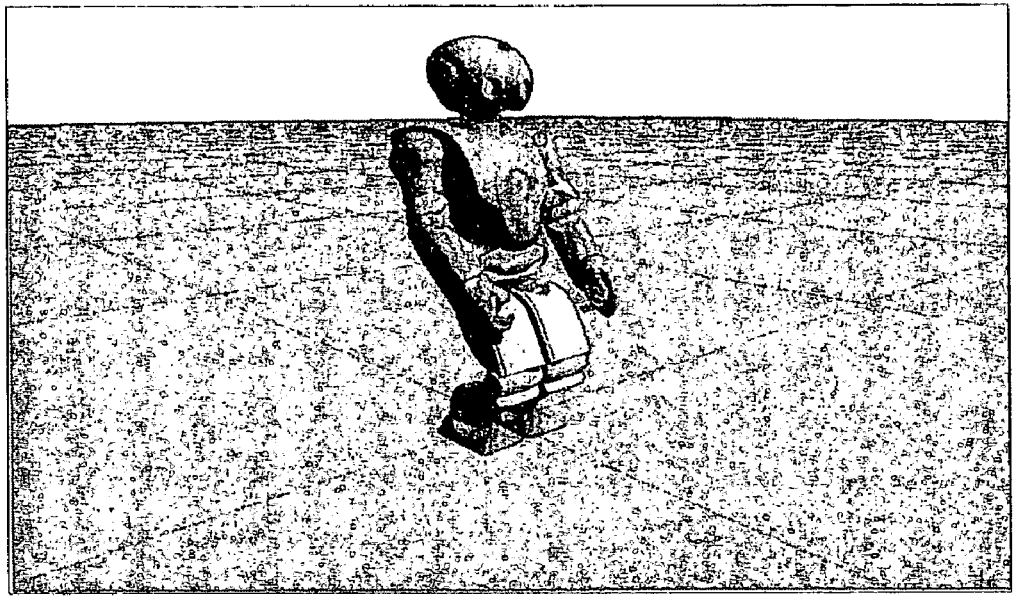
F I G. 4 2
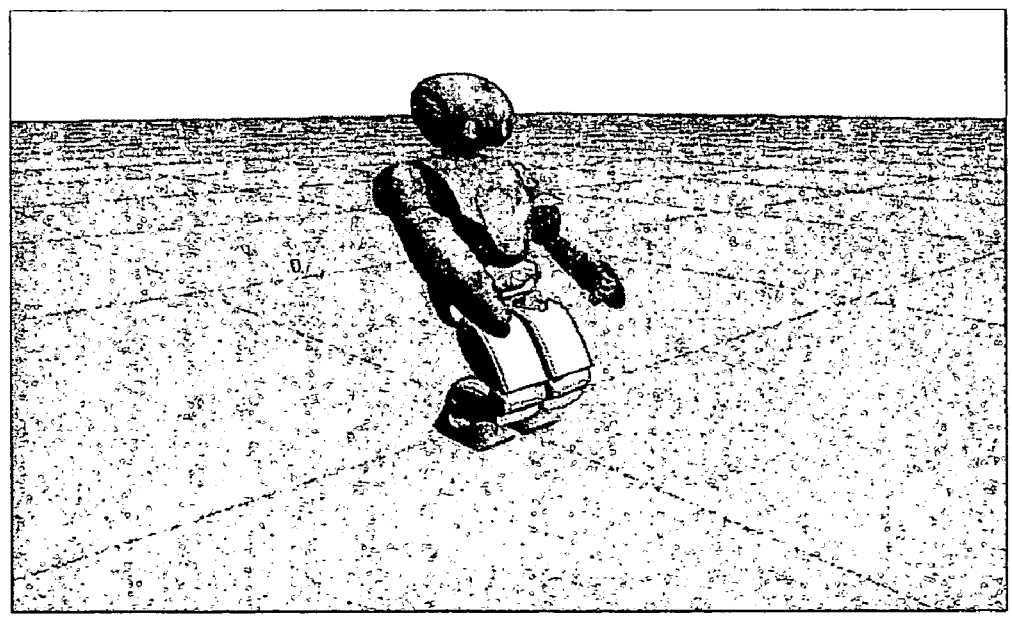

F I G. 4 3
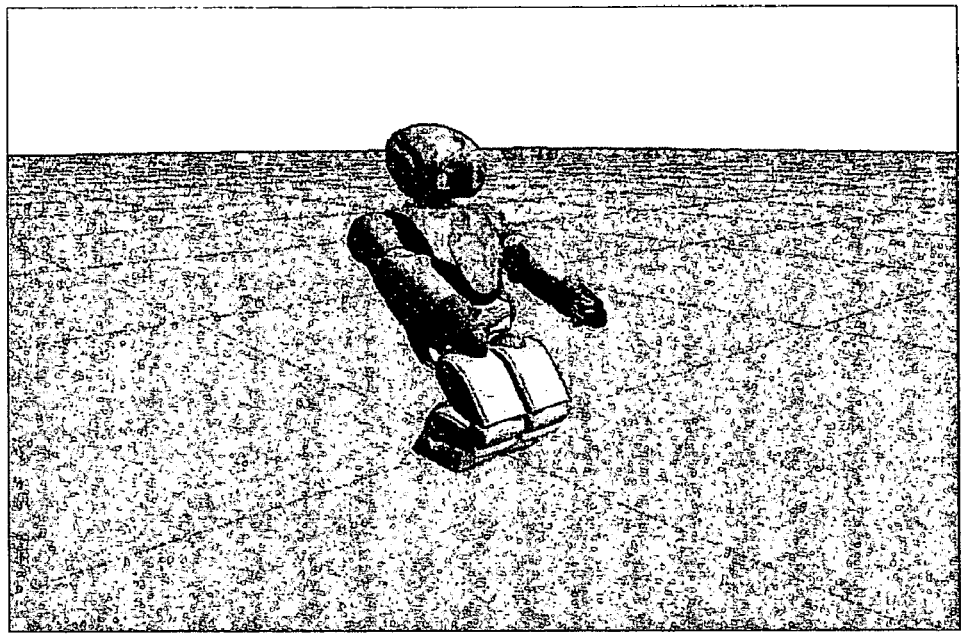
F I G. 4 4
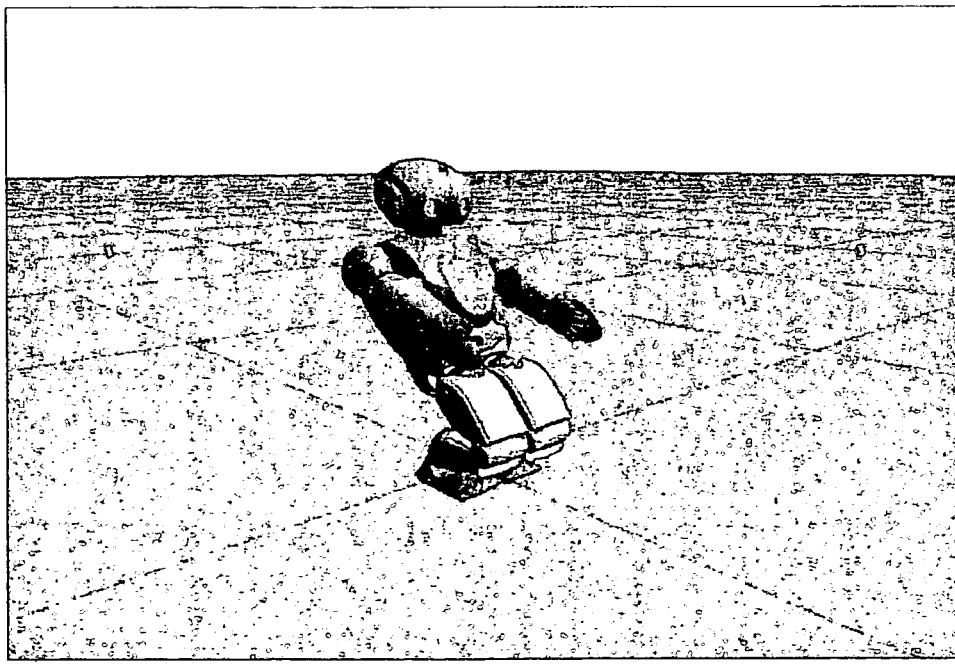

F I G. 6 9
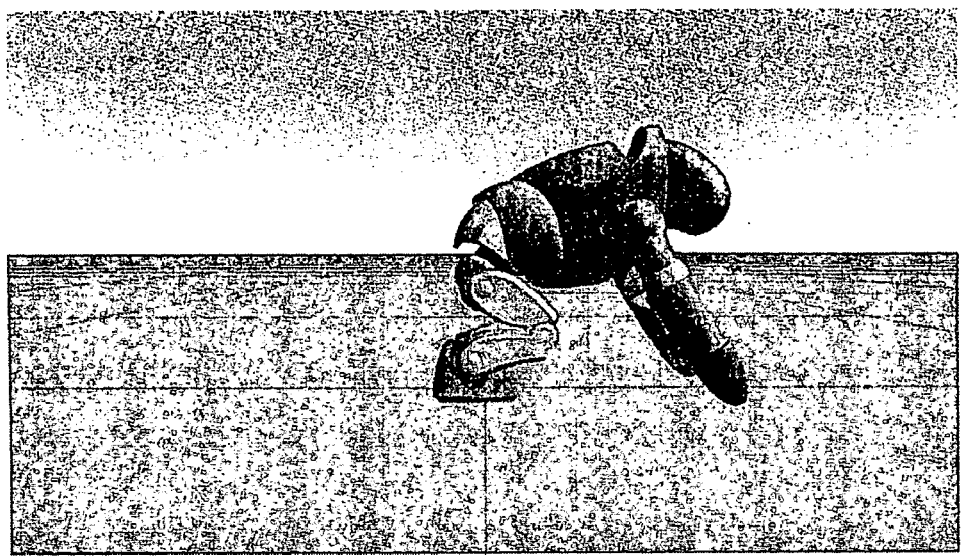
F I G. 7 0
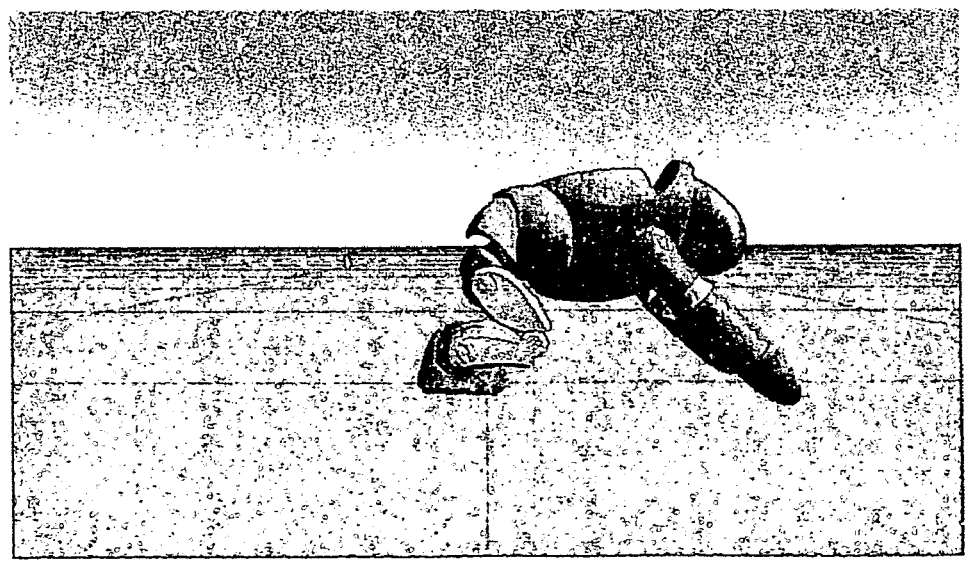

F I G. 7 1
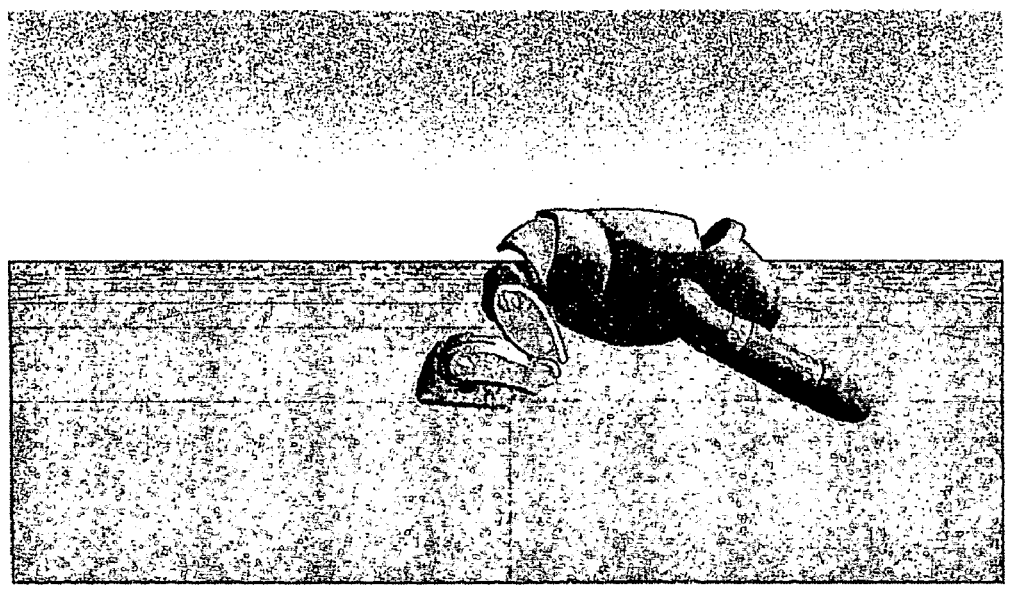
F I G. 7 2
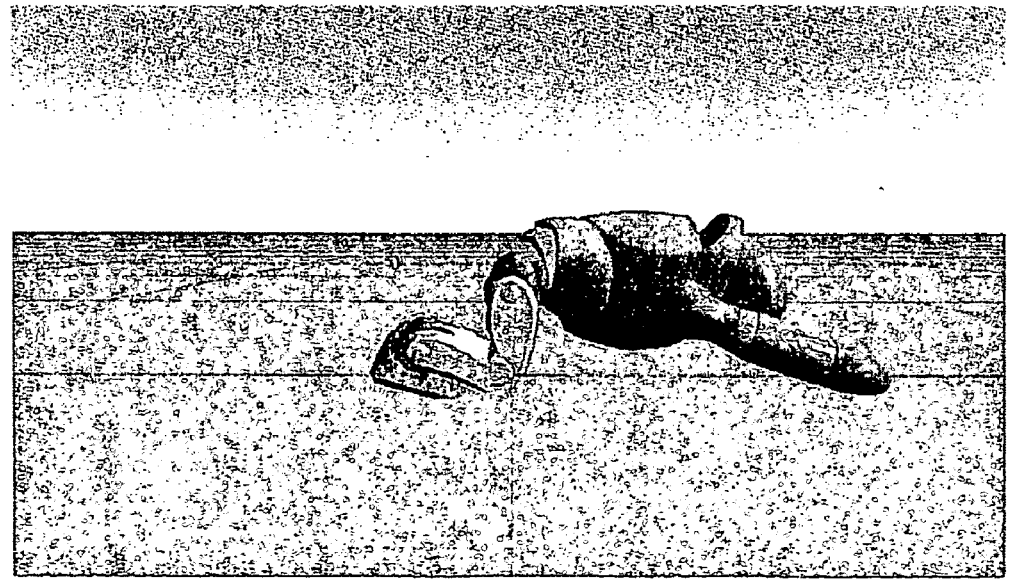

FIG. 93
(1)
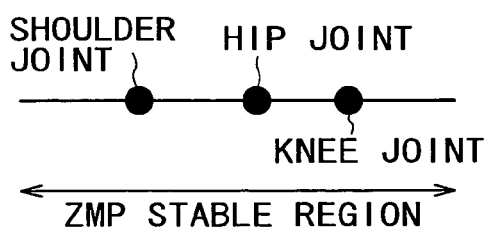
(2)
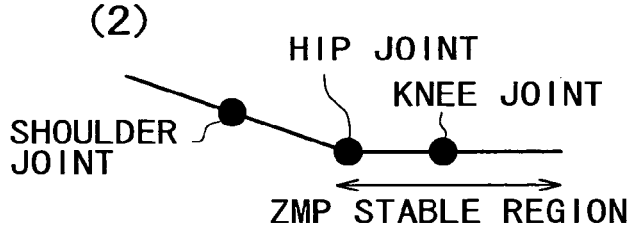
(3)
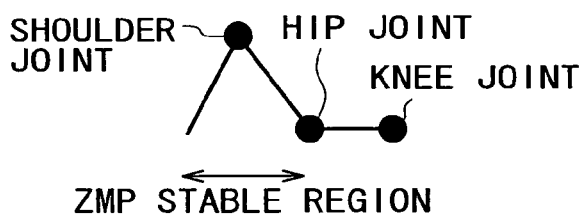
(4)
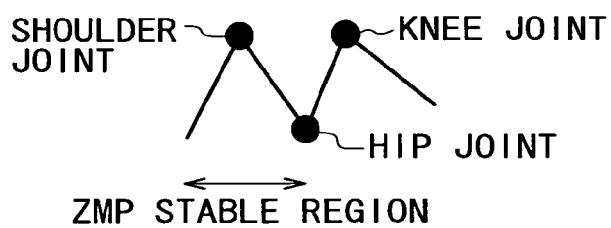
(5)
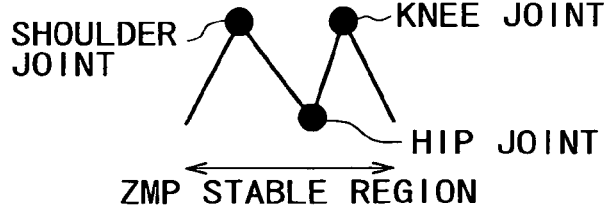
(6)
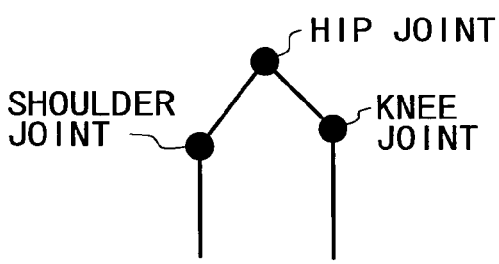
(7)
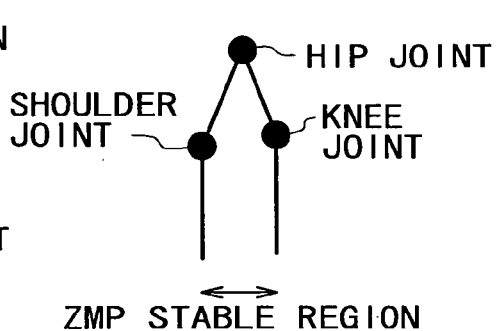
(8)
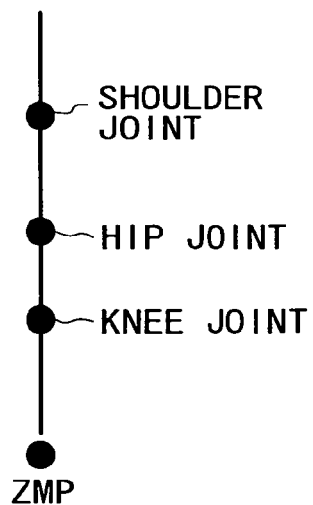

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

FIG. 130
(a) 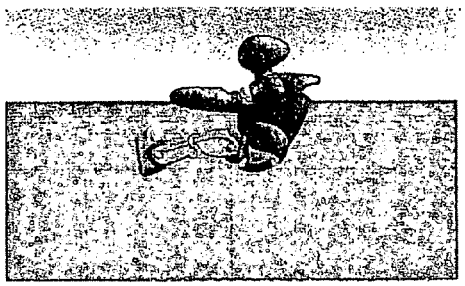
(e) 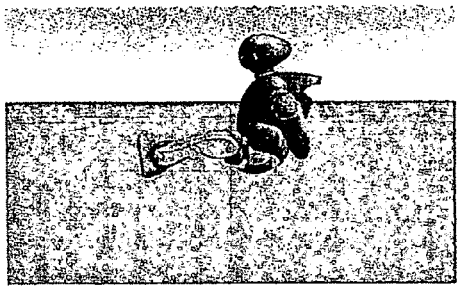
(b) 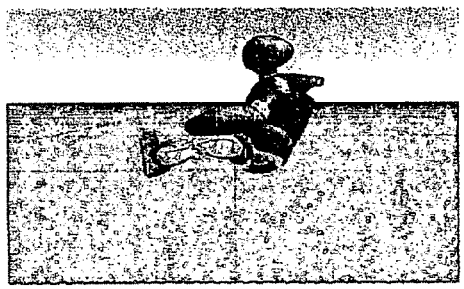
(f) 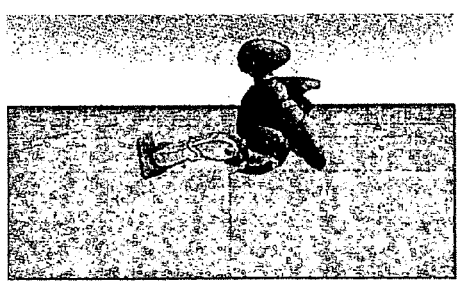
(c) 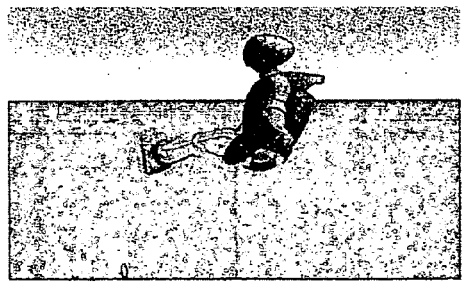
(g) 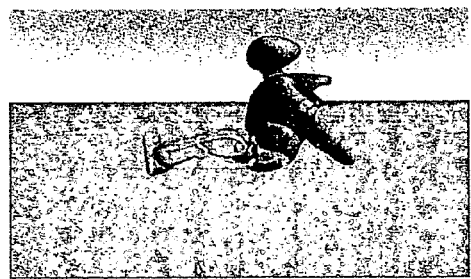
(d) 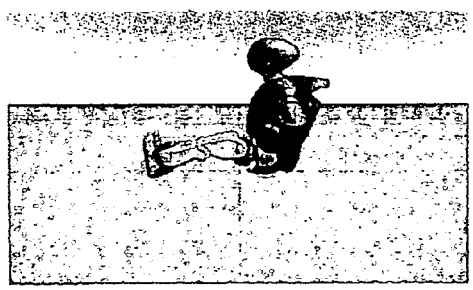
(h) 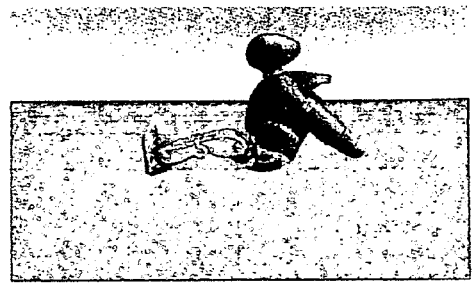

F I G. 1 3 1
(a)
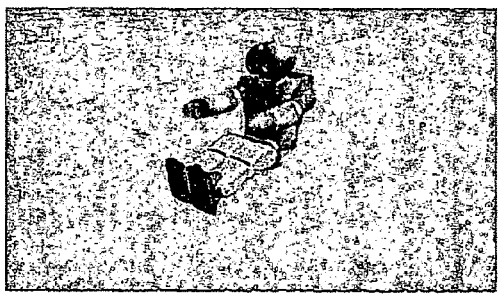
(b)
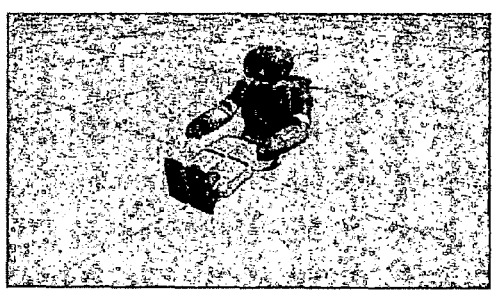
(c)
(d)
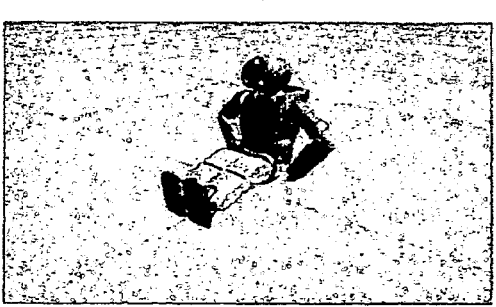
(e)
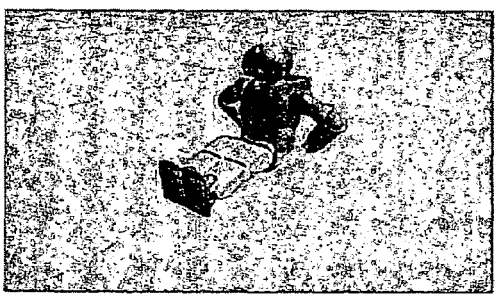
(f)
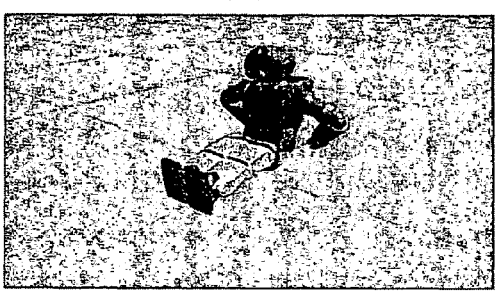
(g)
(h)
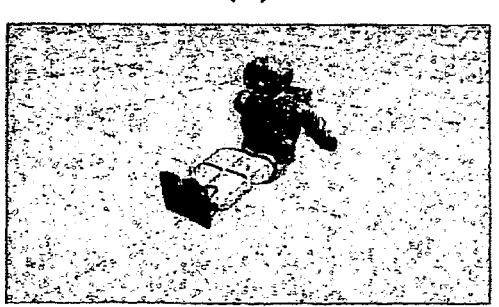

FIG. 132
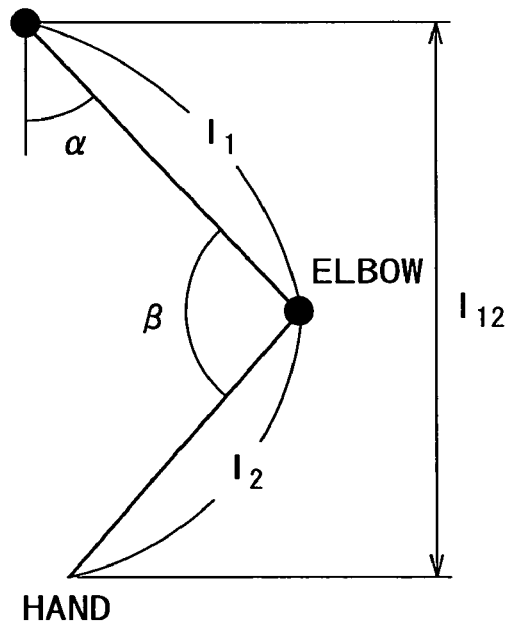
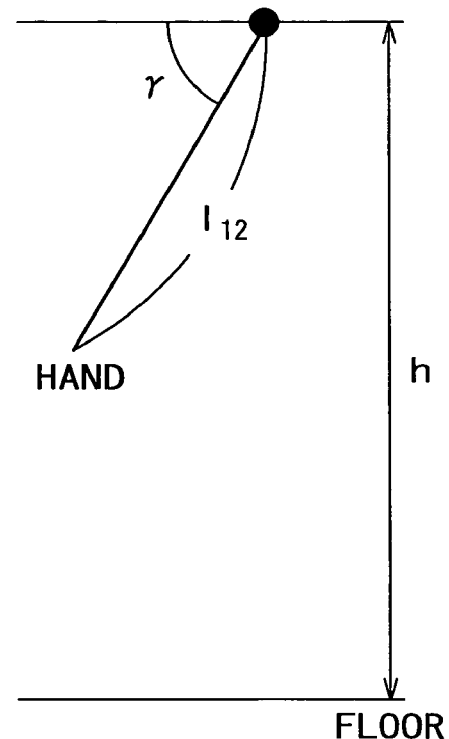

FIG. 133
(1)
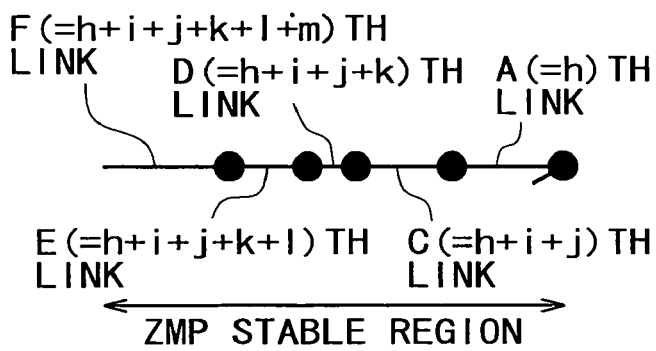
(6)
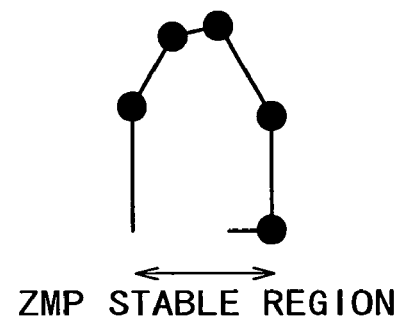
(2)
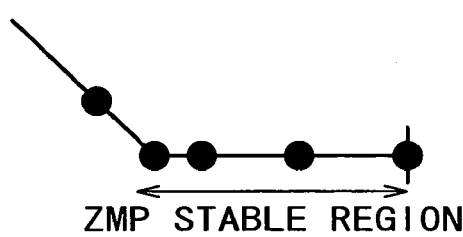
(7)
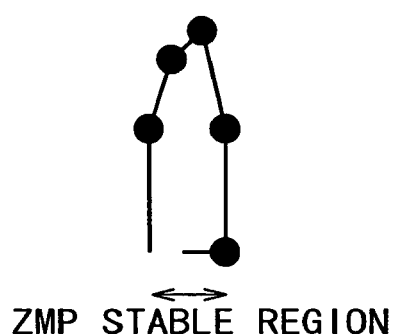
(3)
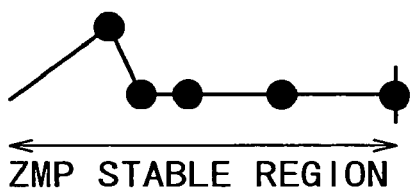
(4)
(5)
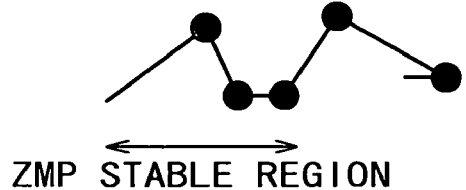
(8)
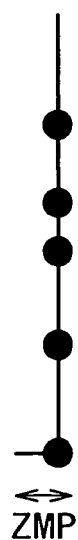
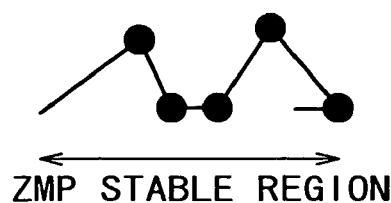

F I G. 1 5 3
F I G. 1 5 4
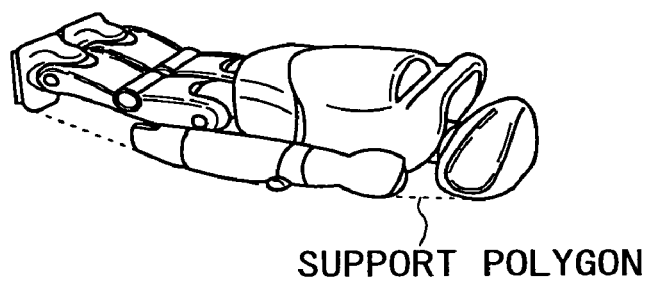
SUPPORT POLYGON
F I G. 1 5 5
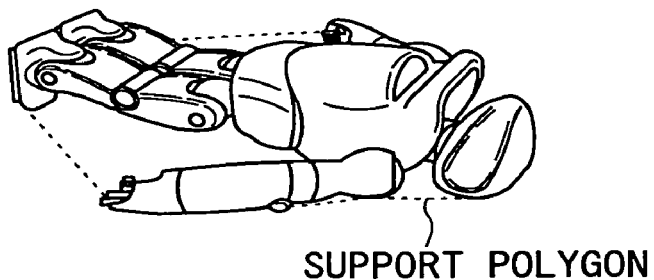
SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

SUPPORT POLYGON

FIG. 192
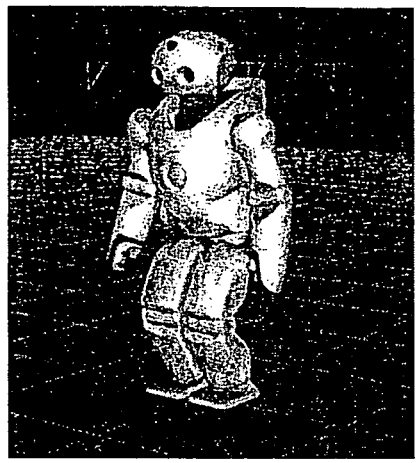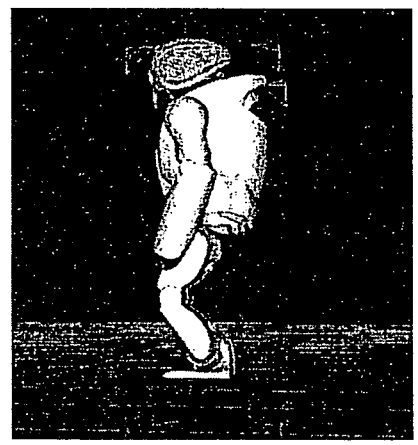
FIG. 193
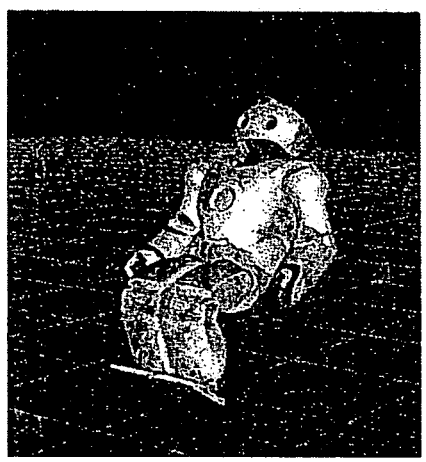
FIG. 194

FIG. 195
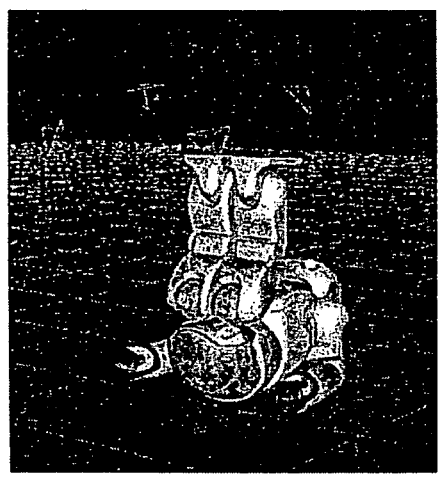
FIG. 196
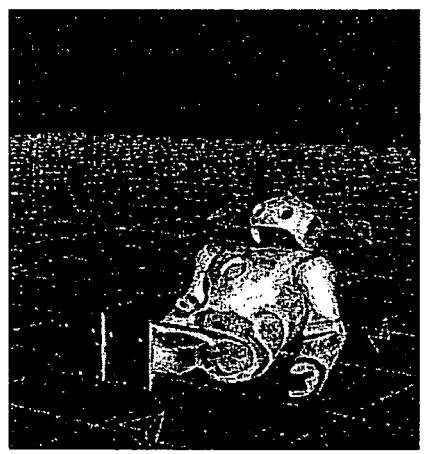
FIG. 197
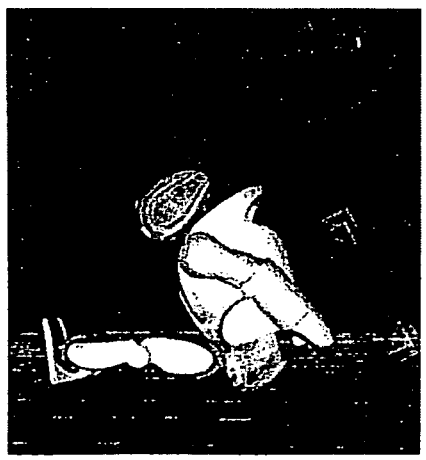

F I G. 1 9 8
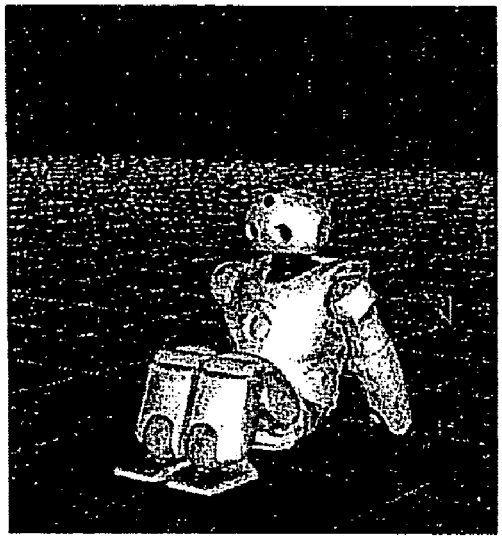

OPERATION CONTROL DEVICE FOR LEG-TYPE MOBILE ROBOT AND OPERATION CONTROL METHOD, AND ROBOT DEVICE

TECHNICAL FIELD

The present invention relates to a motion controlling apparatus and a motion controlling method for a legged mobile robot having a great number of joint degrees of freedom, and a robot apparatus, and more particularly to a motion controlling apparatus and a motion controlling method for a legged mobile robot which includes a plurality of movable legs and has a basic standing posture, and a robot apparatus.

More specifically, the present invention relates to a motion controlling apparatus and a motion controlling method for a legged mobile robot wherein a ZMP (Zero Moment Point) is used as a posture stability determination criterion to stabilize and control the position of the body during movement, and more particularly to a motion controlling apparatus and a motion controlling method for a legged mobile robot wherein the damage which may otherwise be given to the robot is reduced as far as possible by motion control of the entire body during tumbling (fall down) or dropping and a standing posture is restored from an on-floor posture such as a supine posture or a prone posture by a stable motion with comparatively low torque, and a robot apparatus.

BACKGROUND ART

A mechanical apparatus which performs movements similar to motions of a human being using mechanical or magnetic actions is called "robot". It is said that the word "robot" originates from a word 'ROBOTA' (slave machine) of a Slavic language. Here in Japan, robots began to be popularized at the end of the nineteen sixties. Most of them, however, were industrial robots such as manipulators or transport robots intended for automation and unmanning of manufacturing works in a factory.

Recently, research and development regarding legged mobile robots such as pet type robots which copy body mechanisms and motions of animals that perform four-leg walking like a dog or a cat, or robots (humanoid robot) called "human-type" or "humanoid" robots which are designed by modeling body mechanisms and motions of animals which perform bipedal upright walking such as a human being have proceeded, and also expectation that they be placed into practical use is increasing.

The significance in research and development of legged mobile robots of bipedal locomotion type called human-like or humanoid robots can be grasped, for example, from the following two points of view.

One of them is a human scientific point of view. In particular, a mechanism of a natural motion of a human being beginning with walking can be clarified in an engineering sense through a process that a robot having a structure similar to the lower limbs and/or the upper limbs of a human being is produced and a controlling method for the robot is devised to simulate a walking motion of a human being. It is expected that results of such research can be fed back significantly to the progress in various other research fields which handle a movement mechanism of a human being such as the human engineering, rehabilitation engineering or sports engineering.

Another point is development of a robot for practical use which supports the life of a human being as a partner of the human being, that is, which supports human activities in dwelling environments and other various scenes in everyday life. It is necessary for a robot of the type just described to learn a method of adaptation to human beings having individually different identities and to environments while being taught by human beings in various phases of life environments of human beings. It is considered that, in this instance, if the robot is a "human type" robot, that is, if the robot has a same configuration or a same structure as that of the human being, then the robot functions effectively in smooth communication between a human being and the robot.

For example, in such a case that it is tried to actually teach to a robot a method of passing through a room while bypassing an obstacle which must be kept off, where the robot which is an object of teaching is a bipedal locomotion robot having a similar configuration to that of a user (operator), it is much easier for the user to teach the robot and also it is easier for the robot to learn than where the robot has a structure quite different from the user such as a crawler type robot or a four-legged robot (refer to, for example, TAKANISHI, "Control of a Bipedal locomotion Robot", the Kanto Branch of the Society of Automotive Engineers of Japan <Koso>, No. 25, 1996 APRIL).

A great number of proposals have been made for a technique for posture control or stable walking relating to a robot of the type which performs legged movement by bipedal locomotion. The stable "walking" here can be defined as "traveling without tumbling through use of the legs".

Posture stabilization control of a robot is very important in order to prevent tumbling of a robot. This is because tumbling of a robot signifies interruption of a work being performed and considerable labor and time are required until the robot stands up uprightly from the tumbling state and resumes the work. Above all, there is the possibility that the tumbling may critically damage the robot body itself or also damage a substance with which the tumbling robot collides. Accordingly, in research and development of legged mobile robots, posture stabilization control upon walking or upon any other legged operation is considered one of the most significant technical subjects.

Upon walking of a robot, the gravity and the force of inertia and moments of them originating from the gravity and an acceleration generated by the walking movement act from the walking system of the robot upon the road surface. According to the "d'Alembert's principle", they are balanced with a floor reactive force and a floor reactive force moment as a reaction from the road surface to the walking system. As a consequence of mechanical inference, a point at which the pitch axis moment and the roll axis moment are zero, that is, a "ZMP (Zero Moment Point)", is present on or on the inner side of a side of a support polygon formed by landed points (contact points) of the soles and the road surface.

Most of proposals regarding posture stabilization control of legged mobile robots and prevention of tumbling upon walking uses the ZMP as a criterion for determination of the stability of walking. Production of a bipedal locomotion pattern based on the ZMP criterion is advantageous in that a sole landing point can be set in advance and it is easy to take a kinetic restriction condition of the sole according to a shape of the road surface into consideration. Further, to adopt the ZMP as a stability determination criterion does not signify to handle not a force but a trajectory as a target value on motion control, and therefore, it technically raises the feasibility. It is to be noted that a concept of the ZMP and application of the ZMP to a stability determination criterion for a walking robot are disclosed in Miomir Vukobratovi'c, "LEGGED LOCOMOTION ROBOTS" (Ichiro KATO et al., "Walking Robot and Artificial Feet", the Nikkan Kogyo Shimbun, Ltd.).

Normally, a bipedal locomotion robot such as a humanoid robot is higher in the position of the center of gravity and narrower in the ZMP stable region upon walking than a four-legged walking robot. Accordingly, the problem of a posture variation caused by a variation of the road surface condition is significant particularly with a bipedal locomotion robot.

Several proposals are already available which use the ZMP as a posture stability determination criterion for a bipedal locomotion robot.

For example, a legged mobile robot disclosed in Japanese Patent Laid-Open No. Hei 5-305579 performs stable walking by making a point on a floor at which a ZMP is zero coincide with a target value.

Meanwhile, another legged mobile robot disclosed in Japanese Patent Laid-Open No. Hei 5-305581 is configured such that a ZMP is positioned in the inside of a supporting polyhedron (polygon) or, upon landing or upon taking off, the ZMP is positioned at a position having at least a predetermined margin from an end portion of the support polygon. In this instance, even if the legged mobile robot is subject to some disturbance, it has a margin for the ZMP by the predetermined distance, and the stability of the body upon walking is improved.

Further, Japanese Patent Laid-Open No. Hei 5-305583 discloses that the walking speed of a legged mobile robot is controlled depending upon a ZMP target position. In particular, walking pattern data set in advance is used, and a leg part joint is driven so that a ZMP may coincide with a target position whereas a slope of the upper part of the body is detected and the discharging rate of the set walking pattern data is changed in response to the detection value. If the robot steps on an unknown concave or convex place and tilts forwardly, then the posture thereof can be restored by raising the discharging rate. Further, since the ZMP is controlled to the target position, there is no trouble even if the discharging rate is changed within a double support phase.

Japanese Patent Laid-Open No. Hei 5-305585 discloses that the landing position of a legged mobile robot is controlled in accordance with a ZMP target position. In particular, the legged mobile robot disclosed in the patent document mentioned detects a displacement between a ZMP target position and an actually measured position and drives one or both of the leg parts so that the displacement may be canceled. Or, the legged mobile robot detects a moment around a ZMP target position and drives the leg parts so that the moment may be reduced zero. The legged mobile robot thereby achieves stabilized walking.

Japanese Patent Laid-Open No. Hei 5-305586 discloses that a tilting posture of a legged mobile robot is controlled in accordance with a ZMP target position. In particular, a moment around a ZMP target position is detected, and if a moment appears, then the leg parts are driven so that the moment may be reduced to zero thereby to achieve stabilized walking.

Posture stabilization control of a robot which adopts a ZMP as a stability determination criterion basically resides in search for a point at which a moment is zero on or on the inner side of a side of a support polygon formed from landed points of the soles and the road surface.

As described hereinabove, for a legged mobile robot, possible much effort has been made to prevent the robot from tumbling during walking or during execution of some other motion pattern by taking such a countermeasure as to introduce a ZMP as a posture stabilization criterion.

Naturally, the state of tumbling of a robot signifies interruption of a work being performed by the robot and considerable labor and time are required until the robot stands up uprightly from the tumbling state and resumes the work. Further, there is the possibility that, above all, the tumbling may critically damage the robot body itself or also damage a substance with which the tumbling robot collides.

Although the possible best posture stabilization control is performed in order to prevent tumbling of a robot, the robot may still lose its stability in posture because of some defect in control, some unpredictable external factor (such as, for example, accidental collision with another substance, a road surface situation such as a projection or a depression on the floor, appearance of an obstacle or the like) to such a degree that it cannot be supported only with the movable legs thereof, resulting in tumbling.

Particularly in the case of a robot which performs bipedal legged traveling such as a human-type robot, since the position of the center of gravity is high and an uprightly standing stationary state itself of the robot is originally instable, the robot is likely to tumble. If the robot tumbles, then there is the possibility that critical damage may be applied to the robot itself or to the other party side with which the robot collides by the tumbling.

For example, Japanese Patent Laid-Open No. Hei 11-48170 discloses a control apparatus for a legged mobile robot by which, when the legged mobile robot is in a situation wherein it seems to tumble, the damage which may be given to the robot by the tumbling or the damage to the other party side with which the robot may collide upon the tumbling can be reduced as far as possible.

However, the patent document merely proposes control by which the center of gravity of the robot when landing upon tumbling is merely lowered, but does not make such an argument that, in order to minimize the possible damage when the robot actually tumbles, in what manner the entire body including not only the leg parts but also the body and the arm parts should operate.

In the case of a legged mobile robot of the uprightly standing walking type, a posture which makes a reference when a movement of a body such as walking is taken into consideration is a standing posture in which the robot stands uprightly with the two feet. For example, a state in which the robot is most stable among various standing postures (that is, a point at which the instability is in the minimum) can be positioned as a basic standing posture.

Such a basic standing posture as just described requires generation of torque by joint axis motors for the leg parts and so forth by execution of posture stabilization control and control instruction. In other words, in a no-power supply condition, no standing posture is stable. Therefore, it is considered preferable that the robot starts activation thereof from an on-floor posture in which the robot is physically most stable such as a supine posture or a prone posture.

However, even if power supply to the robot in such an on-floor posture as just described is made available, if the robot cannot stand up autonomously, then an operator must give a hand to lift the body, which is cumbersome to the operator.

Further, when the robot once assumes a standing posture and performs walking or some other autonomous legged operation, it basically makes an effect to travel using the legs without tumbling. However, the robot may sometimes tumble unfortunately. "Tumbling" is inevitable when a robot operates under dwelling environments of human beings which involve various obstacles and unforeseeable situations. In the first place, a human being also tumbles. Also in this instance, it still is cumbersome if an operator must give a hand to lift the body.

If the robot cannot stand up by itself every time it assumes an on-floor posture, then it cannot be operated in unmanned environments after all, and the operation lacks in self-conclusion. Thus, the robot cannot be placed into fully self-contained environments.

DISCLOSURE OF INVENTION

It is an object of the present invention to provide a superior legged mobile robot and a superior tumbling motion (fall down motion) controlling method for a legged mobile robot by which damage which may otherwise be given to the robot can be reduced as far as possible by motion control of an entire body including not only the leg parts but also the body and the arm parts during tumbling and dropping.

It is another object of the present invention to provide a superior motion controlling apparatus and motion controlling method for a legged mobile robot and a superior robot apparatus by which the robot can autonomously restore its standing posture from an on-floor posture such as a supine posture or a prone posture.

It is a further object of the present invention to provide a superior motion controlling apparatus and motion controlling method for a legged mobile robot and a superior robot apparatus by which the robot can restore its standing posture from an on-floor posture such as a supine posture or a prone posture through a stabilized motion with comparatively low torque.

The present invention has been made in view of the subjects described above, and according to a first aspect of the present invention, there is provided a motion controlling apparatus or a motion controlling method for a legged mobile robot which includes movable legs and performs a legged operation in a standing posture thereof, characterized in that the legged mobile robot has a plurality of positions or states, and that the motion controlling apparatus or method includes:

first means for or a first step of calculating an area S of a support polygon formed from landed points (contact points to the floor) of a body of the legged mobile robot and a floor;

second means for or a second step of calculating the variation $\Delta S/\Delta t$ of the area S of the support polygon per time $\Delta t$; and third means for or a third step of determining a motion of the body when the position or state is to be changed based on the area S of the support polygon or the variation rate $\Delta S/\Delta t$ of the area S.

In many legged mobile robots, a ZMP is utilized as a stability determination criterion so that the posture stability of the body within a period of a particular legged operation such as walking may be maintained. With the motion controlling apparatus or the motion controlling method for a legged mobile robot according to the first aspect of the present invention, when the robot changes the posture or the state thereof such as when the robot which is in a walking or uprightly standing state or when the robot stands up from a horizontally lying position after tumbling or the like, the motion pattern of the body is successively determined based on the area S of the support polygon formed by the landed points of the body and the floor or the variation rate $\Delta S/\Delta t$ of the area S. By this, a tumbling motion or a standing up motion can be realized such that they may be performed more efficiently with a reduced load.

Here, the third means or step may include:

landed location searching means (means for searching contacting part) for or a landed location searching step (step of searching contacting part) of searching for a landed location (part) upon tumbling of the legged mobile robot based on the variation per time $\Delta t$ of the area S of the support polygon formed from the landed points of the body and the floor;

target landing point (target contacting point) setting means for or a target landing point setting step of setting a target landing point at which the location selected by the landed location searching means should be landed (contacting to the floor) so that the variation $\Delta S/\Delta t$ per time $\Delta t$ of the area S of the support polygon formed from the landed points of the body and the floor may be minimized; and location landing means for landing the location selected by the landed portion searching means or at the landed portion searching step, at the target landing point set by the target landing point setting means or at the target landing point setting step.

While the legged mobile robot performs a legged operation in the standing posture, it detects an external force applied to the body by means of floor reactive force sensors, acceleration sensors disposed on (mounted on) the soles or acceleration sensors disposed at the position of the waist of the body or the like. Then, the legged mobile robot establishes a ZMP balance equation based on the thus detected external forces to normally plan a ZMP trajectory so that a ZMP at which moments applied to the body balance with each other may be disposed on or on the inner side of a side of the support polygon formed from the landed points of the soles and the floor to perform posture stabilization control.

However, if a moment error on the ZMP balance equation cannot be canceled due to such a situation that the external force applied to the body is excessively high or the situation of the road surface is not favorable, then it sometimes becomes difficult or impossible to dispose the ZMP in the support polygon in accordance with the ZMP trajectory plan. In such an instance, the legged mobile robot according to the present invention gives up the posture stabilization control of the body and executes a predetermined tumbling motion to minimize the damage to the body upon dropping onto the floor.

In particular, upon tumbling, the legged mobile robot searches for a location (part) at which the variation $\Delta S/\Delta t$ per time $\Delta t$ of the area S of the support polygon formed from the landed points of the body and the floor is minimized and sets a target landing point at which the selected location should be landed so that the variation $\Delta S/\Delta t$ per time $\Delta t$ of the area S of the support polygon formed from the landed points of the body and the floor may be minimized, and then lands the location onto the floor. Then, the legged mobile robot further expands the support polygon formed newly by the landing.

Then, the legged mobile robot repetitively executes the motion of searching for a location at which the variation $\Delta S/\Delta t$ is minimized and landing the location at the target landing point at which the variation $\Delta S/\Delta t$ is minimized and the motion of expanding the newly formed support polygon until after the potential energy of the body becomes minimum and the tumbling motion comes to an end.

Where the variation $\Delta S/\Delta t$ per time $\Delta t$ of the area S of the support polygon is minimized and the support polygon upon dropping onto the floor is maximized in this manner, the impact applied from the floor upon dropping can be dispersed to the whole body thereby to suppress the damage to the body to the minimum. Where the legged mobile robot is regarded as a link structure wherein a plurality of substantially parallel joint axes having a joint degree-of-freedom are connected to each other in a lengthwise direction, moderation of the impact force can be achieved by setting a location at which a link with which the number of non-landed links (non-contacting to the floor) is maximized exists as a target.

Further, the legged mobile robot may be formed from, for example, a link structure wherein a plurality of substantially parallel joint axes having a joint degree-of-freedom are connected to each other in a lengthwise direction, and the third means or step may include:

means for or a step of searching, when the legged mobile robot returns from its tumbling state, for the narrowest support polygon formed from the least number of links from among landed polygons (contacting to the floor) formed, in an on-floor posture of the legged mobile robot in which two or more links including a gravity center link positioned at the center of gravity of the body are landed on (contacted to) the floor, from the landed links (contacting to the floor);

means for or a step of taking off the landed links in the landed polygons except those of the searched out support polygon;

means for or a step of bending two or more continuous ones of non-landed links until end portions of the end links onto the floor to form a narrower landed polygon; and means for or a step of taking off a number of links greater than a first predetermined number from one end side of the link structure to stand the body uprightly in response to that the support polygon is sufficiently narrow.

Here, the link structure includes at least shoulder joint pitch axes, a trunk pitch axis, hip joint pitch axes and knee pitch axes connected to each other in the heightwise direction of the body. Naturally, the body of the legged mobile robot may include an additional joint pitch axis or axes other than them. Further, each joint location may include a rotational degree-of-freedom around a roll axis and a yaw axis other than the pitch axis.

A polygon formed from a plurality of end portions of the body which are landed on the floor is called landed polygon. Meanwhile, a landed polygon in which a ZMP is present is called support polygon. A stable region of the ZMP is a region in which the posture and so forth of the robot can be controlled stably in the support polygon.

In a basic on-floor posture of the legged mobile robot such as a supine posture or a prone posture, all links which interconnect the joint pitch axes, trunk pitch axis, hip joint pitch axes and knee pitch axes are landed on the floor. On the other hand, in a basic standing posture or a walking posture, all links which interconnect the joint pitch axes, trunk pitch axis, hip joint pitch axes and knee pitch axes are taken off from the floor and aligned in a substantially vertical direction.

Upon standing up in transition from an on-floor posture to a standing posture of the robot, a higher torque output is required for the relating joint actuators when compared with a case wherein the robot maintains an ordinary standing posture or performs a walking motion. According to the present invention, by performing a standing up motion making use of a posture in which the ZMP support polygon is minimized, a standing up operation is realized with reduced driving torque.

First, in an on-floor posture wherein almost all links of the robot are landed on the floor, the narrowest support polygon is searched for from among landed polygons formed from the landed links. At this time, it is determined whether or not a ZMP can be planned when at least two or more links from one end side of the body are taken off from the floor.

For example, a narrower support polygon is searched for while a link which interconnects the trunk pitch axis and the hip joint pitch axes is selected as a gravity center link and keeping the landed link (contacting to the floor). The plannability of the ZMP can be determined taking movable angles of the link structure, torque values of the joint actuators interconnecting the links, joint forces, angular speeds, angular accelerations and so forth into consideration. Then, it is tried to take off two or more continuous links from one end side including the shoulder joint pitch axes.

Then, while the landed links which form the support polygon are left, two or more continuous links from the one end side of the landed polygon are taken off from the floor. Then, one or more non-landed links from the one end side are bent to land the end portions of the end links to form a narrower landed polygon.

For example, two or more links from the one end side of the link structure including the shoulder joints are taken off as links which do not relate to the support polygon from the floor. Then, in a state wherein two or more links including the shoulder joints are taken off from the floor, the shoulder joint pitch axes are bent so that the hands which are end portions of the end links are landed on the floor. Then, the hands are gradually moved toward the trunk pitch axis side which is the position of the center of gravity of the body to form a landed polygon narrower than that in the original on-floor posture.

Further, in the landed polygon, the narrowest support polygon is searched for. Now, at least two or more links from the other end are taken off from the floor, and it is determined whether or not a ZMP is plannable. The plannability of the ZMP can be determined taking movable angles of the link structure, torque values of the joint actuators interconnecting the links, joint forces, angular speeds, angular accelerations and so forth into consideration.

For example, while the gravity center link which interconnects the trunk pitch axis and the hip joint pitch axes is kept in the landed state (contacting to the floor), it is attempted to take off two or more continuous links from the other end side including the knee joint pitch axes from the floor.

For example, while the landed links which make the support polygon are left, two or more continuous links from the other end side of the landed polygon are taken off from the floor. Then, one or more non-landed links from the other end side are bent to land the end portions of the end links to form a narrower landed polygon.

For example, in a state wherein two or more links including the knee joints are taken off from the floor, the knee joint pitch axes are bent so that the soles which are end portions of the end links are landed onto the floor. Then, the soles are gradually moved toward the hip joint pitch axes side which is the position of the center of gravity of the body to form a landed polygon narrower than that in the original on-floor posture.

Thereafter, it is determined whether or not the gravity center link can be taken off from the floor in a state wherein the end portions of the opposite end links of the landed polygon remain landed on the floor to determine whether or not the support polygon is sufficiently narrow. Whether or not the gravity center link can be taken off from the floor can be determined taking movable angles of the link structure, torque values of the joint actuators interconnecting the links, joint forces, angular speeds, angular accelerations and so forth into consideration.

For example, it is determined whether or not the gravity center link which interconnects the trunk pitch axis and the hip joint pitch axes can be taken off from the floor in a state wherein the hands and the soles as the end portions of the opposite end links of the landed polygon to determine whether or not the support polygon is sufficiently narrow.

Then, in response to that the support polygon of the body is sufficiently narrow, the gravity center link is taken off from the floor in a state wherein the end portions of the opposite link ends of the support polygon are kept landed on the floor, and the distance between the end portions of the opposite end links of the support polygon is reduced while the ZMP is maintained in the support polygon formed from the landed links at the opposite end links to move the ZMP to the other end side of the link structure. At this time, whether or not the ZMP can be moved to the other end side can be determined taking movable angles of the link structure, torque values of the joint actuators interconnecting the links, joint forces, angular speeds, angular accelerations and so forth into consideration.

For example, in a state wherein the hands and the soles as the end portions of the opposite end links of the landed polygon are kept landed on the floor, the gravity center link which interconnects the trunk pitch axis and the hip joint pitch axes is taken off from the floor, and the distance between the hands and the soles is gradually reduced to move the ZMP toward the soles.

Then, in response to that the ZMP enters the landed polygon formed only from a number of non-landed links smaller than a second predetermined number from the other end of the link structure, a number of links greater than a first predetermined number from the one end side of the link structure are taken off from the floor while the ZMP is kept accommodated in the landed polygon to expand the landed polygons in the lengthwise direction to complete the standing up motion.

For example, in response to that the ZMP enters the landed polygon formed from the soles, the links from the shoulder pitch axes to the knee pitch axes are taken off from the floor while the ZMP is kept accommodated in the landed polygon, and the non-landed links are expanded in the lengthwise direction to complete the standing up motion.

When the non-landed links are expanded in the lengthwise direction at the final stage of standing up, it assures a high efficiency in motion of the body to positively use the knee joint pitch axes having a comparatively great mass operation amount to perform the motion.

It is to be noted that, in order to form a narrower landed polygon, when the non-landed links are bent around the shoulder joint pitch axes to land the hands which are the end portions of the end links onto the floor, each of the arm parts may operate so as to satisfy the following expressions. It is to be noted that the length of the upper arms is represented by $l_1$, the length of the forehands by $l_2$, the shoulder roll angle by $\alpha$, the elbow pitch angle by $\beta$, the length from the shoulders to the hands by $l_{12}$, the angle defined by a line interconnecting each of the shoulders and a corresponding one of the hands by $\gamma$, and the height of the shoulders by h.

$$l_{12} = l_1 \cos\alpha + l_2 \sin(\alpha+\beta-90)$$

$$l_{12} \sin\gamma < h$$

In particular, by causing the elbow pitch axes to perform bending movement in place of rendering the shoulder roll axis operative, the left and right hands can be landed with a smaller use volume rearward of the body.

The means for or step of producing a narrower landed polygon may selectively utilize one of a step changing motion and a dragging motion on the floor of the hand parts or the foot parts in response to whether it is possible to take off two or more of the links which do not relate to the smallest support polygon from the floor to form a narrower landed polygon.

If only a step changing motion of the hand parts or the foot parts is utilized in the process of such successive formation of a smaller landed polygon, then in order to realize the step changing motion, it is necessary for the hand parts or the foot parts to be taken off from the floor, and two or more links which do not relate to the support polygon must be present. Depending upon the posture of the body, however, it is sometimes impossible to perform a step changing motion. In this instance, the standing up motion itself results in failure. In contrast, where a dragging movement of the hand parts or the foot parts is utilized, the possibility that a standing up motion may result in failure can be reduced.

According to a second aspect of the present invention, there is provided a motion controlling apparatus and a motion controlling method for a legged mobile robot which includes movable legs and performs a legged operation in a standing posture thereof, including:

means for or a step of calculating an impact moment applied to a body of the legged mobile robot at each stage upon tumbling of the body;

means for or a step of calculating an impact force applied to the body from the floor at each stage upon tumbling;

means for or a step of calculating an area S of a support polygon formed from a landed point (contact point) of the body and the floor;

first landed location searching means for or a first landed location searching step of selecting a next landed location so that the area S of the support polygon may be minimized or fixed; and second landed location searching means for or a second landed location searching step of selecting a next landed location so that the area S of the support polygon may be increased.

In such an instance, an impact moment applied to the body can be warded off by minimizing or fixing the area S of the support polygon by means of the first landed location searching means. In this instance, the body may be moved forward or backward to move the supporting face itself. Meanwhile, an impact force applied from the floor to the body upon tumbling can be moderated by selecting the landed location by means of the second landed location searching means so that the area S of the support polygon may be increased suddenly. Accordingly, a tumbling motion of the body should be performed by the second landed location searching means or step if the impact force applied to the body from the floor is within a predetermined tolerance, but a tumbling motion of the body should be performed by the first landed location searching means or step if the impact force is outside the predetermined tolerance.

According to a third aspect of the present invention, there is provided a motion controlling apparatus or a motion controlling method for controlling a series of motions relating to tumbling and standing up of a body of a legged mobile robot which includes movable legs and performs a legged operation in a standing posture thereof, characterized in that the legged mobile robot is formed from a link structure wherein a plurality of substantially parallel joint axes having a joint degree-of-freedom are connected to each other in a lengthwise direction, and the motion controlling apparatus or method includes:

means for or a step of searching for the narrowest support polygon formed from a minimum number of links from among landed polygons formed from landed links in an on-floor posture wherein two or more links including a gravity center link at which the center of gravity of the body is positioned are landed on a floor upon tumbling of the legged mobile robot;

means for or a step of setting a ZMP at a location at which the number of links which do not relate to the smallest support polygon is maximized to perform a tumbling motion;

means for or a step of searching for a link or links which can be taken off from the floor in the tumbling position of the body; and means for or a step of taking off all of the links which can be taken off from the floor to perform a standing up motion.

Where the center of gravity of the body exists at the waist portion, the ZMP can be set to a location at which the number of links which do not relate to the smallest support polygon is maximized. After such tumbling and landing motions, all those links which can be take off from the floor are taken off from the floor, that is, both of the lower limbs and the trunk are lifted to take off the upper part of the body and the lower limbs simultaneously from the floor. Then, the foot parts, the hand parts and so forth are landed. By this, a smaller landed polygon can be formed at a reduced number of steps. Consequently, an efficient standing up motion can be realized at a higher speed.

According to the third aspect of the present invention, there is provided a robot apparatus having a trunk part, leg parts connected to the trunk part and arm parts connected to the trunk part, including:

support polygon detection means for detecting a first support polygon formed from a plurality of end portions of the leg parts, trunk part and/or arm parts at which the leg parts, trunk part and/or arm parts are landed on a floor;

support polygon changing means for bending the leg parts toward the trunk part to reduce the area of the first support polygon;

ZMP motion controlling means for determining whether or not a ZMP which is positioned in the changed first support polygon can be moved into a landed polygon formed from the soles of the leg parts; and control means for moving, when the ZMP motion controlling means determines that the ZMP can be moved, the ZMP from within the first support polygon into the landed polygon formed by the soles and changing the position of the robot apparatus from a tumbling position to a basic posture while the ZMP is maintained within the landed polygon.

According to a fourth aspect of the present invention, there is provided a legged mobile robot which includes at least a body, one or more arm links connected to an upper portion of the body each through a first joint (shoulder), a first leg link connected to a lower portion of the body through a second joint (hip joint), and a second leg link connected to an end of the second leg link through a third joint (knee), including:

means for landing ends of the arm links and a foot part at an end of the second leg link to form a first support polygon;

means for moving the second joint upwardly higher than the third joint in a normal direction to the floor while the ends of the arm links and the foot part are kept landed, decreasing the area of the first support polygon and moving a ZMP into a landed polygon formed from the foot part; and means for standing a body of the robot apparatus uprightly while the ZMP is kept in the landed polygon formed from the foot part.

With the robot apparatus according to the present invention, the body returns from a tumbling position to a standing posture while reducing the area of the support polygon. Consequently, joint actuators for the leg parts and so forth can perform a standing up motion with comparatively low torque.

The above and other objects, features and advantages of the present invention will become apparent from the following description based on an embodiment of the present invention and the accompanying drawings.

BRIEF DESCRIPTION OF DRAWINGS

FIG. 1 is a schematic view showing a legged mobile robot to which the present invention is applied when it is in an uprightly standing state as viewed from obliquely forward;

FIG. 4 is a diagrammatic view schematically showing a basic control system configuration of the legged mobile robot 100;

FIG. 5 is a diagrammatic view illustrating basic state transitions of a movement system of the legged mobile robot 100 has;

FIG. 11 is an enlarged view showing a portion around a waist portion of the multiple mass point approximation model;

FIG. 14 is a schematic view illustrating a principle of maintaining a supporting area when the body tumbles;

FIG. 15 is a diagrammatic view illustrating a principle that a support polygon becomes maximum when the body drops onto the floor;

FIGS. 39 to 55 are perspective views illustrating the manner wherein the legged mobile robot 100 tumbles from its standing posture into a supine posture;

FIGS. 57 to 73 are side elevational views illustrating a manner wherein the legged mobile robot 100 tumbles from its standing posture into a prone posture;

FIG. 93 is a view illustrating a manner wherein a legged mobile robot of the type which does not include a trunk pitch axis performs a standing up motion from its supine posture through synchronous driving of a plurality of joint pitch axes;

FIG. 130 is a view illustrating a modification to a series of motions when the left and right hands are contacted with the floor rearward of the body;

FIG. 131 is a view illustrating the modification to the series of motions when the left and right hands are contacted with the floor rearward of the body;

FIG. 132 is a diagrammatic view illustrating the motions of an arm illustrated in FIGS. 130 and 131;

FIG. 133 is a diagrammatic view showing the legged mobile robot shown in FIG. 92 but in a generalized form wherein it is replaced with a link structure;

FIGS. 136 to 153 are side elevational views illustrating a manner wherein the legged mobile robot 100 stands up from its basic spine posture;

FIGS. 154 to 172 are perspective views illustrating the manner wherein the legged mobile robot 100 stands up from its basic prone posture;

FIGS. 192 to 198 are views illustrating a series of motions of the body when a standing up motion is performed continuously to a tumbling motion.

BEST MODE FOR CARRYING OUT THE INVENTION

In the following, an embodiment of the present invention is described in detail with reference to the drawings.

A. Mechanical Configuration of the Legged Mobile Robot

Figure 2:
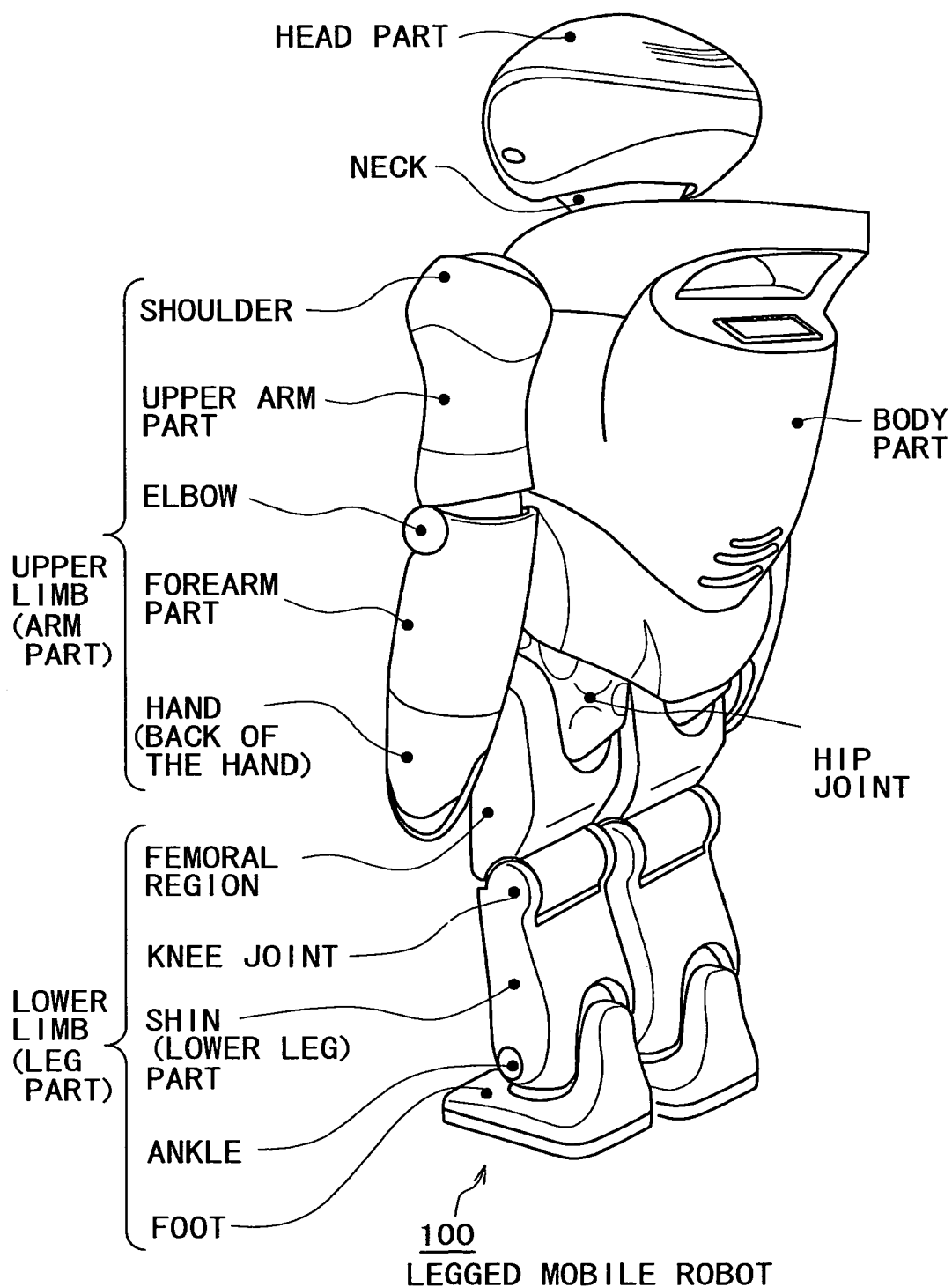
FIG. 2 is a perspective view showing the legged mobile robot to which the present invention is applied when it is in an uprightly standing state as viewed from obliquely backward.

Referring to FIGS. 1 and 2, a "human-like" or "humanoid" legged mobile robot 100 to which the present invention is applied is shown in a manner wherein it stands uprightly as viewed from obliquely forward and obliquely rearward, respectively. As shown in FIGS. 1 and 2, the legged mobile robot 100 includes a body part, a head part, left and right upper limb parts, and left and right lower limb parts used for legged traveling. A control section (not shown) is built, for example, in the body part and generally controls action of the body.

Each of the left and right lower limb parts is composed of a femoral region, a knee joint, a shin part, an ankle and a foot and is connected to a substantially lowermost end of the trunk part by a hip joint. Meanwhile, each of the left and right upper limb parts is composed of an upper arm, an elbow joint and a front arm and is connected to a left or right side edge of an upper portion of the trunk part by a shoulder joint. Further, the head part is connected to a middle portion of a substantially uppermost end of the trunk part by a neck joint.

The control section includes a housing in which a controller (main control section) for controlling driving of various joint actuators of the legged mobile robot and processing external inputs from various sensors (hereinafter described) and like elements, a power supply circuit and other peripheral apparatus are accommodated. The control section may additionally include a communication interface or a communication apparatus for remote control.

The legged mobile robot having the configuration described above can achieve bipedal locomotion through whole-body cooperative motion control by the control section. Such bipedal locomotion as just mentioned is usually performed by repetitions of a walking cycle divided into the following motion periods. In particular, (1) A single support phase within which the legged mobile robot walks using the left leg with the right leg lifted;
(2) A double support phase within which the right foot is contacted with the ground;
(3) Another single support phase within which the legged mobile robot walks using the right leg with the left leg lifted; and
(4) Another double support phase within which the left foot is contacted with the ground.

Walking control of the legged mobile robot 100 is achieved by planning a target trajectory of each of the lower limbs in advance and correcting the planned trajectory within each of the periods described above. In particular, within each double support phase, the correction of the lower limb trajectories is stopped and the height of the waist is corrected with a fixed value using a total correction amount for the planned trajectories. On the other hand, within each single support phase, a corrected trajectory is produced so that the relative positional relationship between the ankle of a leg with regard to which correction has been performed and the waist may be returned to the planned trajectory.

For stable control of the posture of the body beginning with trajectory correction in a walking motion, interpolation calculation in which a five-dimensional polynomial is used is usually used so that the position, speed and acceleration for minimizing the deviation with respect to a target ZMP (Zero Moment Point) may be continuous. A ZMP is used as a criterion for determination of the stability in walking. The stability determination criterion by a ZMP is based on the "d'Alembert's principle" that the gravity and inertial force which act from a walking system to the road surface and the moment of them are balanced with the floor reaction force as a reaction from the road surface to the walking system and the floor reaction force moment. As a consequence of mechanical inference, a point at which the pitch axis moment and the roll axis moment are zero, that is, a "ZMP", is present on or on the inner side of a side of a support polygon (that is, a ZMP stable region) formed by the landing points of the soles and the road surface.

Figure 3:
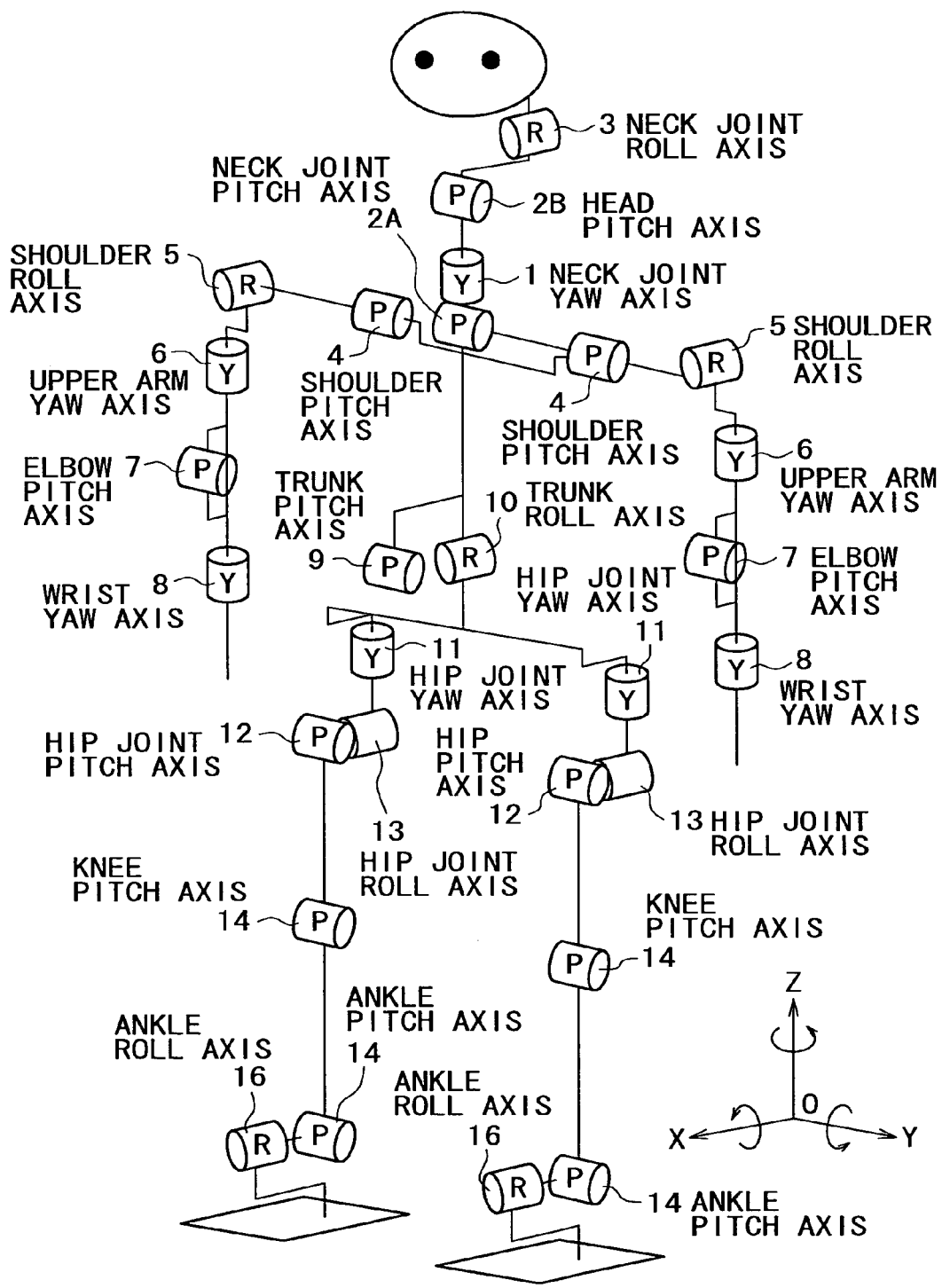
FIG. 3 is a schematic view showing a joint degree-of-freedom configuration of the legged mobile robot.

FIG. 3 schematically shows a joint degree-of-freedom configuration of the legged mobile robot 100. As seen from FIG. 3, the legged mobile robot 100 has a structure having a plurality of limbs including upper limbs including two arm parts and a head part, lower limbs including two leg parts for achieving traveling motion and a trunk part for interconnecting the upper limbs and the lower limbs.

The neck joint (Neck) for supporting the head part has a 4 degree-of-freedom including a neck joint yaw axis 1, first and second neck joint pitch axes 2A and 2B, and a neck joint roll axis 3.

Meanwhile, each arm part includes a shoulder joint pitch axis 4 of a shoulder, a shoulder joint roll axis 5, an upper arm yaw axis 6, an elbow joint pitch axis 7 of an elbow, a wrist joint yaw axis 8 of a wrist, and a hand part as a degree-of-freedom thereof. The hand part actually is a multi-joint, multi-degree-of-freedom structure including a plurality of fingers.

On the other hand, the trunk part (Trunk) has a 2 degree-of-freedom including a trunk pitch axis 9 and a trunk roll axis 10.

Each of the leg parts which form the lower limbs includes a hip joint yaw axis 11, a hip joint pitch axis 12 and a hip joint roll axis 13 of the hip joint (Hip), a knee joint pitch axis 14 of the knee, an ankle joint pitch axis 15 and an ankle joint roll axis 16 of the ankle, and a foot part.

It is to be noted that the legged mobile robot 100 directed for entertainment need not necessarily have all of the degrees of freedom described above or not necessarily have only the degrees of freedom described above. Naturally, it is possible to suitably increase or decrease the degree of freedom, that is, the number of joints, in accordance with restrictive conditions or required specifications in design or manufacture.

The degree of freedom of the legged mobile robot 100 having such a configuration as described above is actually achieved using actuators. Preferably, the actuators are small in size and light in weight from such requirements that the legged mobile robot be approximated to a natural shape of a human being by removing surplus swelling in an outer appearance and that posture control be performed for an unstable structure which performs bipedal locomotion. In the present embodiment, a small size AC servo actuator of the direct-geared type and of the type wherein a servo control system is formed as a single chip and built in a motor unit is incorporated (an AC servo actuator of the type mentioned is disclosed, for example, in Japanese Patent Laid-Open No. 2000-299970 assigned already to the applicant of the present application). In the present embodiment, a low speed reducing gear is adopted as the direct gear to achieve a passive characteristic of a driving system required for a robot of the type with regard to which importance is attached to physical interactions with a human being.

B. Control System Configuration of the Legged Mobile Robot

FIG. 4 schematically shows a control system configuration of the legged mobile robot 100. Referring to FIG. 4, the legged mobile robot 100 includes mechanism units 30, 40, 50R/L and 60R/L which represent the limbs of a human being, and a control unit 80 which performs adaptive control for achieving a cooperative motion of the mechanism units (it is to be noted that reference characters R and L are added as suffixes for representing the distinction between the right and the left. This similarly applies to the following description).

A motion of the entire legged mobile robot 100 is generally controlled by the control unit 80. The control unit 80 includes a main control section 81 formed from principal circuit components (not shown) such as a CPU (Central Processing Unit) and a memory, and a peripheral circuit 82 including a power supply circuit, an interface (both not shown) for performing transmission and reception of data and commands to and from the components of the legged mobile robot 100 and other required elements.

The location of the control unit 80 is not particularly limited when the present invention is embodied. Although the control unit 80 is incorporated in the trunk part unit 40 in FIG. 4, it may otherwise be incorporated in the head part unit 30. Alternatively, the control unit 80 may be located outside the legged mobile robot 100 and communicate with the body of the legged mobile robot 100 by wire or wireless communication.

Each joint degree-of-freedom in the legged mobile robot 100 shown in FIG. 3 is implemented by an individually corresponding actuator. In particular, the head part unit 30 has disposed therein a neck joint yaw axis actuator $A_1$, first and second neck joint pitch axis actuators $A_{2A}$ and $A_{2B}$ and a neck joint roll axis actuator $A_3$ which represent the neck joint yaw axis 1, first and second neck joint pitch axes 2A and 2B and neck joint roll axis 3, respectively.

The trunk part unit 40 has disposed therein a trunk pitch axis actuator $A_9$ and a trunk roll axis actuator $A_{10}$ which represent the trunk pitch axis 9 and the trunk roll axis 10, respectively.

The arm part units 50R/L are subdivided into upper arm units 51R/L, elbow joint units 52R/L and forearm units 53R/L, respectively. Each of the arm part units 50R/L has disposed therein a shoulder joint pitch axis actuator $A_4$, a shoulder joint roll axis $A_5$, an upper arm yaw axis actuator $A_6$, an elbow joint pitch axis actuator $A_7$ and a wrist joint yaw axis actuator $A_8$ which represent the shoulder joint pitch axis 4, shoulder joint roll axis 5, upper arm yaw axis 6, elbow joint pitch axis 7 and wrist joint yaw axis 8, respectively.

The leg part units 60R/L are subdivided into femoral region units 61R/L, knee units 62R/L and ankle part units 63R/L, respectively. Each of the leg part units 60R/L has disposed therein a hip joint yaw axis actuator $A_{11}$, a hip joint pitch axis actuator $A_{12}$, a hip joint roll axis actuator $A_{13}$, a knee joint pitch axis actuator $A_{14}$, an ankle joint pitch axis actuator $A_{15}$ and an ankle joint roll axis actuator $A_{16}$ which represent the hip joint yaw axis 11, hip joint pitch axis 12, hip joint roll axis 13, knee joint pitch axis 14, ankle joint pitch axis 15 and ankle joint roll axis 16, respectively.

Each of the actuators $A_1, A_2, A_3, \ldots$ used for the joints can be formed from a small size AC servo actuator (described hereinabove) preferably of the direct-geared type and of the type wherein a servo control system is formed as a single chip and incorporated in a motor unit.

Sub control sections 35, 45, 55 and 65 for actuator driving control are disposed for individual mechanism units such as the head part unit 30, trunk part unit 40, arm part units 50 and leg part units 60, respectively.

Acceleration sensors 95 and a posture sensor 96 are disposed on the trunk part unit 40 of the body. The acceleration sensors 95 are disposed in the X, Y and Z axis directions. Where the acceleration sensors 95 are disposed at the waist portion of the body, it is possible to set the waist portion, which has a great mass operation amount, as a control target point and directly measure the posture or an acceleration at the position of the waist portion to perform posture stabilization control based on a ZMP.

Meanwhile, landing confirmation sensors 91 and 92 and acceleration sensors 93 and 94 are disposed on the leg part units 60R and 60L, respectively. The landing confirmation sensors 91 and 92 are formed from, for example, pressure sensors mounted on the soles and can each detect whether or not the sole is contacted with the floor depending upon the presence or absence of floor reactive force. Meanwhile, the acceleration sensors 93 and 94 are disposed at least in the X and Y axis directions. By disposing the acceleration sensors 93 and 94 on the left and right foot parts, a ZMP equation can be established directly with that one of the foot parts which is nearest to the ZMP position.

Where acceleration sensors are disposed only at the waist portion which is a portion having a great mass operation amount, only the waist portion is set as a control target point, and a state of each foot part must be calculated relatively based on a result of the calculation of the control target point. In this instance, it is a prerequisite that the following conditions are satisfied between the foot part and the ground surface.

(1) The ground surface does not move at all whatever force or toque acts thereupon.
(2) The coefficient of friction of the road surface against translation is sufficiently high and does not allow a slip.

In contrast, in the present embodiment, a reactive force sensor system (floor reactive force sensor or the like) for directly detecting a ZMP and force is disposed on the foot part, which is a contact portion with the ground surface, and a local coordinate system and acceleration sensors for directly measuring the coordinate are disposed on the foot part. As a result, a ZMP equation can be established directly at the foot part which is nearest to the ZMP position, and more strict posture stabilization control which does not rely upon such a prerequisite as described above can be achieved at a high speed. As a result, stable walking (movement) of the body can be secured also on a gravel place or a thick-piled carpet on which the road surface moves if force or torque acts thereupon or a tiled place of a house on which a slip is likely to occur because a sufficient coefficient of friction against translation cannot be assured.

The control unit 80 can dynamically correct the control target in response to outputs of the sensors 91 to 96. More particularly, the control unit 80 adaptively controls each of the sub control sections 35, 45, 55 and 65 to realize a gross movement pattern wherein the upper limbs, trunk and lower limbs of the legged mobile robot 100 are cooperatively driven.

For a gross movement on the body of the robot 100, movements of the foot parts, a ZMP (Zero Moment Point) trajectory, a trunk movement, upper limb movements and the height of the waist portion are set, and commands indicating motions in accordance with the set contents are transferred to the sub control sections 35, 45, 55 and 65. Each of the sub control sections 35, 45, . . . interprets a command received from the main control section 81 and outputs driving control signals to the actuators $A_1, A_2, A_3, \ldots$ The "ZMP" here defines a point on the floor at which the moment by floor reactive force during walking is zero, and the "ZMP trajectory" signifies a trajectory along which the ZMP moves, for example, during a period of a walking motion of the robot 100.

C. Movement System Basic State Transitions of the Legged Mobile Robot

The control system of the legged mobile robot 100 according to the present embodiment defines a plurality of basic postures. Each of the basic postures is defined taking the stability of the body, energy consumption and transition to a next state into consideration, and a body movement can be controlled efficiently through a form of transition between the basic postures.

FIG. 5 illustrates basic state transitions by the movement system of the legged mobile robot 100 according to the present embodiment. Referring to FIG. 5, for the legged mobile robot, a basic supine posture, a basic standing posture, a basic walking posture, a basic sitting posture and a basic prone posture are defined taking the stability of the body, energy consumption and transition to a next state when the robot lies with the face upward, stands, is ready for walking, sits and lies with the face downward into consideration.

These basic postures are positioned to a platform of a motion control program for the body. Further, when the legged mobile robot is in its standing posture or the like, it performs various performances making uses of a gross movement such as walking, jumping or dancing, and apparatus control programs for them are positioned as applications which operate on the platform. The application programs are loaded suitably from an external storage and executed by the main control section 81.

Figure 6:
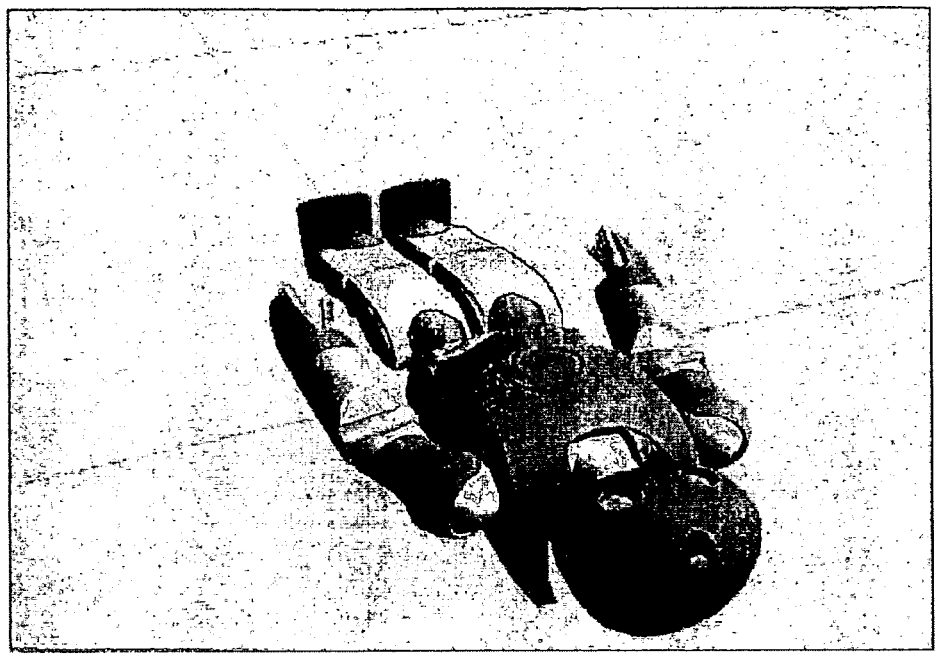
FIG. 6 is a view showing a basic supine posture of the legged mobile robot 100.

FIG. 6 illustrates the basic supine posture of the legged mobile robot 100. In the present embodiment, when the power supply to the body is made available, the legged mobile robot 100 assumes the basic supine posture and can be activated from a state wherein it is kinetically most stable without the possibility of tumbling (fall down) or the like. Further, not only upon activation but also upon ending of system operation, the legged mobile robot returns to the basic supine posture. Accordingly, since the legged mobile robot 100 starts its operation in a state wherein the body is kinetically most stable and ends its operation in the most stable state, the motion operation of the legged mobile robot is self-completed.

Naturally, also when the body tumbles, if a prescribed standing up motion is executed after the basic supine posture is restored once through a predetermined motion on the floor, then the original posture taken upon interruption of the operation can be restored through the basic standing posture.

Figure 7:
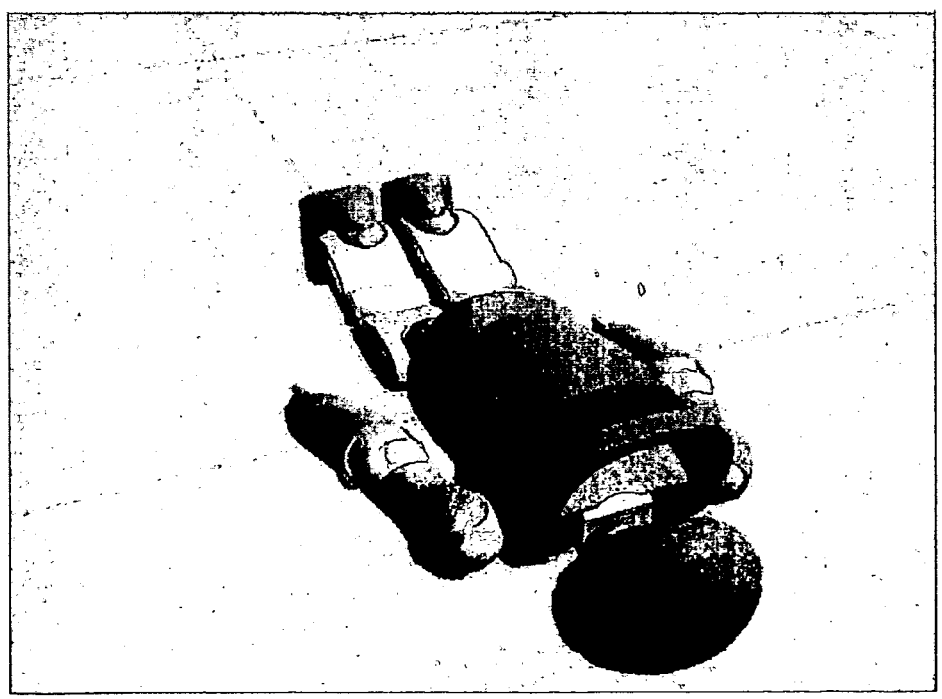
FIG. 7 is a view showing a basic prone posture of the legged mobile robot 100.

Further, the legged mobile robot 100 according to the present embodiment includes, as one of the basic postures on the floor, such a basic prone posture as shown in FIG. 7. The basic prone posture is a state wherein the body is kinetically most stable similarly to the basic supine posture, and can maintain the posture stability also in a strength-gone state wherein the power supply is interrupted. For example, if the body tumbles due to inadvertent external force during a legged operation, then since it is unknown whether it drops in a supine posture or in a prone posture, in the present embodiment, two different on-floor basic postures are defined in this manner.

The legged mobile robot 100 can change its posture reversibly between the basic supine posture and the basic prone posture through various on-floor postures. Conversely speaking, the legged mobile robot 100 can smoothly change its posture to various on-floor postures with reference to the basic supine posture and the basic prone posture.

Figure 8:
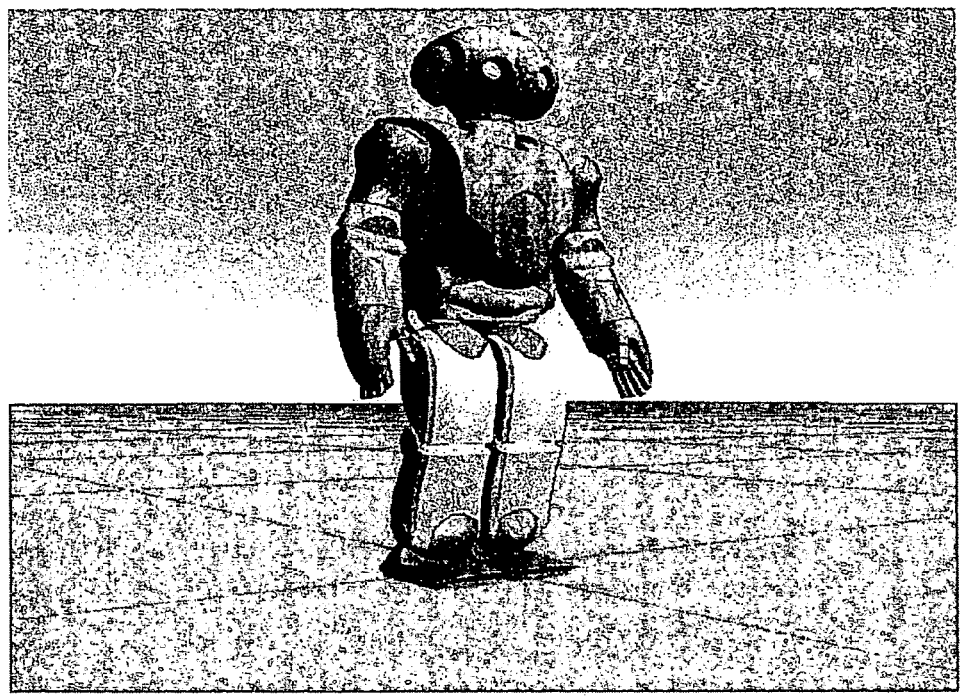
FIG. 8 is a view showing a basic standing posture of the legged mobile robot 100.

The basic supine posture is the kinetically most stable basic posture. However, where a legged operation is taken into consideration, a smooth state transition cannot be performed from the basic supine posture. Therefore, such a basic standing posture as shown in FIG. 8 is defined. Where the basic standing posture is defined, the legged mobile robot 100 can proceed to a later legged operation smoothly.

The basic standing posture is the most stable state among various standing states and is a posture in which the computer load for posture stabilization control and the power consumption are the lowest or are minimized. In the basic standing state, the knees are stretched straightforwardly to minimize the motor torque for keeping the uprightly standing state. The legged mobile robot 100 can change its posture smoothly from the basic standing posture to various standing postures to play, for example, a dance performance which makes use of the upper limbs.

Figure 9:
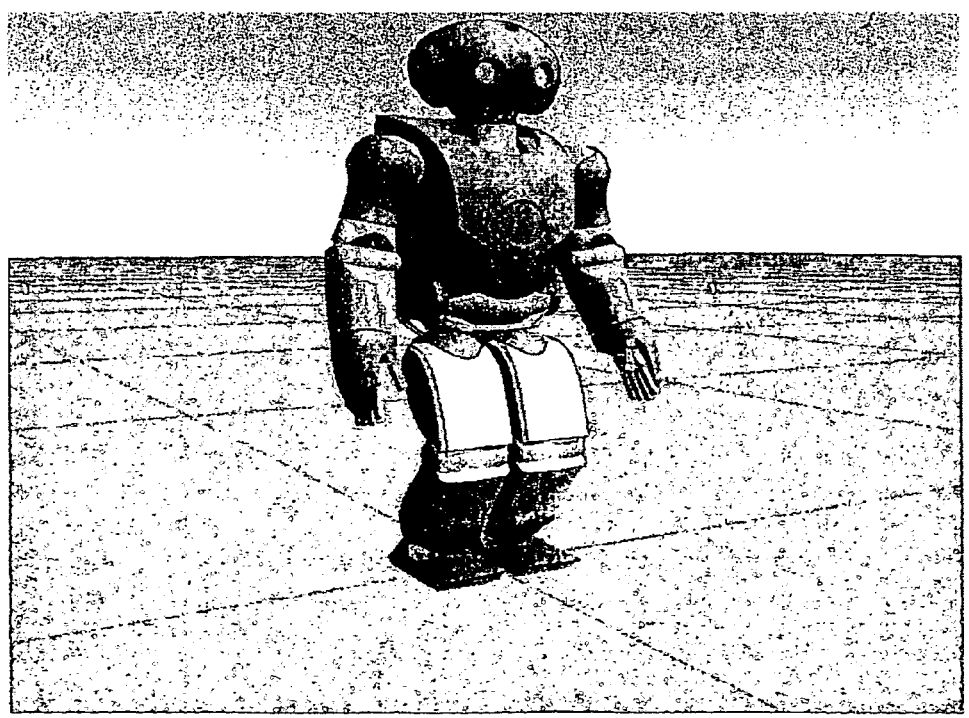
FIG. 9 is a view showing a basic walking posture of the legged mobile robot 100.

On the other hand, although the basic standing posture is superior in the posture stability, it is not optimized so as to immediately enter a legged operation such as walking. Therefore, the legged mobile robot according to the present embodiment defines, as another basic posture in a standing state with the legs, such a basic walking posture as seen in FIG. 9.

When the legged mobile robot is in its basic standing posture, the pitch axes 12, 14 and 15 for the hip joints, knee joints and ankle joints are driven so that the legged mobile robot may have a posture wherein the position of the center of gravity of the body is lowered a little so as to enter the basic walking posture. The basic walking posture allows smooth transition to various legged motions beginning with an ordinary walking motion. However, since the knees are bent, additional torque for keeping the posture is required as much, and therefore, the basic walking posture requires increased power consumption when compared with the basic standing posture.

In the basic standing posture, the ZMP position of the body exists in the proximity of the center of a ZMP stable region, and the bent angle of the knees is small and the energy consumption is low. In contrast, in the basic walking posture, although the ZMP position is in the proximity of the stable region, the bent angle of the knees is comparatively great in order to secure high adaptability to the road surface and external force.

Further, in the legged mobile robot 100 according to the present embodiment, a basic sitting posture is defined. The basic sitting posture (not shown) is defined as a posture wherein, when the legged mobile robot 100 sits on a predetermined chair, the computer load for posture stabilization control and the power consumption are the lowest or are minimized. The legged mobile robot 100 can change its posture reversibly from the basic supine posture, basic prone posture and basic standing posture described hereinabove to the basic posture. Further, the legged mobile robot 100 can smoothly change its posture from the basic sitting posture or the basic standing posture to various sitting postures, in which it can play various performances, for example, using only the upper part of the body.

D. Posture Stabilization Control of the Legged Mobile Robot

Subsequently, a procedure of the posture stabilization control of the legged mobile robot 100 according to the present embodiment in a legged operation, that is, a procedure of a stabilization process of the posture of the legged mobile robot 100 when it executes a gross cooperative movement including movements of the foot parts, waist, trunk and lower limbs, is described.

The posture stabilization control according to the present embodiment uses a ZMP for posture stabilization control. The posture stabilization control of a robot wherein the ZMP is used as a stabilization determination criterion basically resides in search for a point at which the moment is zero on or on the inner side of a side of a support polygon formed from the landing points of the soles and the road surface. In particular, a ZMP equation which describes a balancing relationship of various moments applied to the body of the robot is introduced, and the target trajectory of the body is corrected so that a moment error appearing on the ZMP equation may be canceled.

In the present embodiment, as a control target point on the body of the robot, a location (part) at which the mass operation amount is maximum, for example, the waist portion, is set as a local coordinate system origin. Then, a measuring element such as an acceleration sensor is disposed at the control target point to directly measure a posture or an acceleration at the position to perform posture stabilization control based on the ZMP. Further, an acceleration sensor is disposed at each of the foot parts which are contacting portions with the road surface to directly measure a local coordinate system to be used for the control and coordinates of the local coordinate system, and a ZMP equation is produced directly at the foot part which is nearest to the ZMP position.

D-1. Introduction of a ZMP Equation

Figure 10:
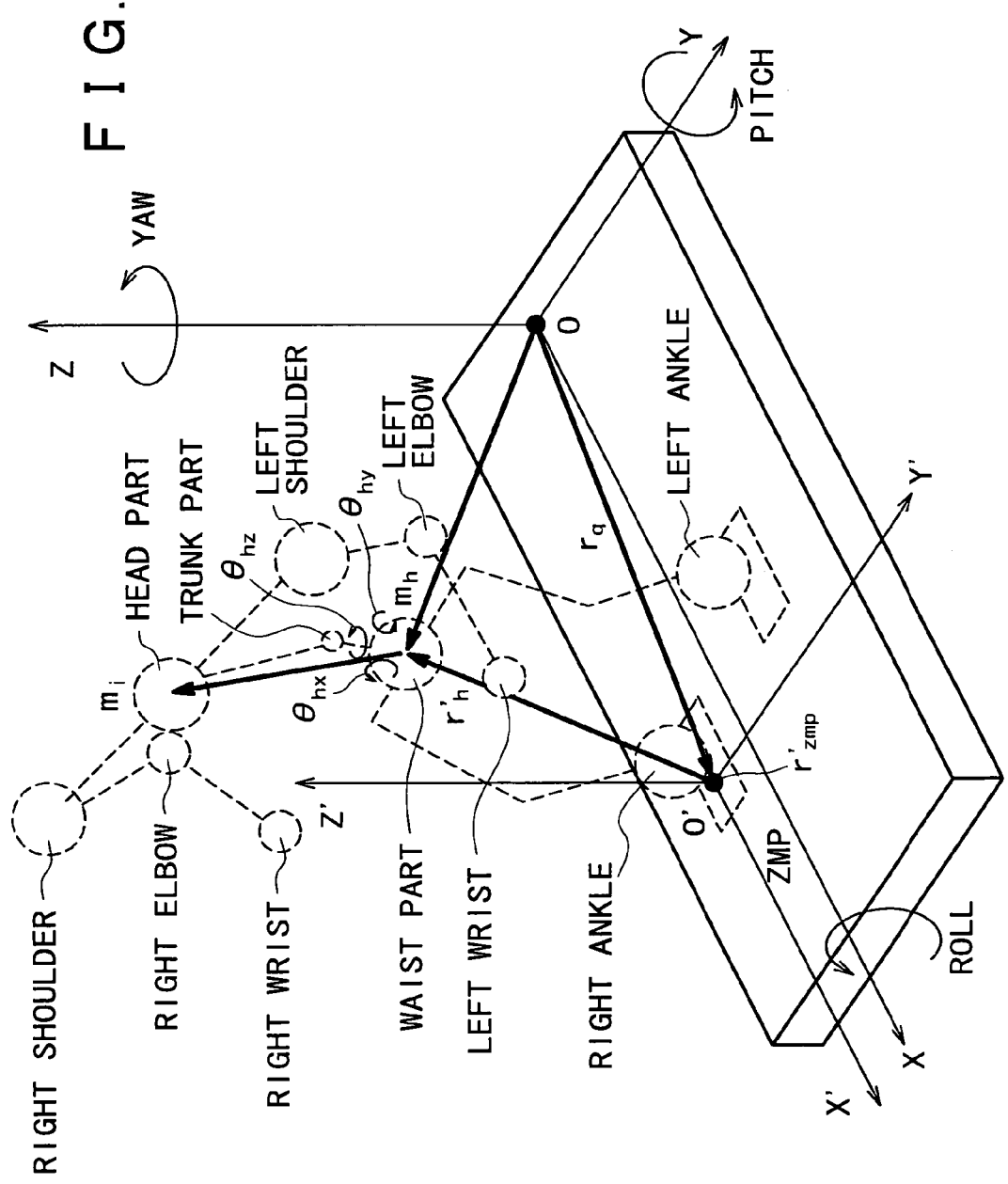
FIG. 10 is a schematic diagrammatic view showing a multiple mass point approximation model of the legged mobile robot 100.

The legged mobile robot 100 according to the present embodiment is an aggregate of infinite, that is, continuous mass points. Here, however, the legged mobile robot 100 is replaced into an approximation model formed from a finite number of discrete mass points to reduce the amount of calculation for a stabilization process. More particularly, the legged mobile robot 100 which has such a multiple joint degree-of-freedom configuration as shown in FIG. 3 is physically replaced into and handled as such a multiple mass point approximation model as shown in FIG. 10. The approximation model shown is a linear and non-interacting multiple mass point approximation model.

Referring to FIG. 10, an O-XYZ coordinate system represents roll, pitch and yaw axes of an absolute coordinate system, and an O'-X'Y'Z' coordinate system represents roll, pitch and yaw axes of a movement coordinate system which moves together with the robot 100. However, parameters in FIG. 10 have the following meanings. Further, it should be understood that each reference character with the mark ' describes the movement coordinate system.

$m_h$: mass of the waist portion mass point
$\vec{r}'_h(r'_{hx}, r'_{hy}, r'_{hz})$: position vector at the waist portion mass point
$m_i$: mass at the ith mass point
$\vec{r}'_i$: position vector at the ith mass point
$\vec{r}'_{zmp}$: position vector of the ZMP
$\vec{g}(g_x, g_y, g_z)$: gravity acceleration vector
O'-X'Y'Z': movement coordinate system (which moves together with the robot)
O-XYZ: absolute coordinate system In the multiple mass point model shown in FIG. 10, i represents a suffix representing a mass point given on the ith, $m_i$ represents the mass of the ith mass point, and $r_i'$ represents the position vector of the ith mass point (on the movement coordinate system). The center of gravity of the body of the legged mobile robot 100 according to the present embodiment exists in the proximity of the waist portion. In other words, the waist portion is a mass point at which the mass operation amount is maximum, and in FIG. 10, the mass is represented by mh and the position vector thereof (on the movement coordinate system) by $r'_h(r'_{hx}, r'_{hy}, r'_{hz})$. Further, the position vector (on the movement coordinate system) of the ZMP of the body is represented by $r'_{zmp}(r'_{zmpx}, r'_{zmpy}, r'_{zmpz})$.

The world coordinate system O-XYZ is an absolute coordinate system and is invariable. In the legged mobile robot 100 according to the present embodiment, the acceleration sensors 93, 94 and 96 are disposed at the waist portion and the foot parts of the legs, and the waist portion and the legs as well as a relative position vector $r_q$ of the world coordinate system are detected directly from outputs of the sensors. On the other hand, the movement coordinate system, that is, the local coordinate system O-X'Y'Z' of the body, moves together with the robot.

The multiple mass point model is a representation of the robot in the form of a wire frame model. As can be seen from FIG. 10, in the multiple mass point model, each of the two shoulders, two elbows, two wrists, trunk, waist portion and two ankles is set as a mass point. In the non-exact multiple mass point approximation model shown in FIG. 10, a moment expression is described in the form of a linear equation, and such moment expressions do not cause interaction with respect to the pitch axes and the roll axes. A multiple mass point approximation model can be produced generally in accordance with the following processing procedure.

(1) A mass distribution of the entire legged mobile robot 100 is determined.
(2) Mass points are set. The setting method of masses may be any of manual inputting by a designer and automatic production in accordance with a predetermined rule.
(3) The center of gravity is determined for each region i, and the position of the center of gravity and the mass $m_i$ are provided to the pertaining mass.
(4) Each mass point $m_i$ is represented as a sphere centered at the mass point position $r_i$ and having a radius which increases in proportion to the mass.
(5) Those mass points or spheres which really have a connectional relationship are connected to each other.

It is to be noted that rotational angles ($\theta_{hx}$, $\theta_{hy}$, $\theta_{hz}$) in waist portion information of the multiple mass point model shown in FIG. 10 define the posture of the waist portion of the legged mobile robot 100, that is, the rotations of roll, pitch and yaw axes (it should be confirmed that FIG. 11 shows an enlarged view of the multiple mass point model around the waist portion).

The ZMP equation of the body describes a balancing relationship among moments applied to the control target point. Where the body is represented by a great number of mass points $m_i$ and they are set as control target points, an expression for determining the sum total of moments applied to all of the control target points $m_i$ is the ZMP equation.

The ZMP equation of the body described in the world coordinate system (O-XYZ) and that described in the local coordinate system (O-X'Y'Z') of the body are given below.

ZMP equation described in the world coordinate system:

$$\sum_{\substack{all-particles \\ r=r'+r_q}} m_i(r_i - r_{zmp}) \times \ddot{r}_i + T - \sum_j M_j - \sum_k (S_k - r_{zmp}) \times F_k = 0$$

ZMP equation described in the local coordinate system:

$$\sum_{\substack{all-particles \\ \vec{r}=\vec{r}'+\vec{r}_q}} m_i(r'_i - r'_{zmp}) \times (\ddot{r}'_i + \ddot{r}_q) + T - \sum_j M_j - \sum_k (S'_k - r'_{zmp}) \times F_k = 0$$

The expressions above describe that the sum total of the moments around the ZMP (radius $r_i - r_{zmp}$) produced by acceleration components applied to the mass points $m_i$, the sum total of the external force moments $M_j$ and the sum total of the moments around the ZMP (the point of action of the kth external force $F_k$ is represented by $s_k$) produced by the external force $F_k$ balance with each other.

The ZMP balance equations include a total moment compensation amount, that is, a moment error component T. By suppressing the moment error to zero or within a predetermined tolerance, the posture stability of the body is maintained. In other words, it is the essence of the posture stabilization control which uses the ZMP as a stability determination criterion to correct the body movement (movements of the foot parts and/or a trajectory of each portion of the upper part of the body) so that the moment error may be suppressed to zero or within the tolerance.

In the present embodiment, the acceleration sensors 96, 93 and 94 are disposed at the waist portion and the left and right foot parts, respectively. Therefore, results of acceleration measurements at the control target points can be used to directly introduce the ZMP balance equations given above with a high degree of accuracy. As a result, high-speed and more exact posture stabilization control can be achieved.

D-2. Posture Stabilization Control of the Whole-Body Cooperation Type

Figure 12:
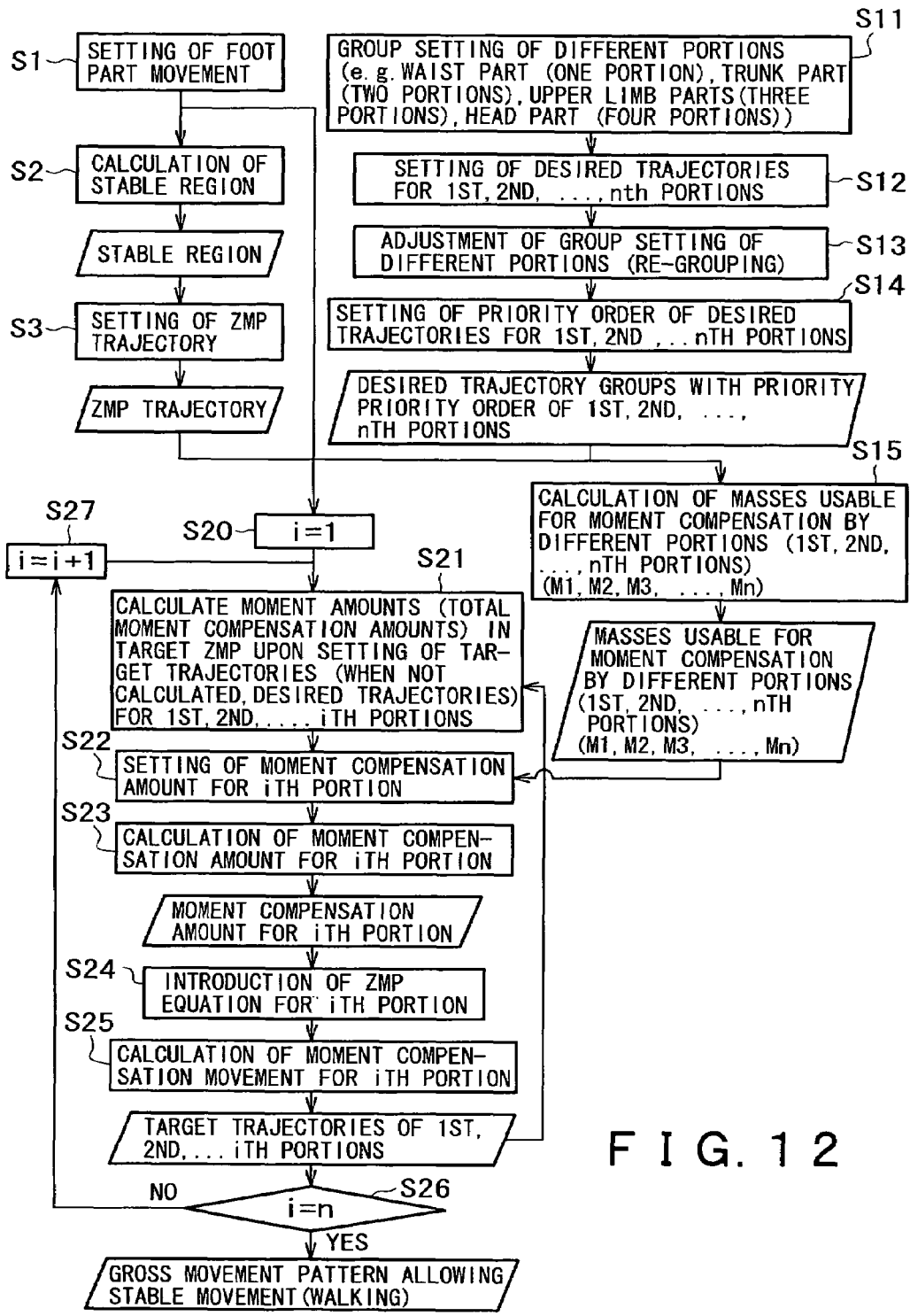
FIG. 12 is a flow chart illustrating a processing procedure for producing a body movement with which the legged mobile robot 100 can walk stably.

FIG. 12 illustrates a processing procedure wherein the legged mobile robot 100 produces a body movement by which stable walking can be achieved using the ZMP as a stability determination criterion in the form of a flow chart. It is to be noted, however, that, in the following description, such a linear and non-interacting multiple mass point approximation model as shown in FIGS. 10 and 11 is used to describe each joint position or motion of the legged mobile robot 100.

First, setting of a foot part movement is performed (step S1). The foot part movement is motion data wherein two or more poses of the body are connected in a time series.

The motion data includes, for example, joint space information representing a displacement of each joint angle of the foot parts and Cartesian space information representing the joint positions. The motion data may be manually inputted on a console screen or may be directly taught into the body (direct teaching), for example, constructed on an authoring system for motion editing.

Then, based on the thus set foot movement, a ZMP stable region is calculated (step S2). The ZMP is a point at which moments applied to the body are zero and exists basically on or on the inner side of a side of a support polygon formed by the landing points of the soles and the ground surface. The ZMP stable region is a region set on the inner side of the support polygon, and the body can be placed in a highly stabilized state by accommodating the ZMP in the region just mentioned.

Then, a ZMP trajectory during the foot part motion is set based on the foot part movement and the ZMP stable region (step S3).

On the other hand, for the portions of the upper part of the body (upper side with respect to the hip joints), group setting is performed like a waist part, a trunk part, upper limbs and a head part (step S11).

Then, a desired trajectory is set for each of the portion groups (step S12). Setting of such desired trajectories of the upper part of the body may be manually inputted on a console screen or may be directly taught into the body (direct teaching), for example, constructed on an authoring system for motion editing similarly as in the case of the foot parts.

Then, adjustment (re-grouping) of the group setting of the different portions is performed (step S13), and priority order numbers are applied to the groups (step S14). The priority order numbers here are order numbers in accordance with which the groups are placed into processing arithmetic operation for performing posture stable control of the body and are allocated, for example, in accordance with their mass operation amounts. As a result, desired trajectory groups with priority order numbers for the individual portions of the upper part of the body are produced.

Further, a mass which can be utilized for moment compensation is calculated for each of the portion groups of the upper part of the body (step S15).

Then, movement patterns of the portion groups are placed into a posture stabilization process based on the foot part movements and the ZMP trajectory as well as the desired trajectory groups for the individual portion groups of the upper part of the body in accordance with the priority order set at step S14.

In the posture stabilization process, an initial value 1 is substituted into a processing variable i (step S20). Then, the moment amounts, that is, the total moment compensation amounts, on the target ZMP upon setting of the target trajectories for the portion groups whose priority order number ranges from 1 to i, are calculated (step S21). For any portion for which no target trajectory is calculated, a desired trajectory therefor is used.

Then, the mass calculated at step S15 which can be utilized for moment compensation for the pertaining portion is used to set a moment compensation amount for the portion (step S22), and the moment compensation amount is calculated (step S23).

Then, the calculated moment compensation amount for the ith portion is used to introduce a ZMP equation for the ith portion (step S24), and a moment compensation movement of the portion is calculated (step S25). By the series of processes described, target trajectories for the portions whose priority order number ranges from 1 to i can be obtained.

By performing such processes as described above for all of the portion groups, a gross movement pattern which allows a stable movement (for example, walking) is produced.

Since the acceleration sensors 96, 93 and 94 are disposed at the waist portion and the left and right foot parts, respectively, the ZMP balance equation can be introduced directly and with a high degree of accuracy using results of the acceleration measurement at the control target points. As a result, posture stabilization control based on a ZMP stabilization determination criterion can be executed exactly at a high speed in accordance with such a processing procedure as illustrated in FIG. 12.

E. Tumbling Operation of the Legged Mobile Robot

As described in the preceding item D, the legged mobile robot 100 according to the present embodiment performs posture stabilization control upon walking and upon operation in a standing posture with the legs basically based on the ZMP stability determination criterion to minimize occurrences of a situation of tumbling of the body.

However, if tumbling cannot be avoided, then a tumbling motion (fall down motion) formed from a motion pattern with which possible damage to the body is prevented to the utmost is performed. For example, if an excessive external force F or an external moment M is applied to the body, then the moment error component T in the ZMP balance equation given hereinabove cannot be canceled only by a body movement, and the stability of the posture cannot be maintained.

Figure 13:
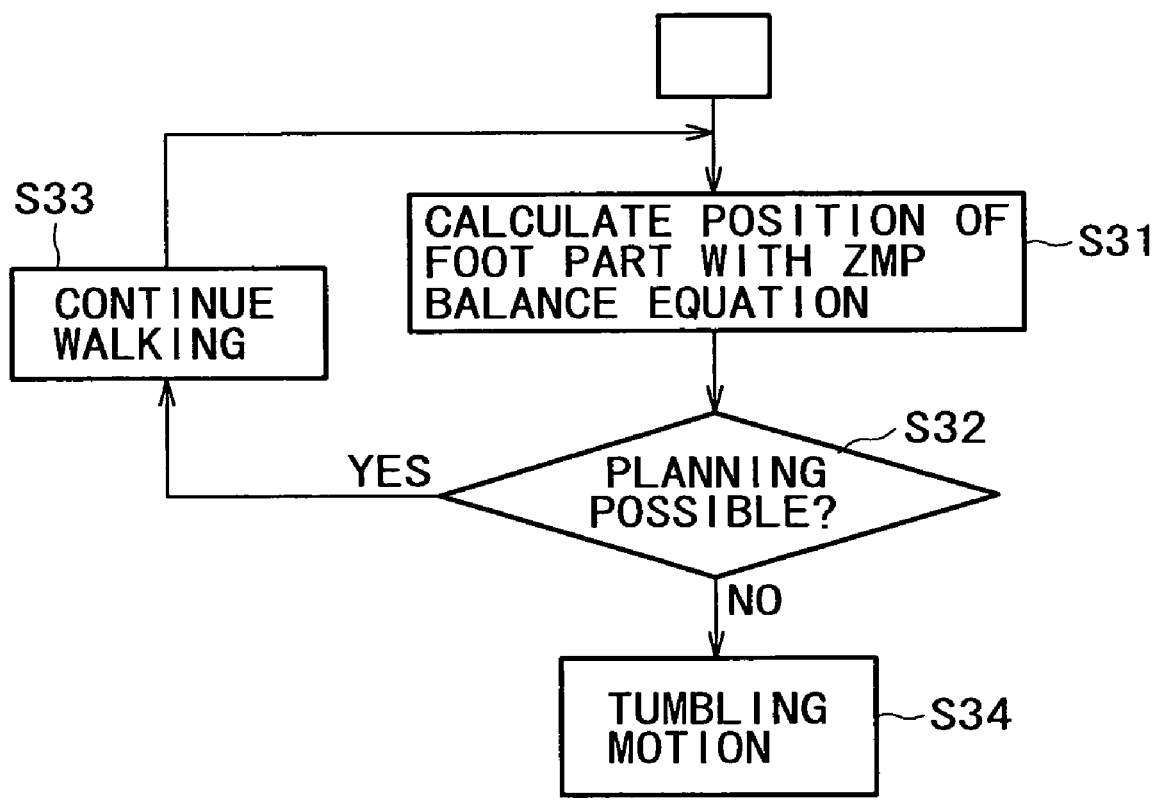
FIG. 13 is a flow chart illustrating a general processing procedure for motion control of the body when the legged mobile robot 100 performs a legged operation.

FIG. 13 illustrates a general processing procedure of motion control of the body during a legged operation of the legged mobile robot 100 according to the present embodiment in the form of a flow chart.

During a motion of the body, sensor outputs of the landing confirmation (floor reactive force) sensors 91 and 92 and the acceleration sensors 93 and 94 disposed on the left and right foot parts and the acceleration sensors 96 disposed at the waist portion are used to establish a ZMP balance equation (described hereinabove) to normally calculate the waist and lower limb trajectories (step S31).

For example, if an external force is applied to the body, then it is determined whether or not next waist and lower limb trajectories can be planned, that is, whether or not a moment error caused by the external force can be eliminated by a behavior plan of the foot parts (step S32). Whether or not the waist and lower limb trajectories can be planned is determined taking movable angles of the joints of the leg parts, torque values of the joint actuators, joint forces, angular speeds, angular accelerations and so forth into consideration. Naturally, when an external force is applied, a moment error may be eliminated by a legged motion not over a next one step but over several steps.

At this time, if planning of the foot parts is possible, then walking or some other legged motion is continued (step S33).

On the other hand, if planning of the foot parts is impossible because the external force or external moment applied to the body is excessively high, then the legged mobile robot 100 starts a tumbling motion (step S34).

In such a legged robot of the uprightly walking type as shown in FIGS. 1 and 2, since the position of the center of gravity is high, if the robot inadvertently drops onto the floor upon tumbling, then there is the possibility that critical damage may be applied to the robot itself or to the other party side with which the robot collides by the tumbling.

Therefore, in the present embodiment, the posture of the robot is changed over from that of the trajectory of the body planned in advance before the tumbling to a posture with which the ZMP support polygon is minimized to execute a predetermined tumbling motion. Basically, a tumbling operation is searched based on the following two policies.
(1) To minimize the variation amount $\Delta S/\Delta t$ of the area S of the support polygon of the body per time t.
(2) To maximize the support polygon when the body drops onto the floor.

Here, to minimize the variation amount $\Delta S/\Delta t$ corresponds to keeping (or reducing) the supporting area upon tumbling (however, in order to reduce the supporting area, driving force is sometimes required). By keeping the supporting area upon tumbling of the body, the impact moment to be applied to the body can be warded off. FIG. 14 illustrates a principle of keeping the supporting area upon tumbling of the body. As seen in FIG. 14, the body wards off the impact moment while the supporting face keeps a minimum area just as in a manner wherein a ball rolls. As seen from FIG. 14, even if the supporting face moves, a similar effect is obtained. For example, if an impact force acting upon the body from the floor when the body is landed onto the floor (contacting to the floor) is determined and the determined impact force exceeds a tolerance, then a tumbling method wherein the body rolls in such a manner that the area of the support polygon is kept fixed is preferably applied.

Meanwhile, to maximize the support polygon when the body drops onto the floor corresponds to that the impact force is damped by receiving the impact force with a large support polygon as seen in FIG. 15. For example, if an impact force acting upon the body from the floor when the body is landed onto the floor is determined and the determined impact force remains within a tolerance, then the tumbling method wherein the body rolls in such a manner that the area of the support polygon is kept fixed is preferably applied.

Figure 16:
FIG. 16 is a view illustrating a motion of maintaining the supporting area upon tumbling when the legged mobile robot 100 tumbles rearwardly to be a supine posture.
Figure 17:
FIG. 17 is a view illustrating the motion of maintaining the supporting area upon tumbling when the legged mobile robot 100 tumbles rearwardly to be a supine posture.

FIGS. 16 and 17 illustrate an example wherein, when the legged mobile robot 100 tumbles rearwardly toward a supine posture, a motion for minimizing the variation amount $\Delta S/\Delta t$ of the support polygon, that is, a motion for keeping the supporting area upon tumbling, is realized. The motion is similar to ukemi in judo or other combat sports and can suitably ward off the impact force moment upon tumbling. The variation amount $\Delta S/\Delta t$ of the support polygon is minimized by moving the foot parts away from the floor as seen in FIG. 17. Where the center of gravity of the body exists in the waist portion, the ZMP can be set to a location at which the number of links which do not relate to the minimized support polygon is maximum. After such tumbling and landing motions as described above, all of those links which can be taken off from the floor are taken off from the floor. In particular, in the example shown, both of the lower limbs and the trunk are raised to take off the upper half of the body and the lower limbs from the floor simultaneously while the foot parts, hand parts and so forth are landed onto the floor. By this, a comparatively small landed polygon (contacting polygon) can be formed by a comparatively small number of steps. Consequently, an efficient standing up operation can be realized at a high speed.

Figure 18:
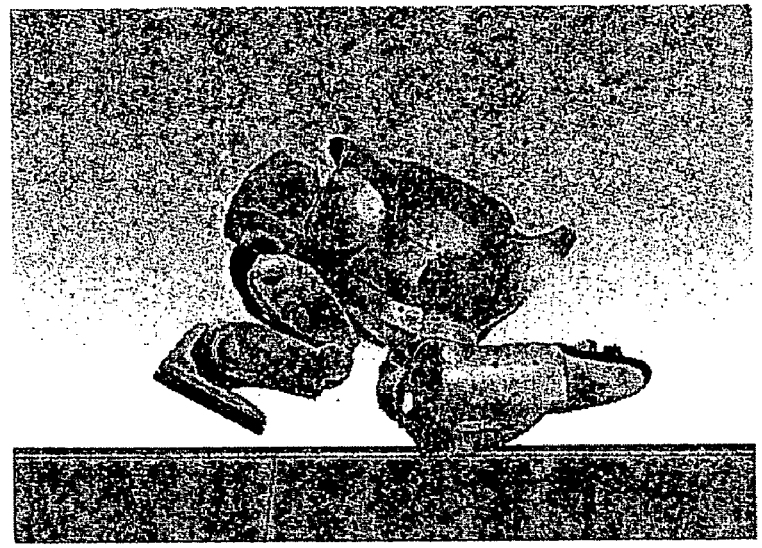
FIG. 18 is a view illustrating a motion of maintaining the supporting area upon tumbling when the legged mobile robot 100 tumbles forwardly to be a prone posture.
Figure 19:
FIG. 19 is a view illustrating the motion of maintaining the supporting area upon tumbling when the legged mobile robot 100 tumbles forwardly to be a prone posture.

FIGS. 18 and 19 illustrate a manner wherein an example which realizes, when the legged mobile robot 100 tumbles forwardly toward a prone posture, a motion of minimizing the variation amount $\Delta S/\Delta t$ of the support polygon, that is, a motion of keeping the supporting area upon tumbling, is viewed from sideward and from obliquely rightwardly forward, respectively. This is a motion similar to a forward rolling motion in apparatus gymnastics or the like, and can suitably ward off the impact force moment upon tumbling. The variation amount $\Delta S/\Delta t$ of the support polygon is minimized by taking off the foot parts from the floor as seen from FIGS. 18 and 19.

By taking such tumbling methods as described above, the impact acting upon the body from the floor when the body drops onto the floor can be dispersed to the whole body thereby to suppress the damage to the minimum.

Figure 20:
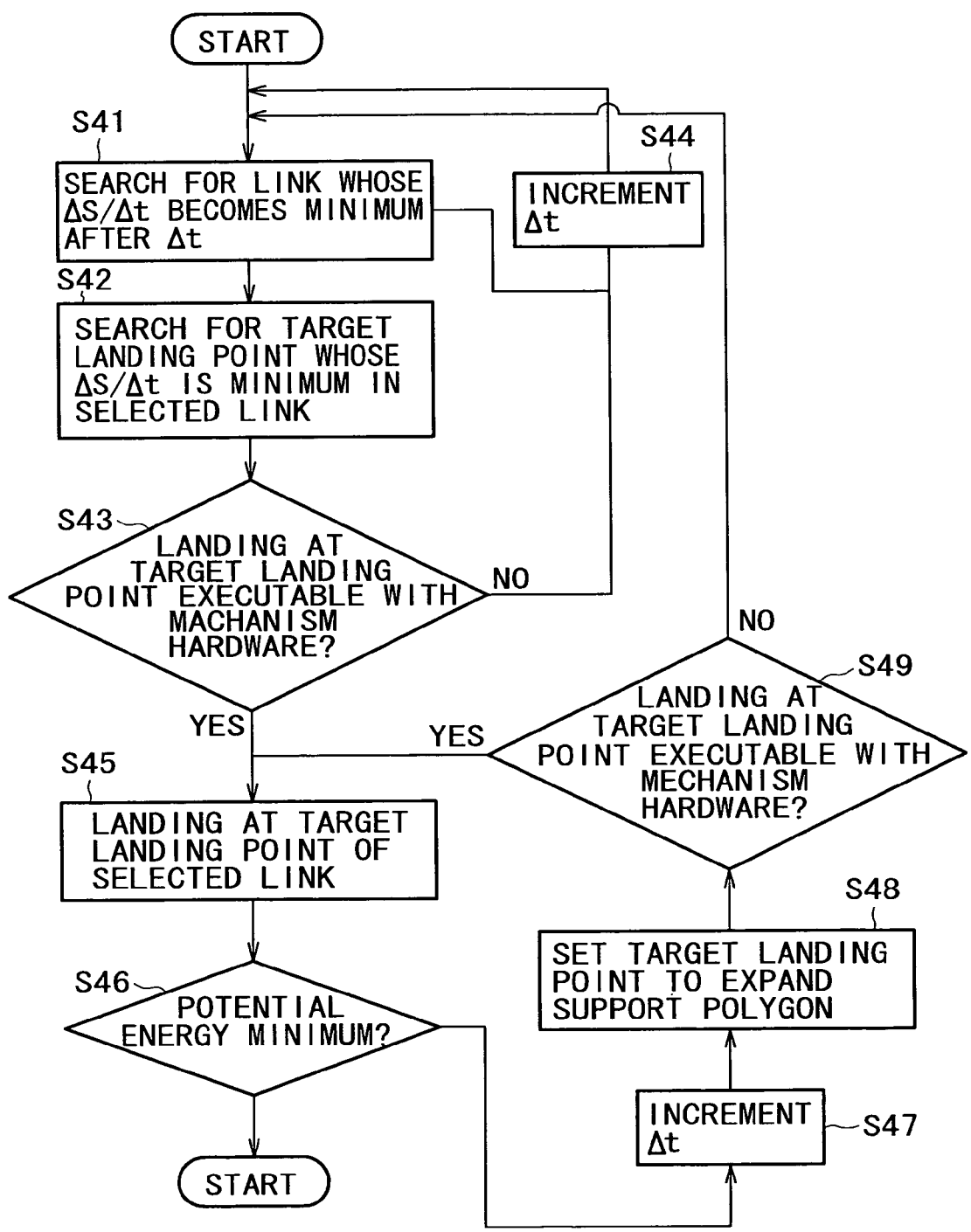
FIG. 20 is a flow chart illustrating a processing procedure of the legged mobile robot 100 according to the present embodiment for performing a tumbling motion because the foot parts are unplannable.

FIG. 20 illustrates, in the form of a flow chart, a processing procedure when the legged mobile robot 100 according to the present embodiment performs a tumbling operation because planning for the foot parts is impossible. A tumbling operation is realized through synchronous and cooperative driving of the shoulder joint pitch axes 4, trunk pitch axis 9, hip joint pitch axes 12 and knee pitch axes 14, which are connected in the heightwise direction, in accordance with the basic policies described above. Such a processing procedure is realized actually by executing a predetermined body motion control program by means of the main control section 81 to control driving of the components.

First, a link which minimizes the variation amount $\Delta S/\Delta t$ of the area S of the support polygon of the body per time t is searched for (step S41).

Then, a target landing point (target contacting point) of the link selected at step S41 which minimizes the variation amount $\Delta S/\Delta t$ is searched for (step S42). Where the supporting area of the body with respect to the floor is kept minimized, the impact moment can be warded off (refer to the foregoing description and FIG. 14).

Then, it is determined principally based on the impact force moment whether or not it can be executed to land the link selected at the preceding step at the target landing point from restrictions of hardware of the body (such as movable angles of the joints, torque values of the joint actuators, joint forces, angular speeds, angular accelerations and so forth) (step S43).

If it is determined impossible to land the link selected at the preceding step at the target landing point, then the variation amount Δt of the time is incremented by a predetermined value (step S44), and then the processing returns to step S41 to perform re-selection of a link and re-setting of a target landing point of the link.

On the other hand, if it is possible to land the link selected at the preceding step at the target landing point, then the selected link is landed at the target landing point (step S45).

Then, it is determined whether or not the potential energy of the body is minimum, that is, the tumbling motion is completed (step S46).

If the position energy of the body is not minimum as yet, then the variation amount Δt of time is further incremented by the predetermined value (step S47), and a next target landing point is set so that the support polygon man be expanded (step S48). Where the support polygon is expanded, the impact force acting upon the body upon landing onto the floor can be reduced (refer to the foregoing description and FIG. 15).

Then, it is determined principally based on the impact force whether or not it can be executed to land the selected link at the target landing point from restrictions of hardware of the body (such as movable angles of the joints, torque values of the joint actuators, joint forces, angular speeds, angular accelerations and so forth) (step S49).

If it is determined impossible to land the link selected at the preceding step at the target landing point, then the processing returns to step S41 to perform re-selection of a link and re-setting of a target landing point of the link.

On the other hand, if it is possible to land the link selected at the preceding step at the target landing point, then the processing advances to step S45, at which the selected link is landed at the target landing point.

Then, if the potential energy of the body is minimum (step S46), then since the landing of the body onto the floor is completed, the entire processing routine is ended.

Now, a tumbling operation of the legged mobile robot 100 is described with reference to a motion of the actual machine.

Figure 21:
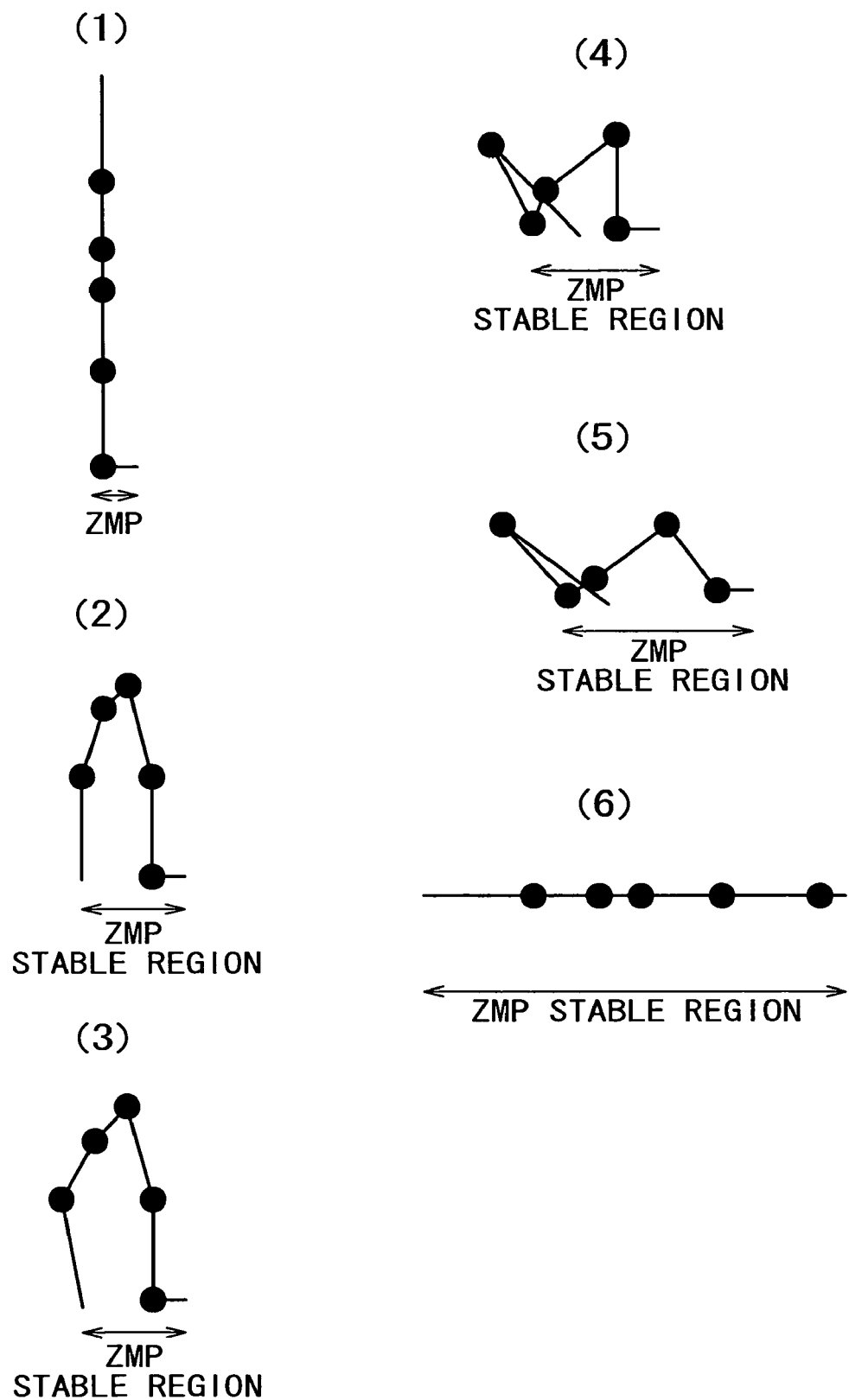
FIG. 21 is a view illustrating motions of the legged mobile robot 100 when, where it is modeled as a link structure including a plurality of substantially parallel axes connected in a vertical direction such as a shoulder joint pitch axis 4, a trunk pitch axis 9, a hip joint pitch axis 12 and a knee joint pitch axis 14, it tumbles to be a supine posture with the joint pitch axes driven synchronously and cooperatively.
Figure 22:
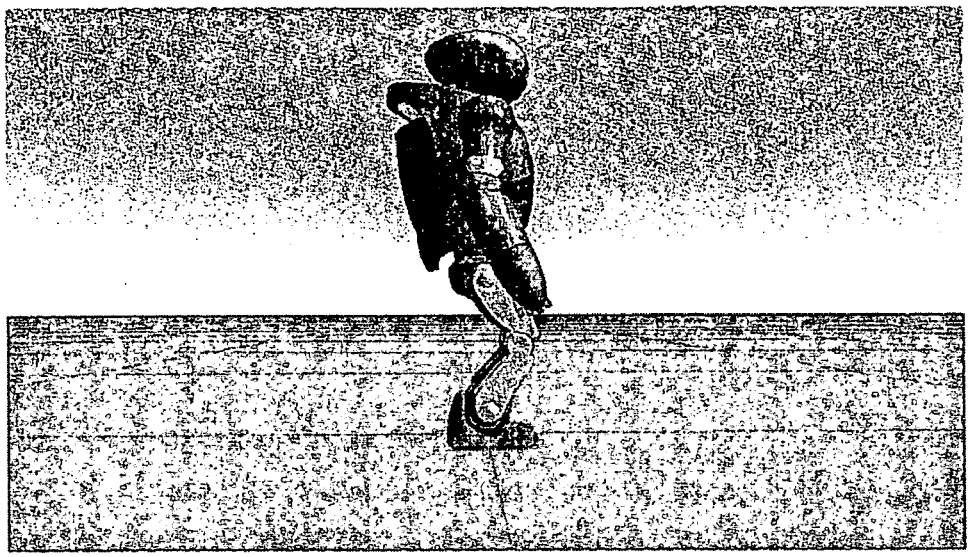
FIGS. 22 to 38 are side elevational views illustrating a manner wherein the legged mobile robot 100 tumbles from its standing posture into a supine posture.
Figure 23:
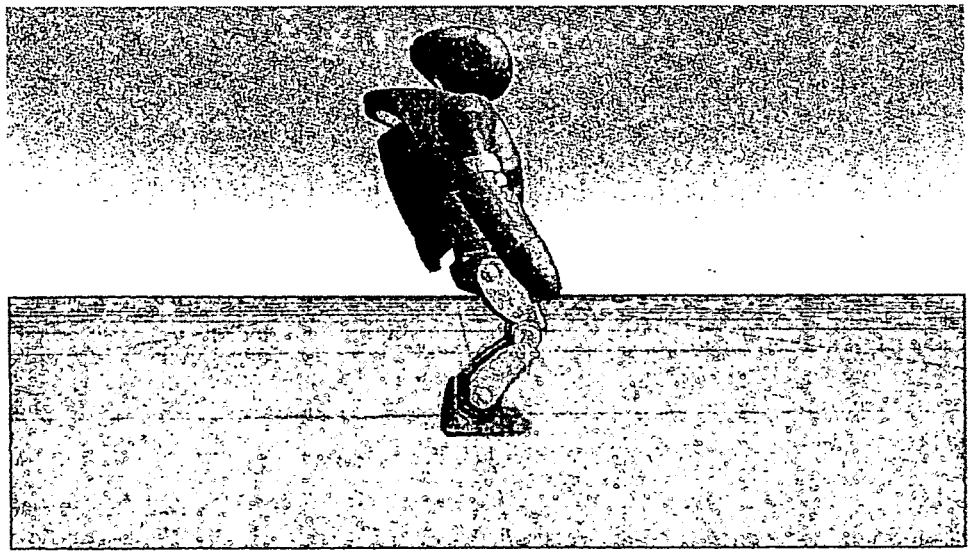
Figure 24:
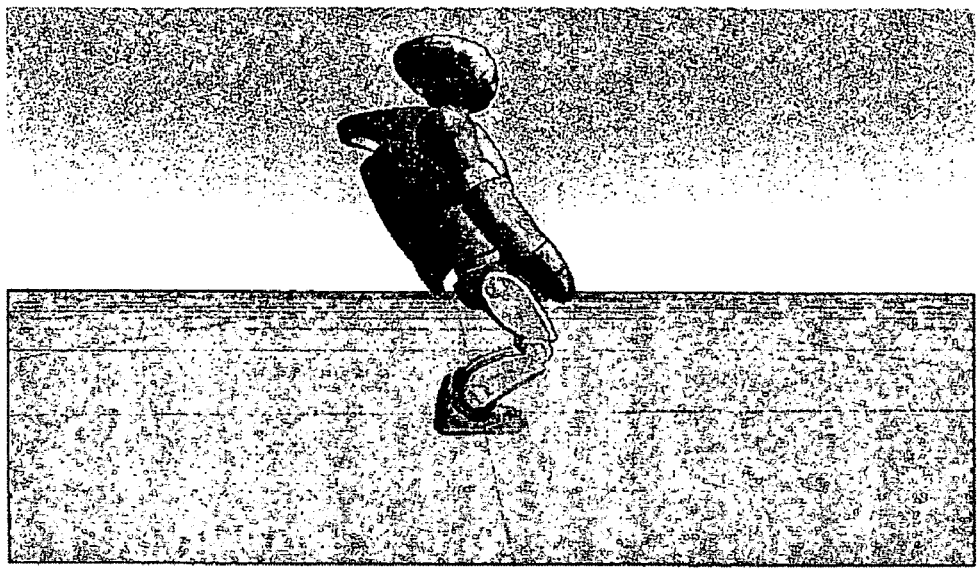
Figure 25:
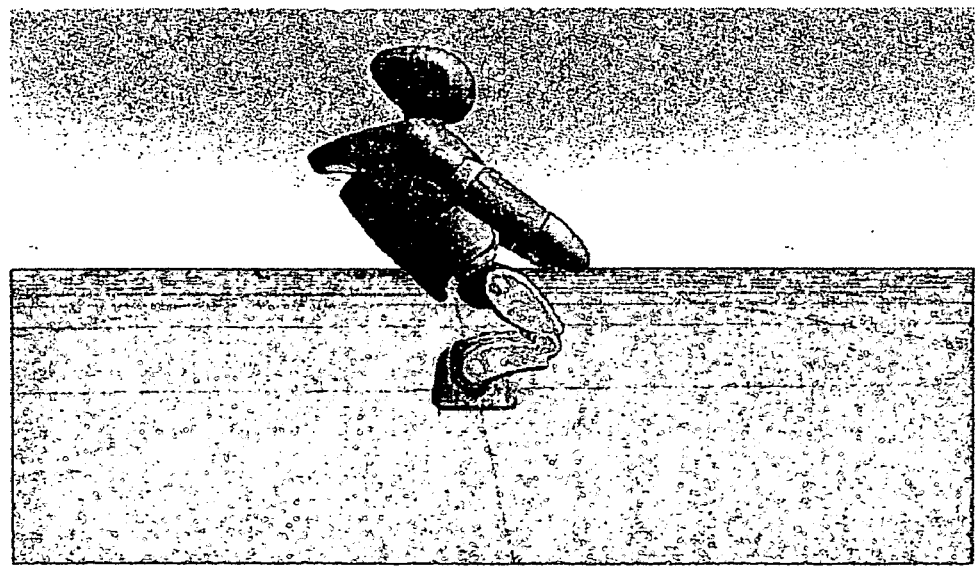
Figure 26:
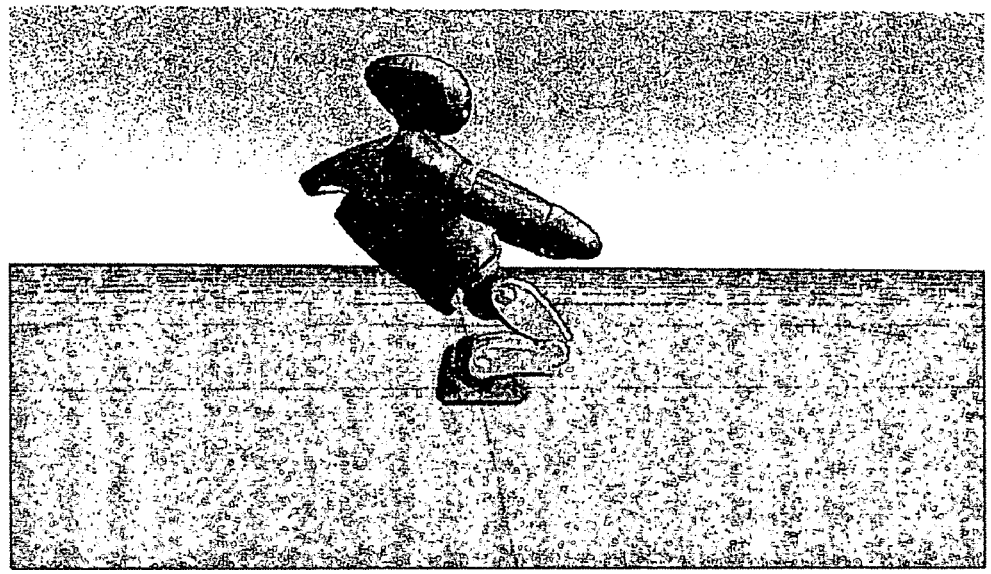
Figure 27:
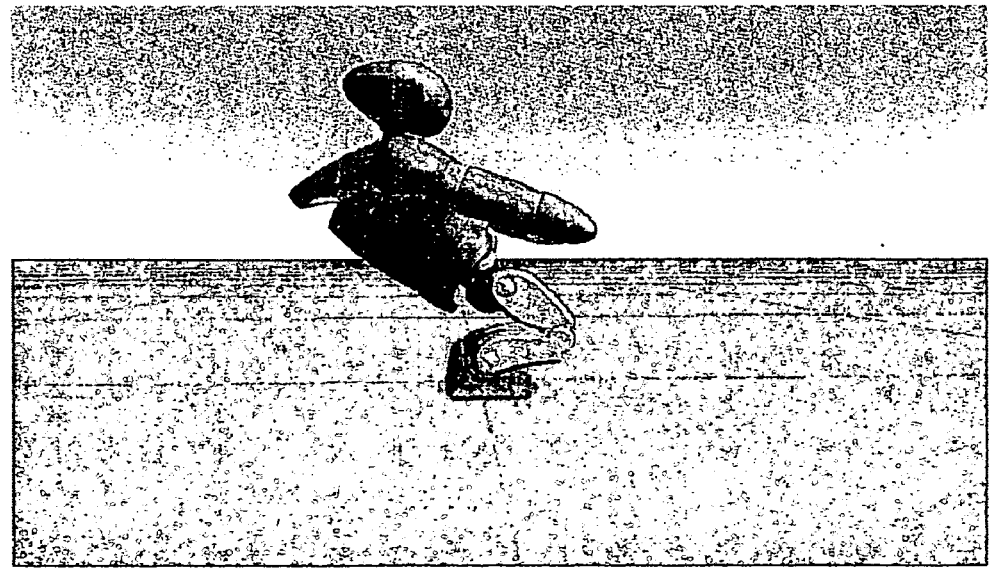
Figure 28:
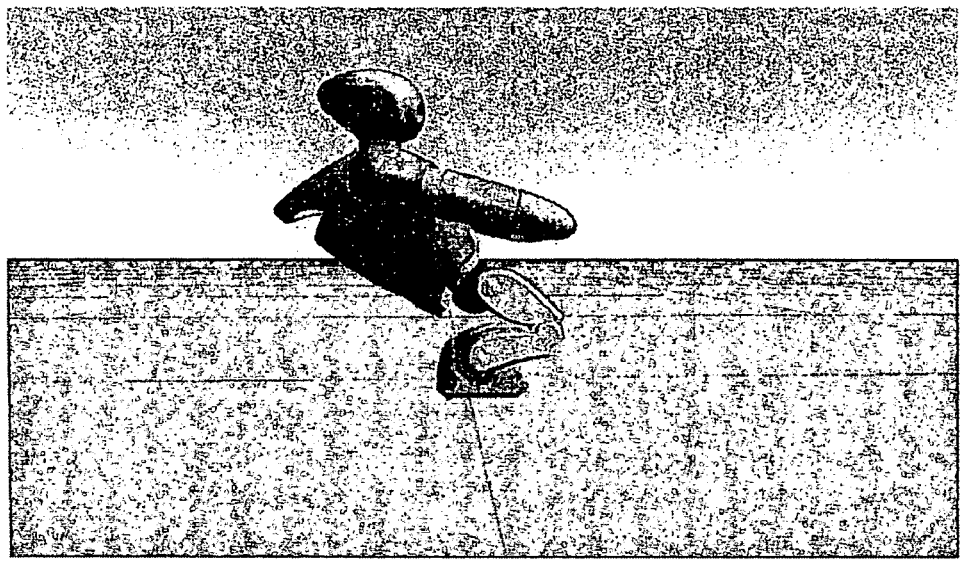
Figure 29:
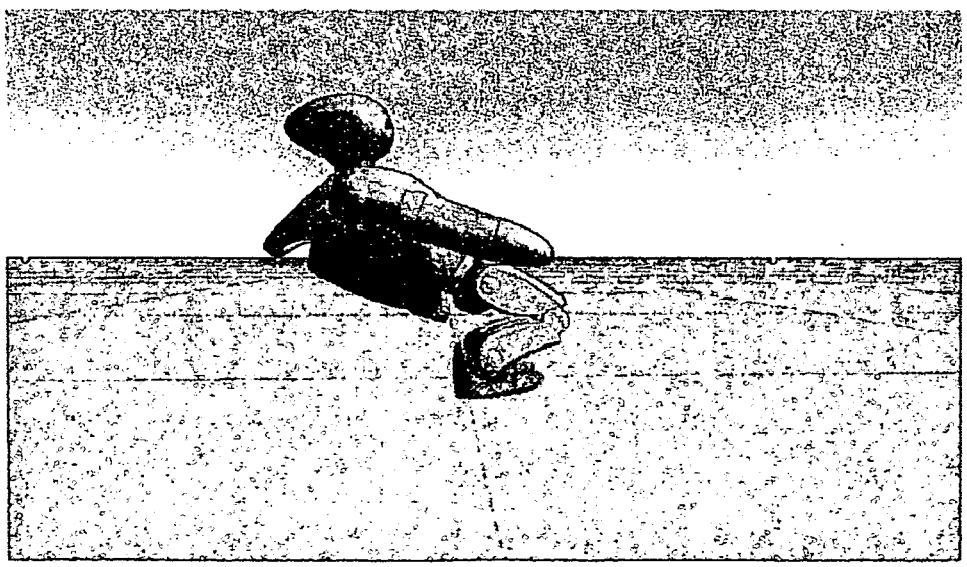
Figure 30:
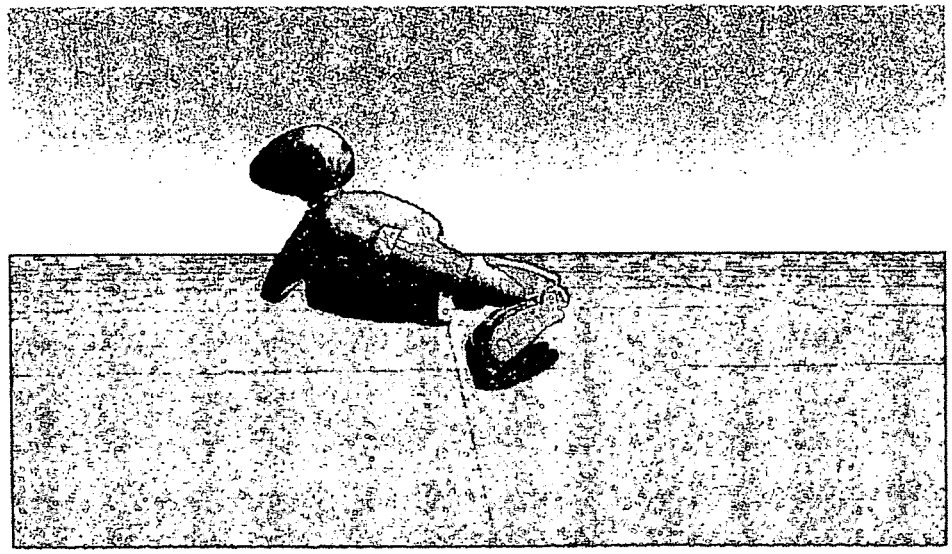
Figure 31:
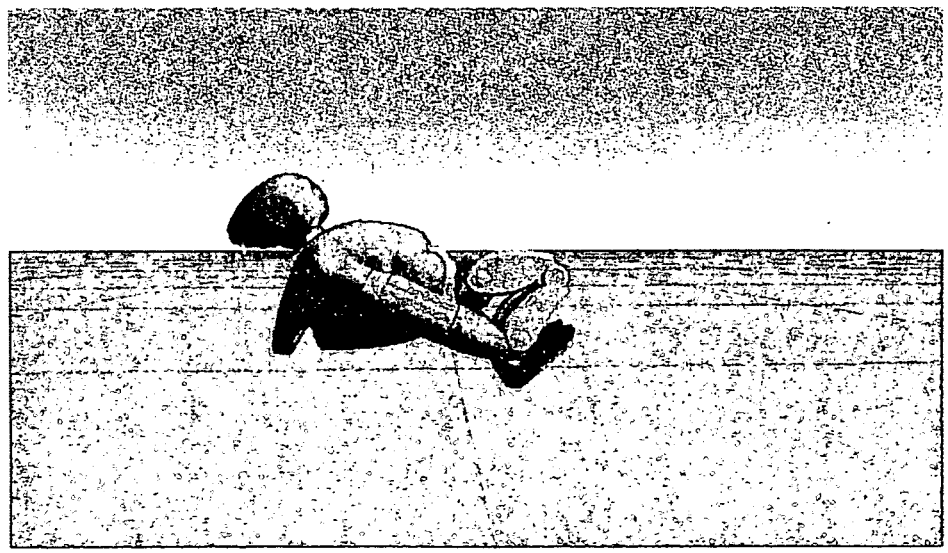
Figure 32:
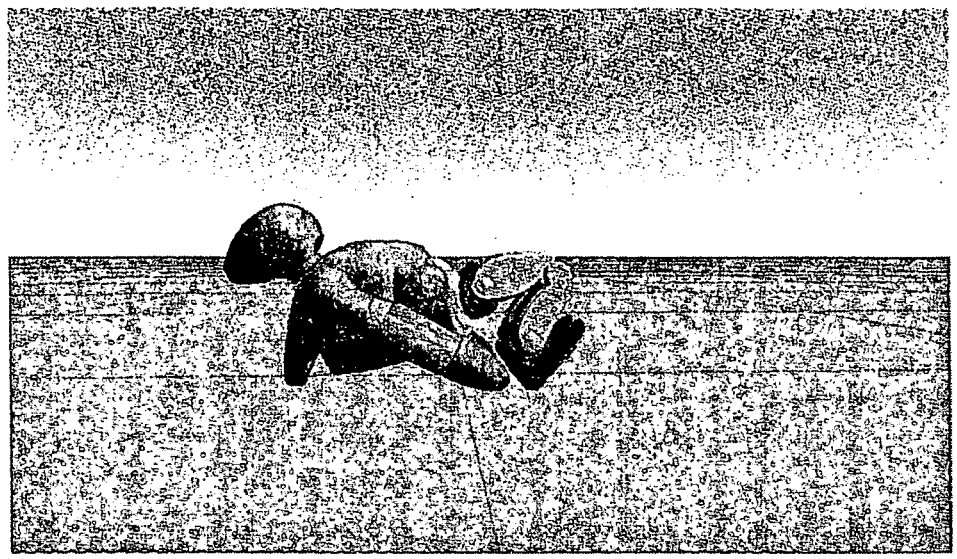
Figure 33:
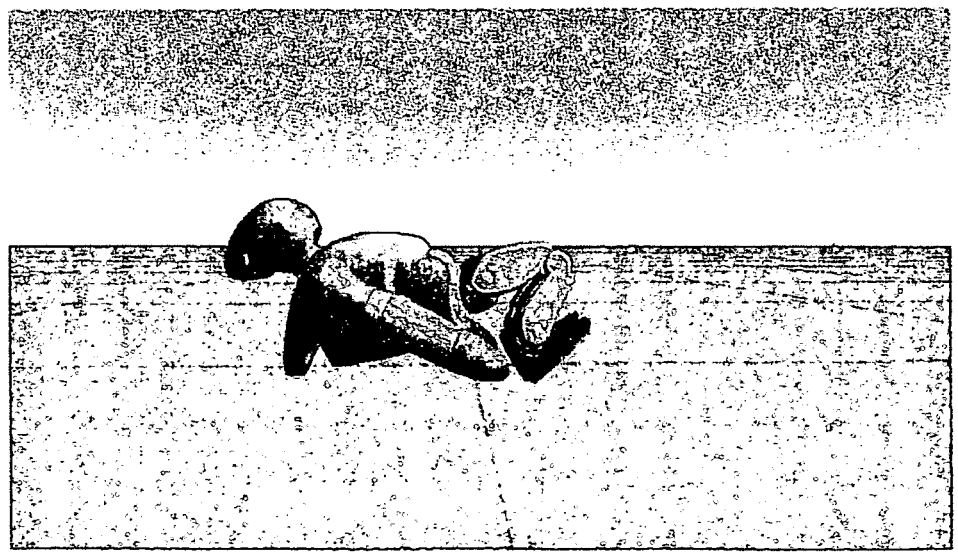
Figure 34:
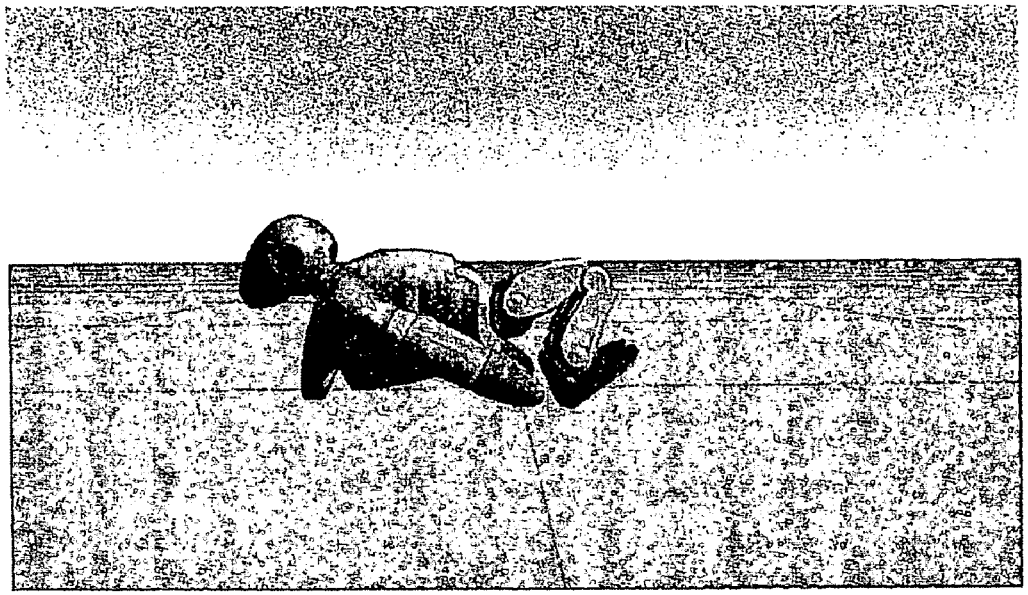
Figure 35:
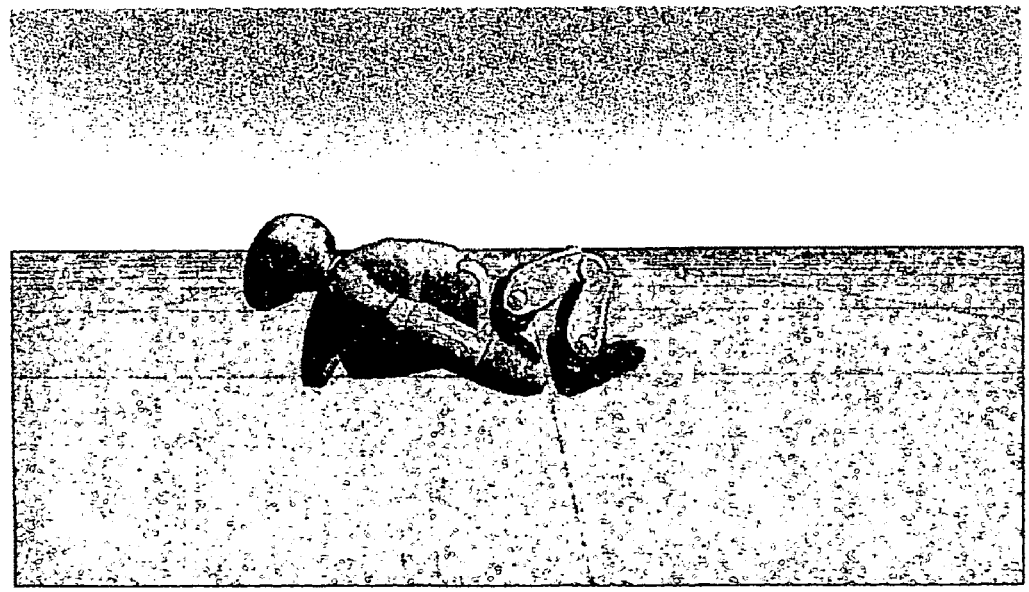
Figure 36:
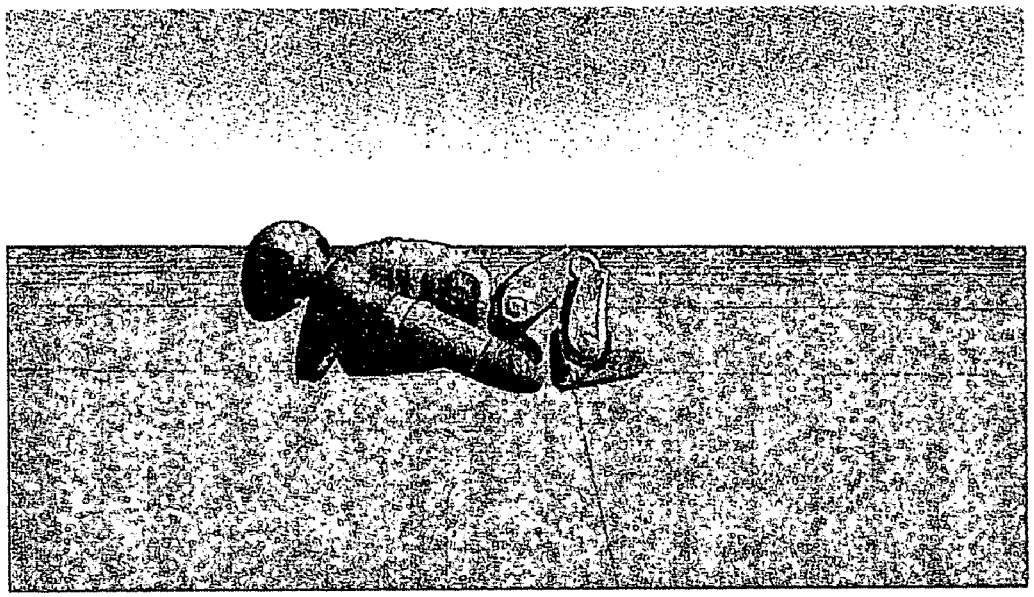
Figure 37:
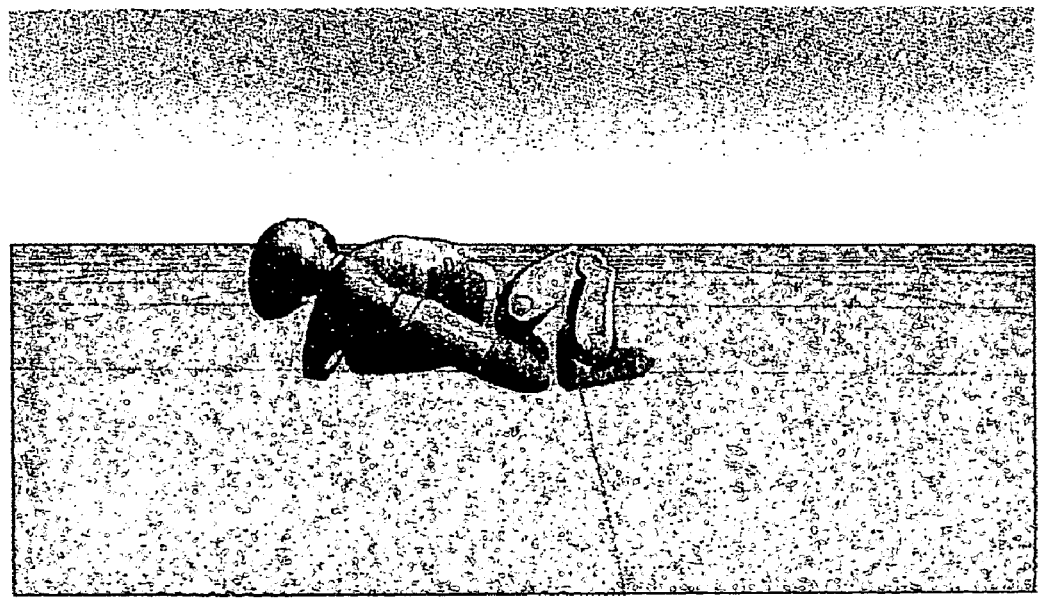
Figure 38:
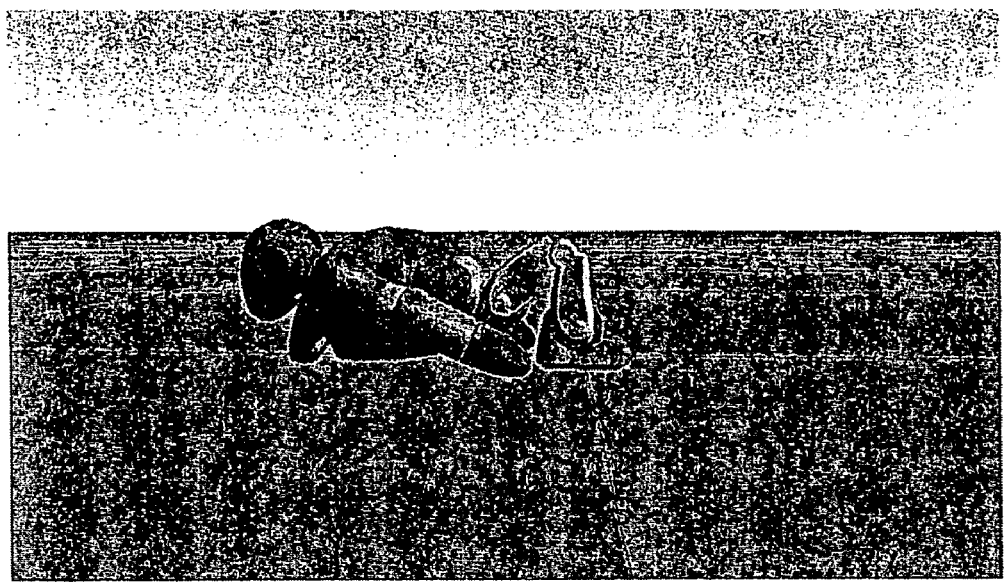
Figure 39:
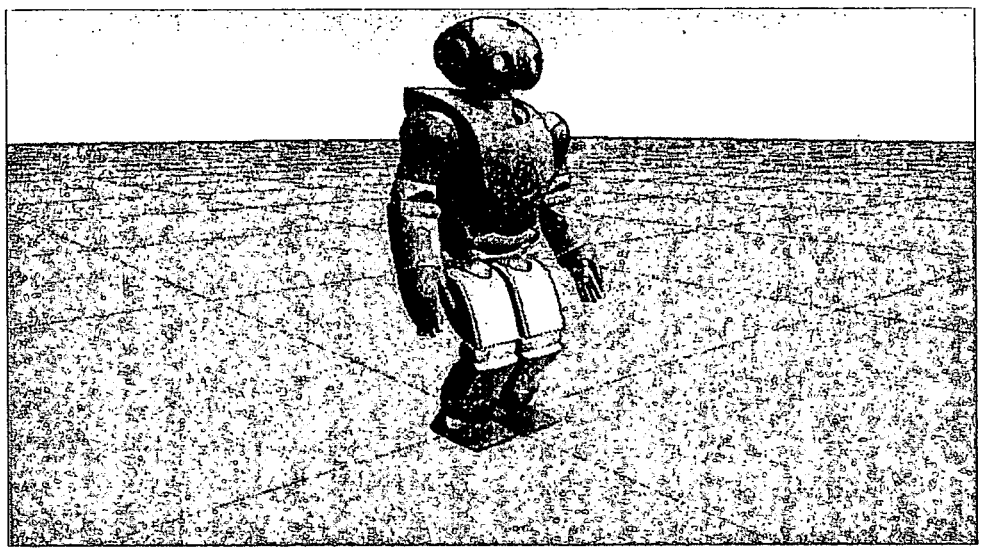
Figure 40:
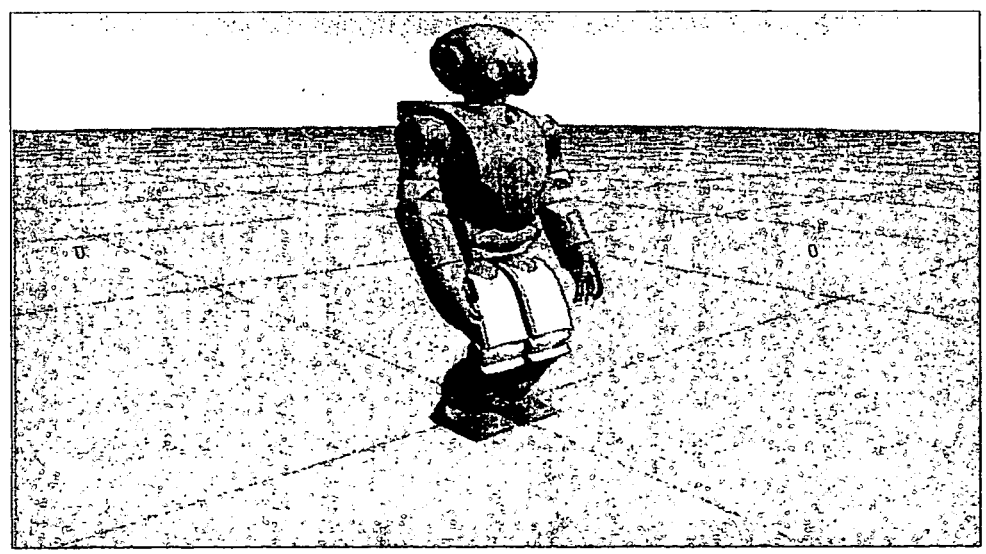
Figure 45:
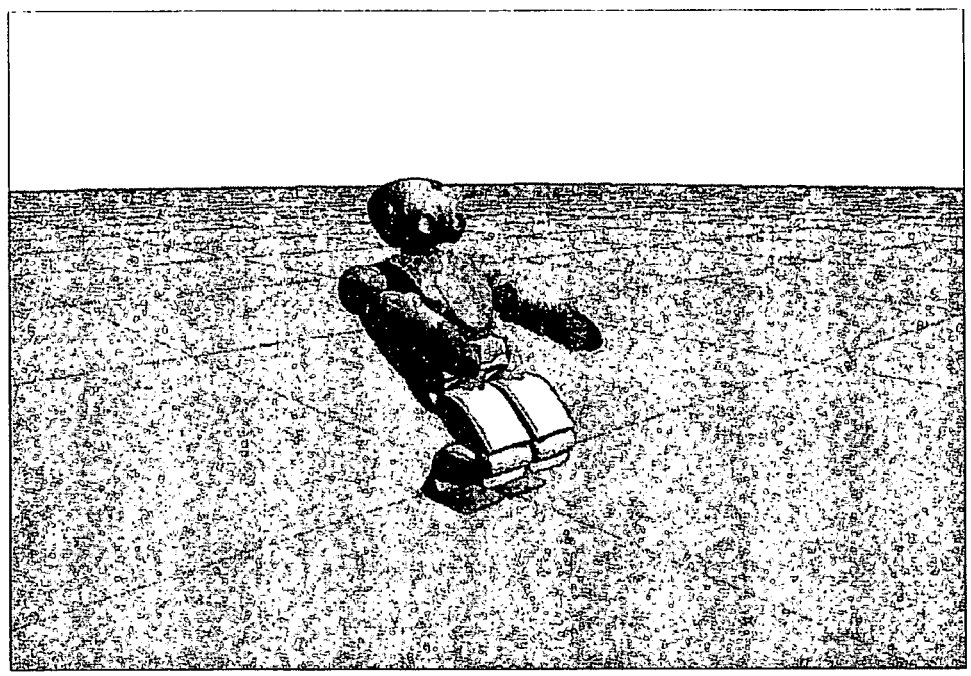
Figure 46:
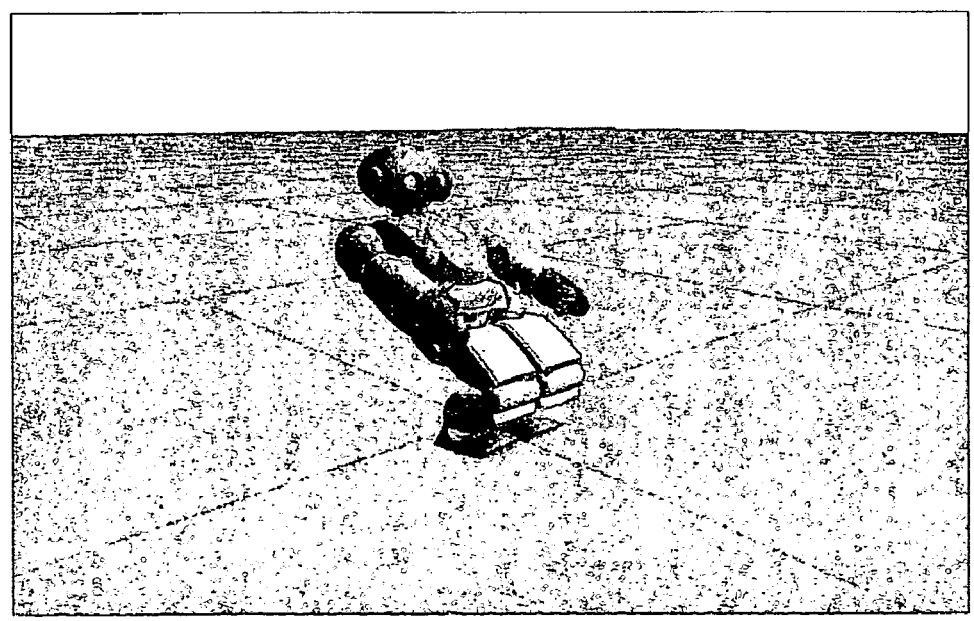
Figure 47:
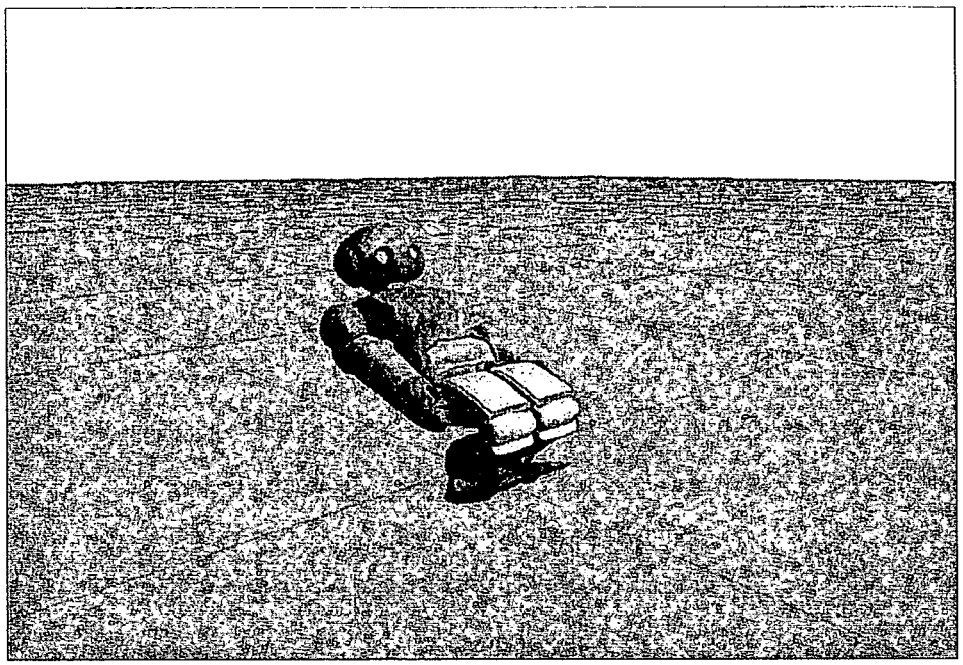
Figure 48:
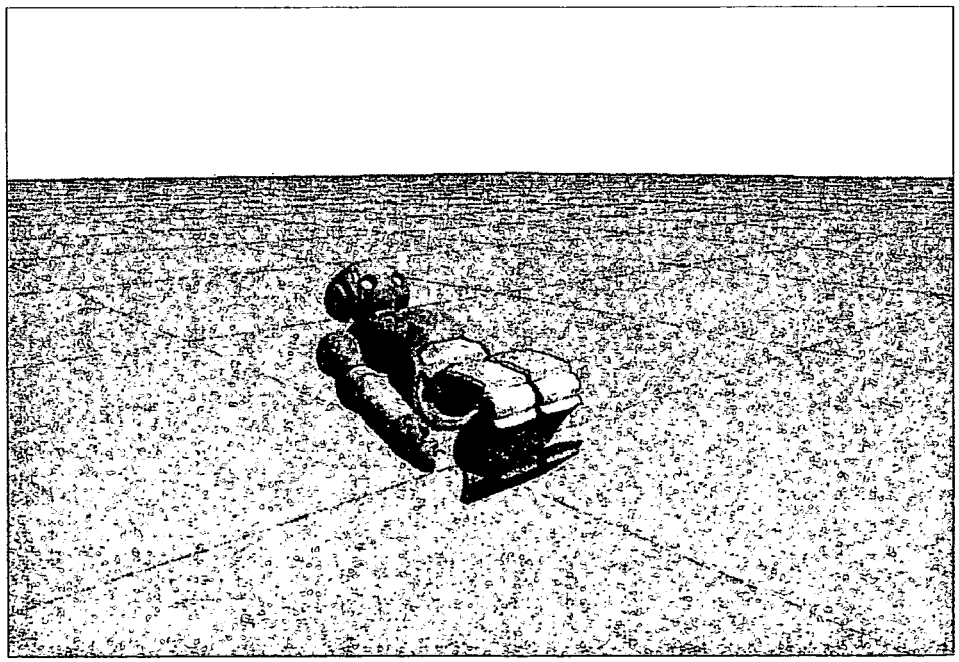
Figure 49:
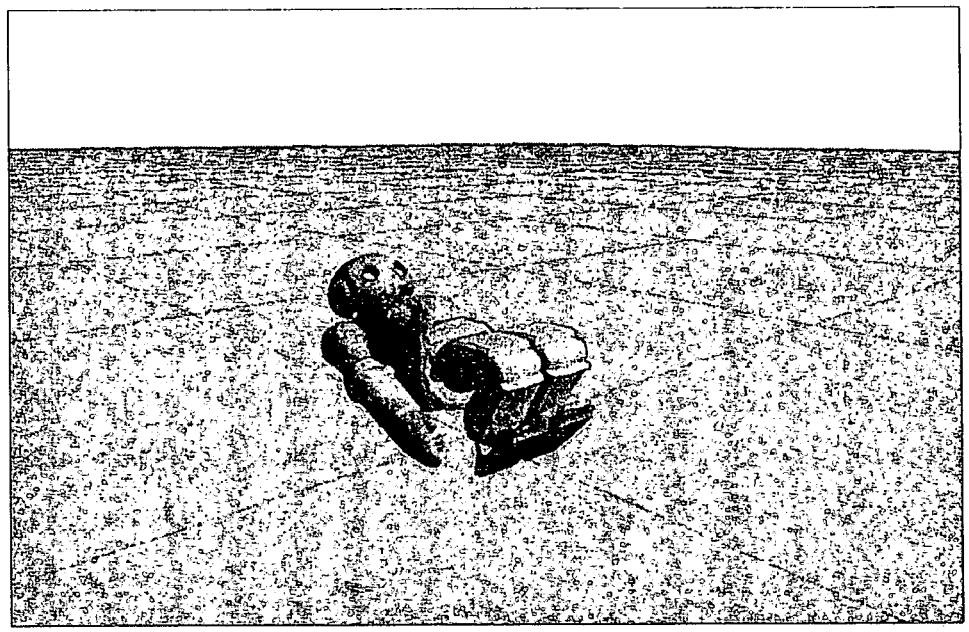
Figure 50:
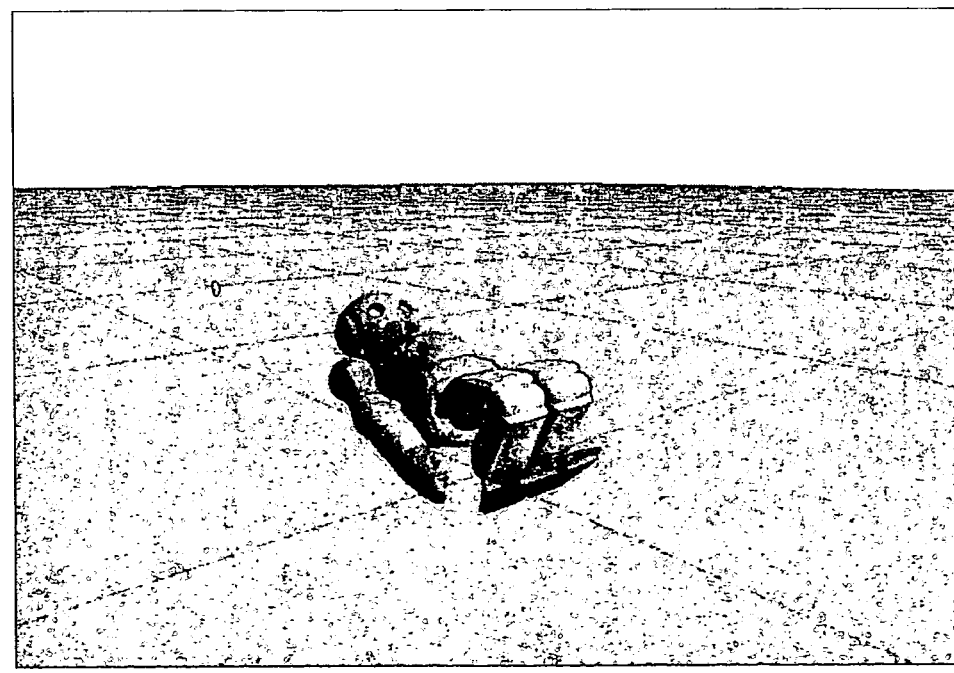
Figure 51:
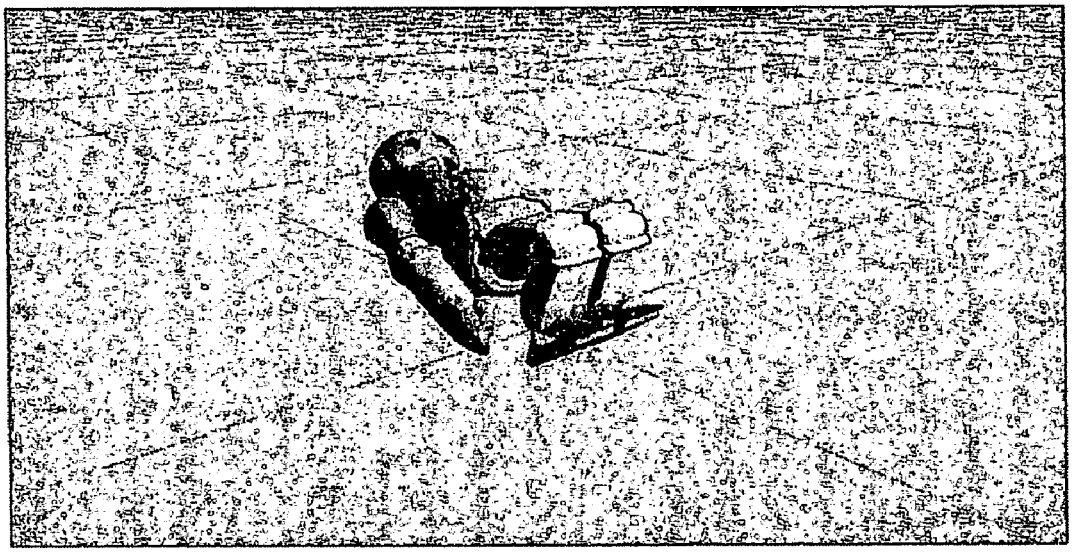
Figure 52:
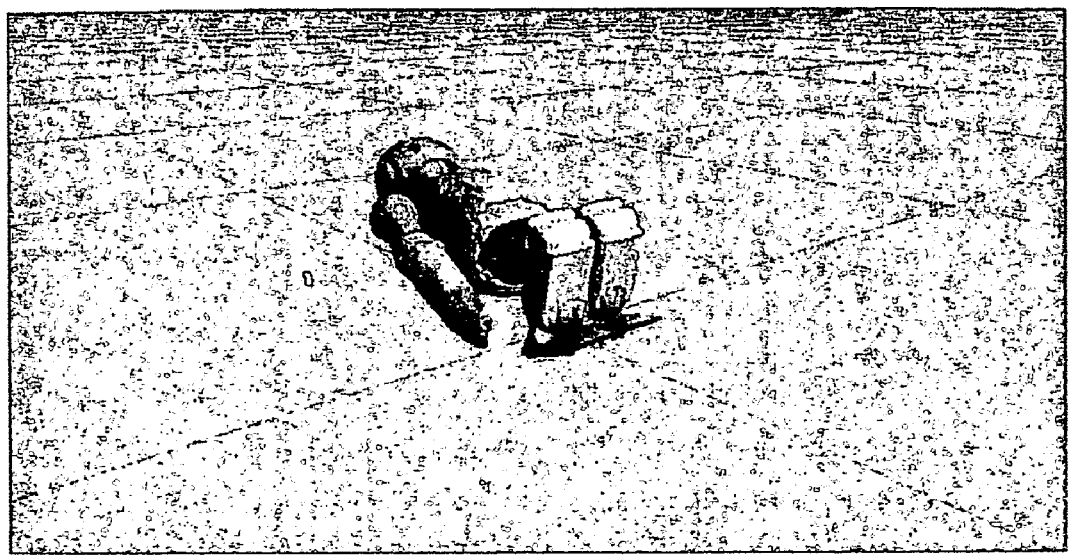
Figure 53:
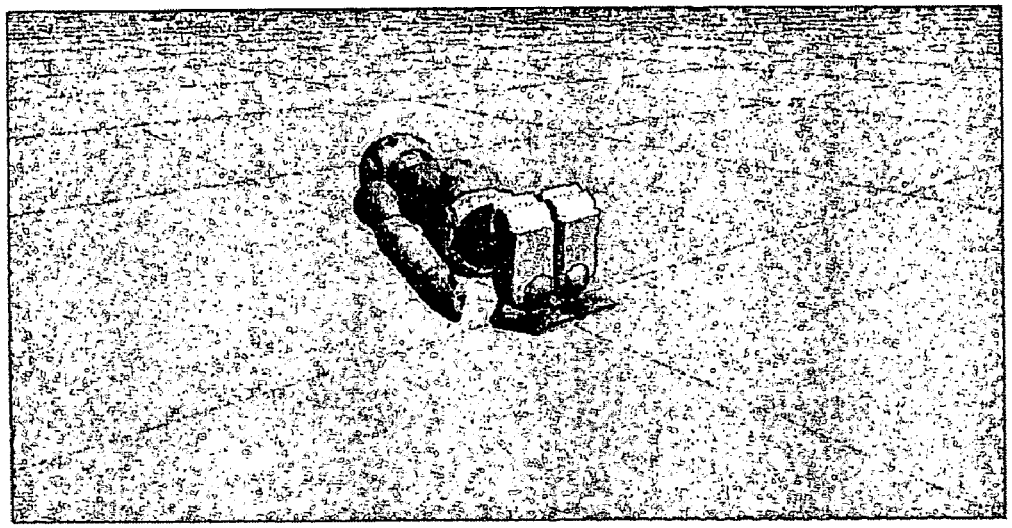
Figure 54:
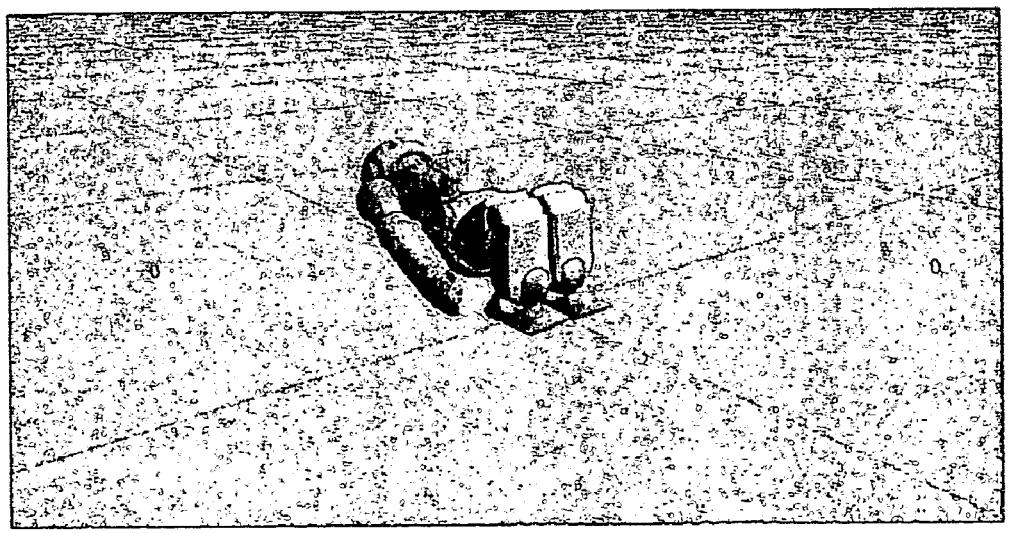
Figure 55:
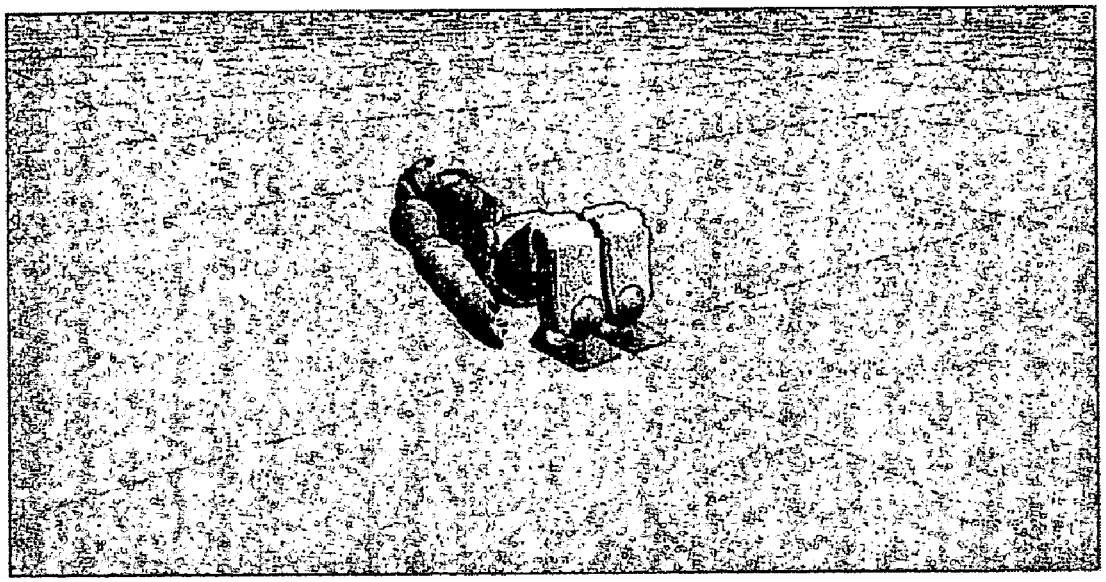

FIG. 21 illustrates a motion when the legged mobile robot 100, which is modeled as a link structure including a plurality of substantially parallel joint axes connected to each other in the heightwise direction such as a shoulder joint pitch axis 4, the trunk pitch axis 9, a hip joint pitch axis 12 and a knee pitch axis 14, tumbles toward a supine posture through synchronous and cooperative driving of the joint pitch axes. Basically, the impact force acting upon the body from the floor is reduced by setting the target to a location at which a link which maximizes the number of non-landed link (non-contacting to the floor) is present.

It is assumed that the robot stands only with the sole which is a link end of the link structure ((1) of FIG. 21).

It is assumed that, at this time, because an external force or external force moment is applied, the moment error term T of the ZMP balance equations cannot be canceled any more and the ZMP is moved away from a ZMP stable region which is formed only from the sole. Then, in response to this, a tumbling motion is started while the ZMP is kept within the support polygon.

In the tumbling motion, a link which minimizes the variation amount ΔS/Δt of the area S of the support polygon of the body per time t is searched for, and a target landing point of a hand which minimizes the variation amount ΔS/Δt in the link including the hand is searched for. Then, it is determined whether or not it can be executed to land the selected link at the target landing point from restrictions of hardware of the body (such as movable angles of the joints, torque values of the joint actuators, joint forces, angular speeds, angular accelerations and so forth).

If the landing can be executed with the hardware of the body, then another link is landed in addition to the sole link landed already. Then, the ZMP is moved into a minimum support polygon formed from the landed links (contacting to the floor) ((2) of FIG. 21).

Thereafter, the landing point is moved to expand the support polygon as far as the hardware of the body permits ((3) of FIG. 21).

Then, if it becomes impossible to move the landing point any more from restrictions of hardware of the body such as movable angles of the joints, torque values of the joint actuators, joint forces, angular speeds, angular accelerations and so forth, then it is determined now whether or not it is possible to land a non-landed link sandwiched between the landed links.

If it is possible from the viewpoint of the hardware of the body to land a non-landed link between the landed links, then the intermediate link is landed to increase the landed link number ((4) of FIG. 21).

Further, the landing point is moved to expand the support polygon as far as the hardware of the body permits ((5) of FIG. 21).

Finally, one or more links from one end side of the link structure, which is formed from a plurality of substantially parallel joint axes connected in the heightwise direction, and two or more links from the other end side of the link structure, are taken off from the floor while one or more links positioned intermediately between them are landed and the foot part is landed. Then, in this state, a posture in which the support polygon becomes maximum is formed while the ZMP is kept in the support polygon. If the potential energy of the body is minimum in the posture, then the tumbling motion is completed.

FIGS. 22 to 38 and FIGS. 39 to 55 illustrate a manner wherein the actual machine tumbles from a standing posture to a supine posture.

In this instance, a body link including the hip joint pitch axis is selected as the link which minimizes the variation amount ΔS/Δt of the area S of the support polygon of the body per time t, and a target landing point is searched for and the body is fallen rearwardly (refer to FIGS. 22 to 31 and 39 to 48). The body assumes a posture wherein the knee joints are folded to minimize the variation amount of the support polygon upon landing, that is, minimize ΔS/Δt.

Then, a body link including the trunk pitch axis 9 and the shoulder joint pitch axis 4 is selected as the link which minimizes the variation amount ΔS/Δt of the area S of the support polygon of the body per time t, and a target landing point of the selected link is searched for and the body is fallen rearwardly further deeply. At this time, since the hip joint pitch axis 12 is landed already, the body link including the trunk pitch axis 9 and the shoulder joint pitch axis 4 is pivoted around the hip joint pitch axis 12 and landed onto the floor (refer to FIGS. 32 to 33 and 49 to 50).

Thereafter, a head part link connected by the neck joint pitch axis 2 is selected as the link which minimizes the variation amount ΔS/Δt of the area S of the support polygon of the body per time t, and a target landing point of the selected link is searched for and the body is fallen rearwardly further deeply. At this time, since the neck joint pitch axis 2 is landed already, the head part is pivoted around the neck joint pitch axis 2 and landed onto the floor (refer to FIGS. 34 to 38 and 51 to 55). Since the potential energy of the body in this posture is minimum, the tumbling motion is completed.

Figure 56:
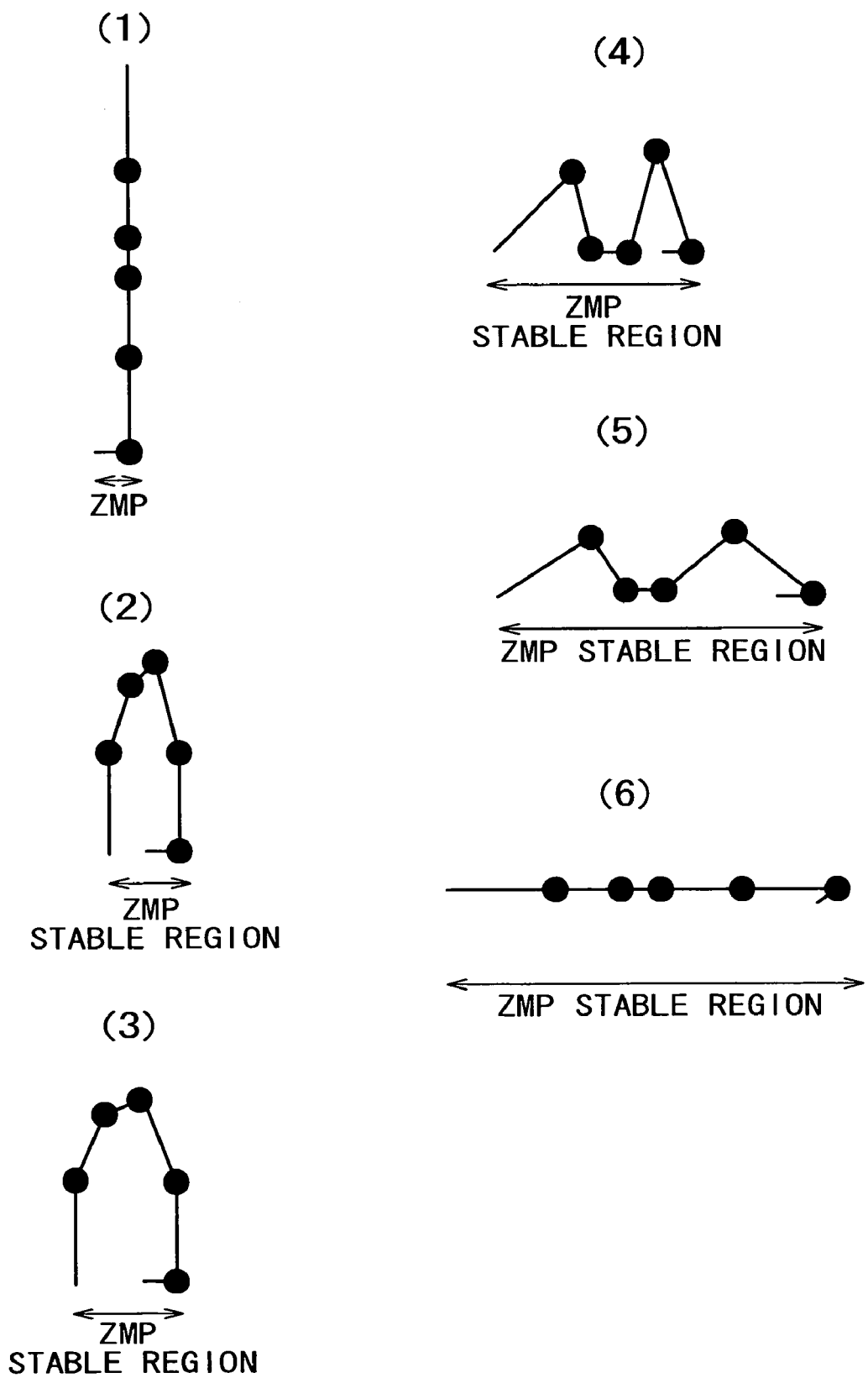
FIG. 56 is a view illustrating motions of the legged mobile robot 100 when, where it is modeled as a link structure including a plurality of substantially parallel axes connected in a vertical direction such as the shoulder joint pitch axis 4, trunk pitch axis 9, hip joint pitch axis 12 and knee joint pitch axis 14, it tumbles to be a prone posture with the joint pitch axes driven synchronously and cooperatively.
Figure 57:
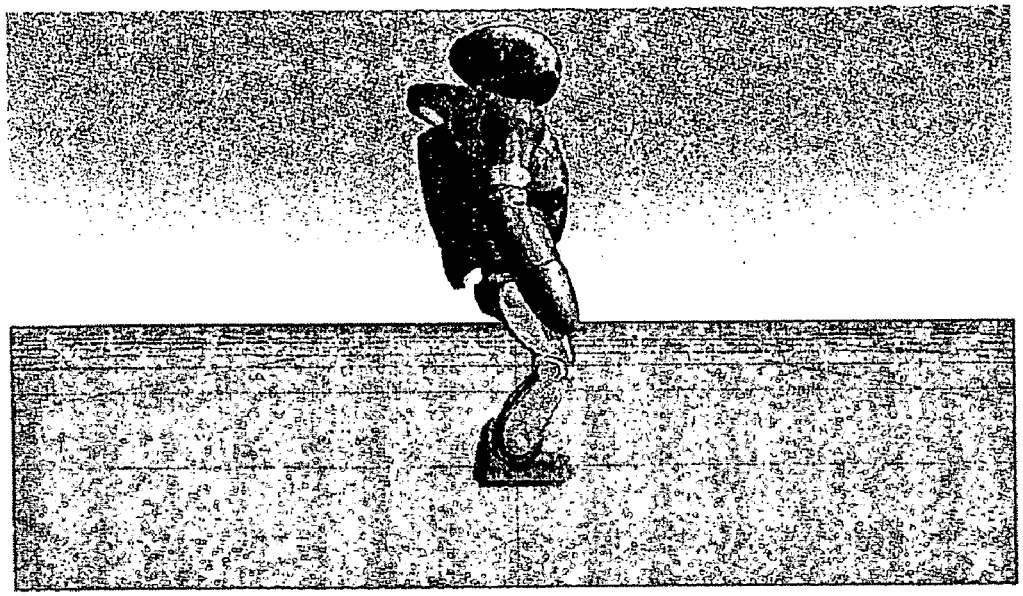
Figure 58:
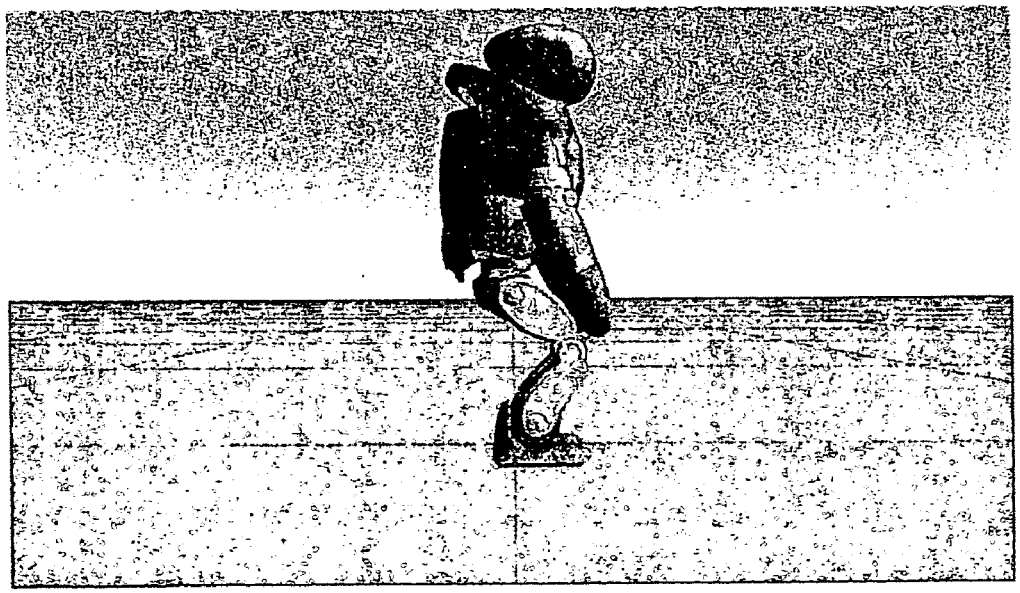
Figure 59:
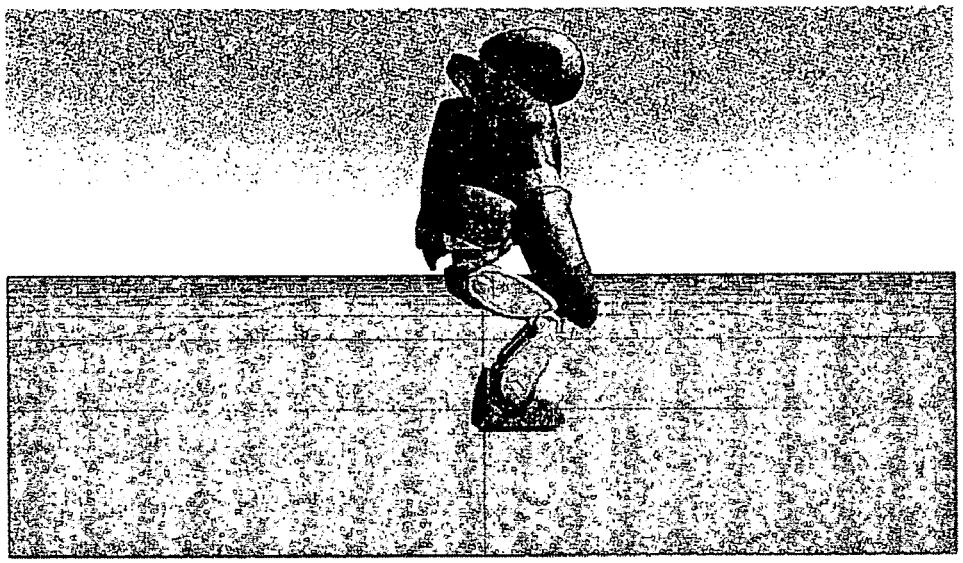
Figure 60:
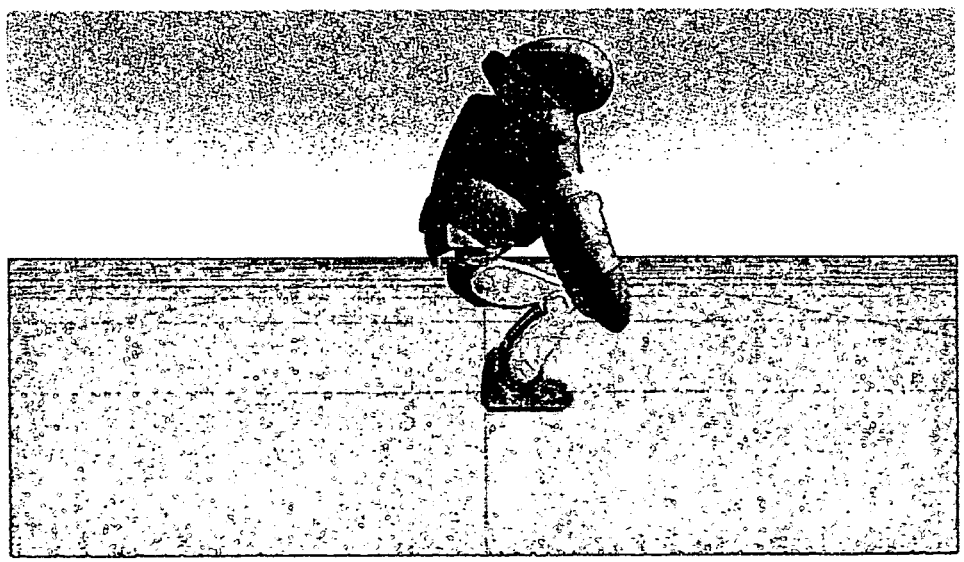
Figure 61:
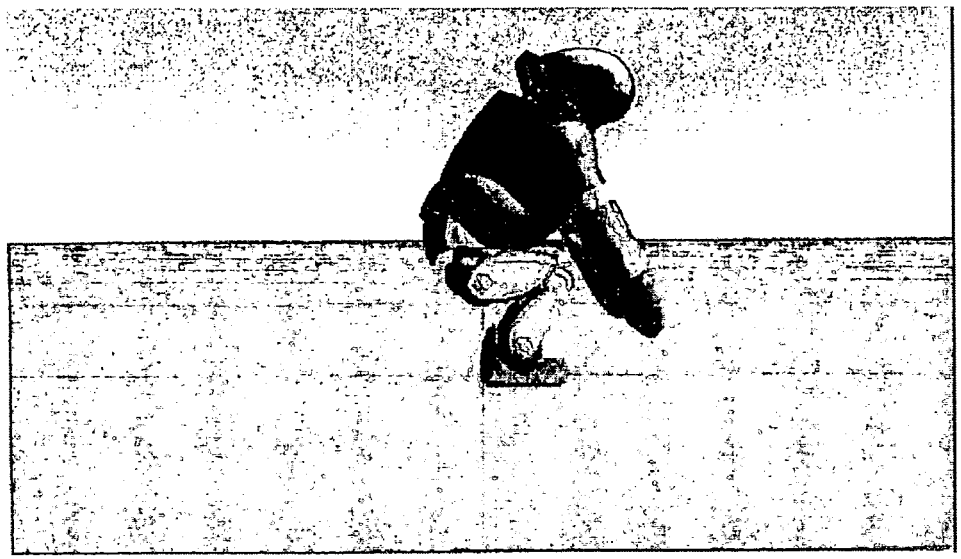
Figure 62:
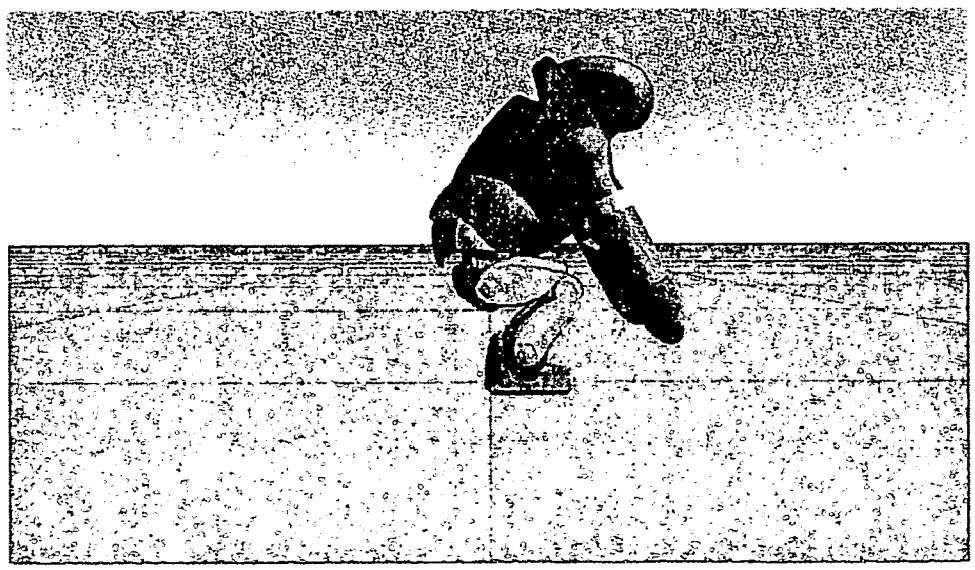
Figure 63:
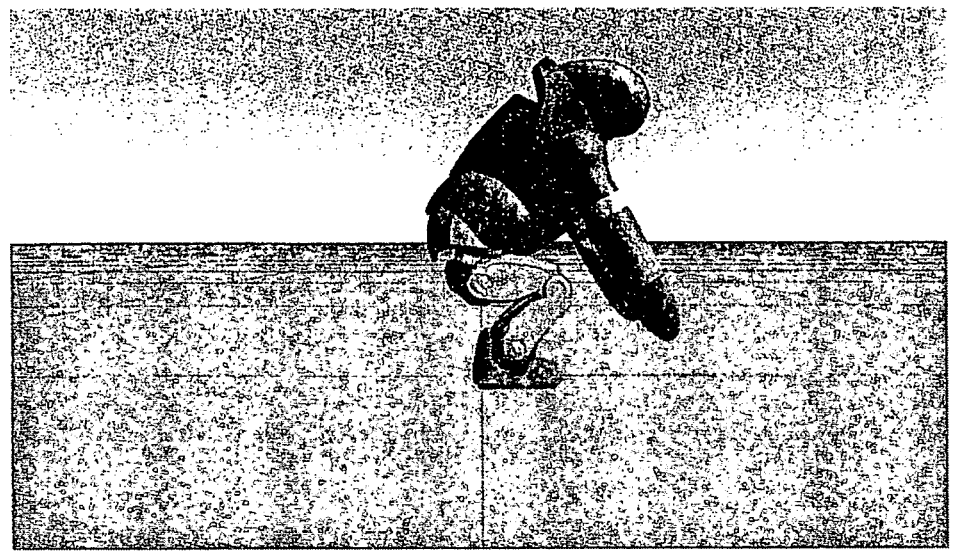
Figure 64:
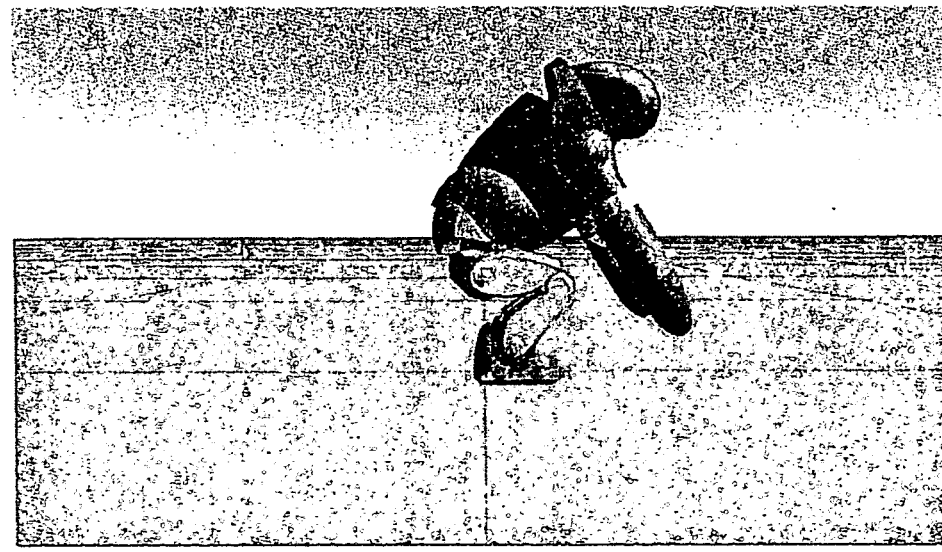
Figure 65:
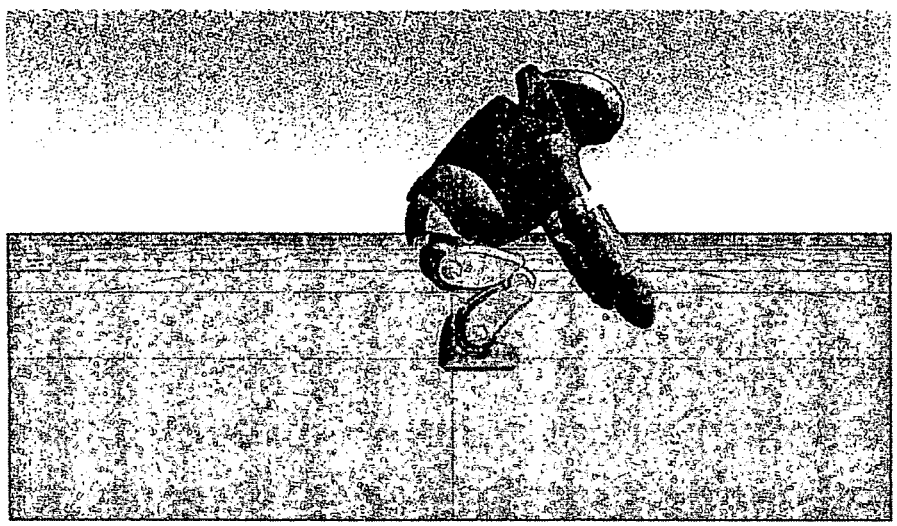
Figure 66:
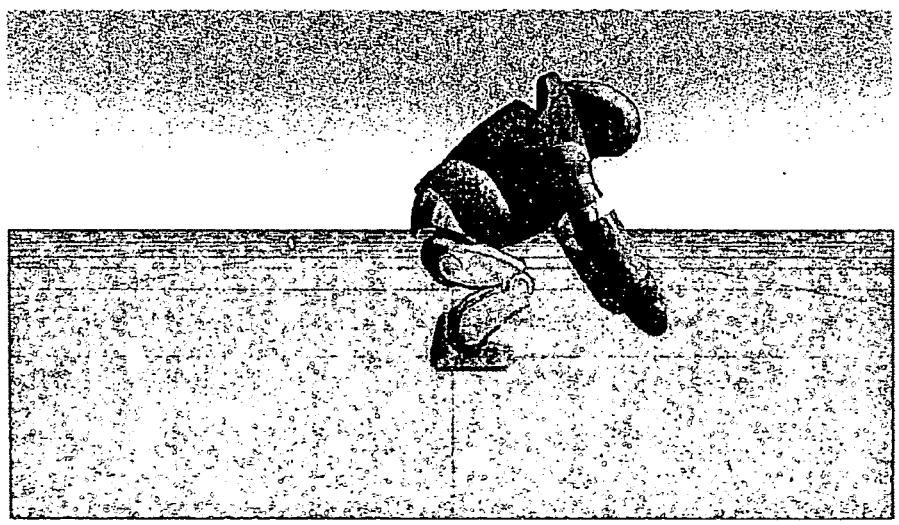
Figure 67:
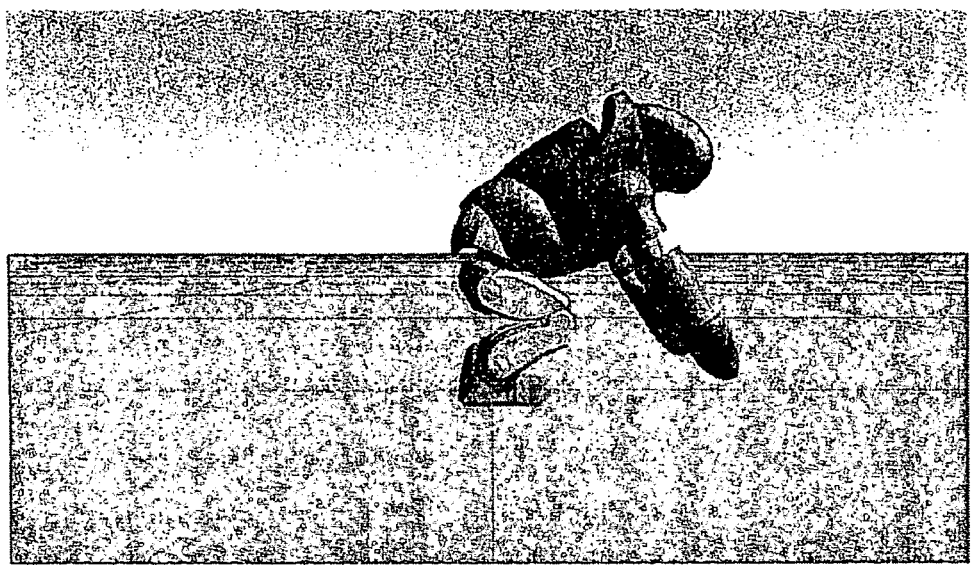
Figure 68:
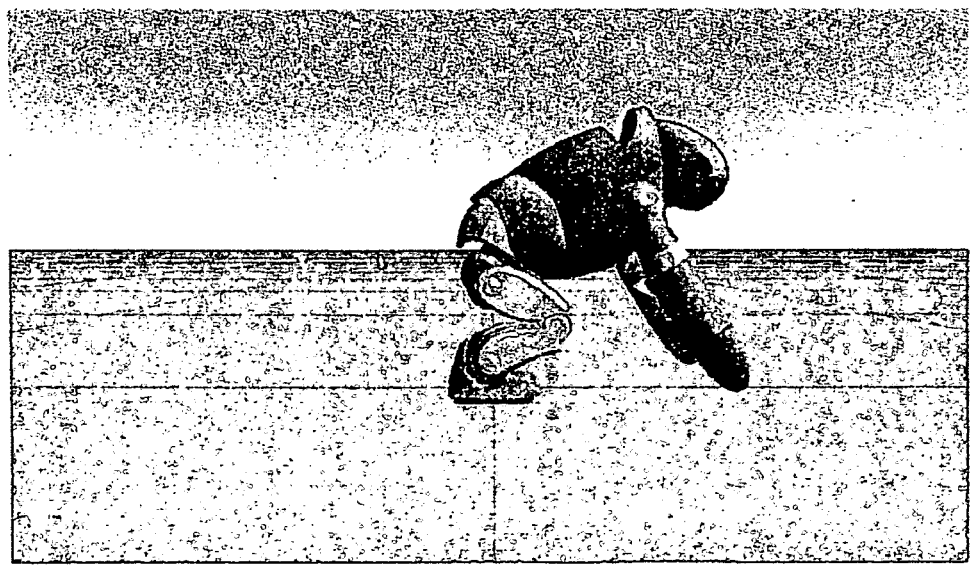
Figure 73:
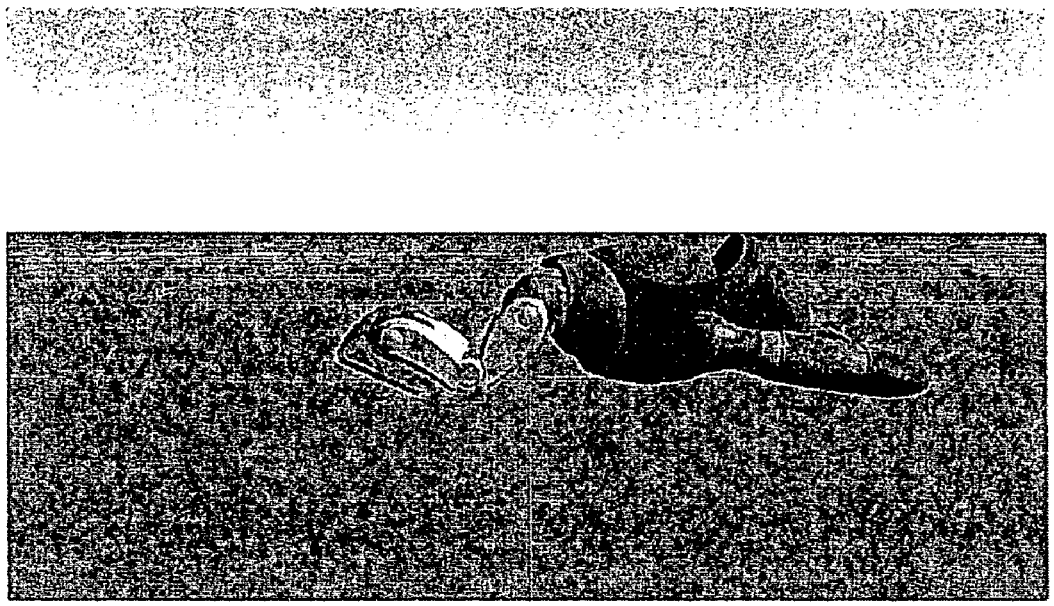
Figure 74:
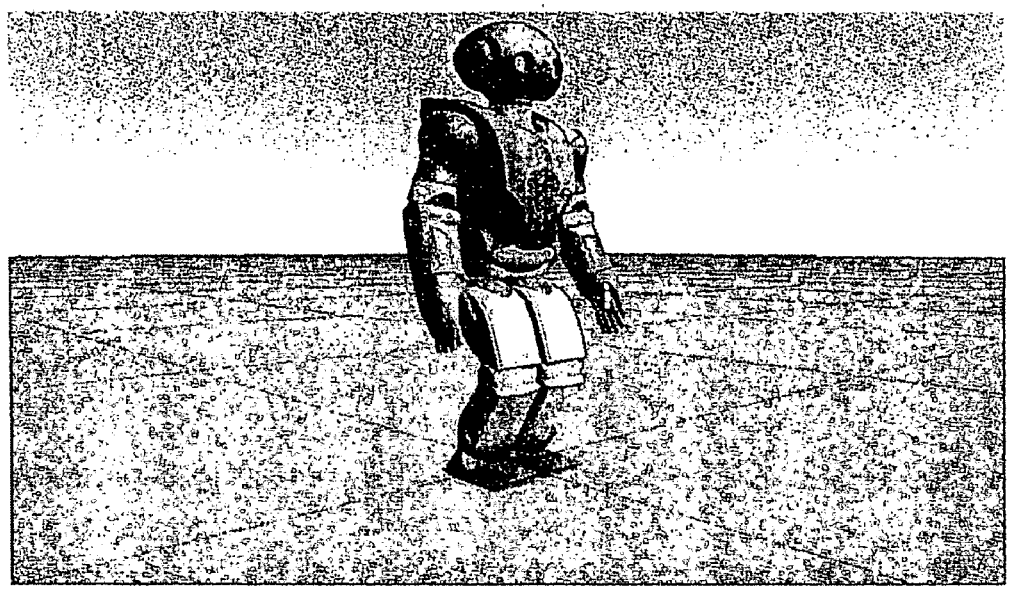
FIGS. 74 to 90 are perspective views illustrating the manner wherein the legged mobile robot 100 tumbles from its standing posture into a prone posture.
Figure 75:
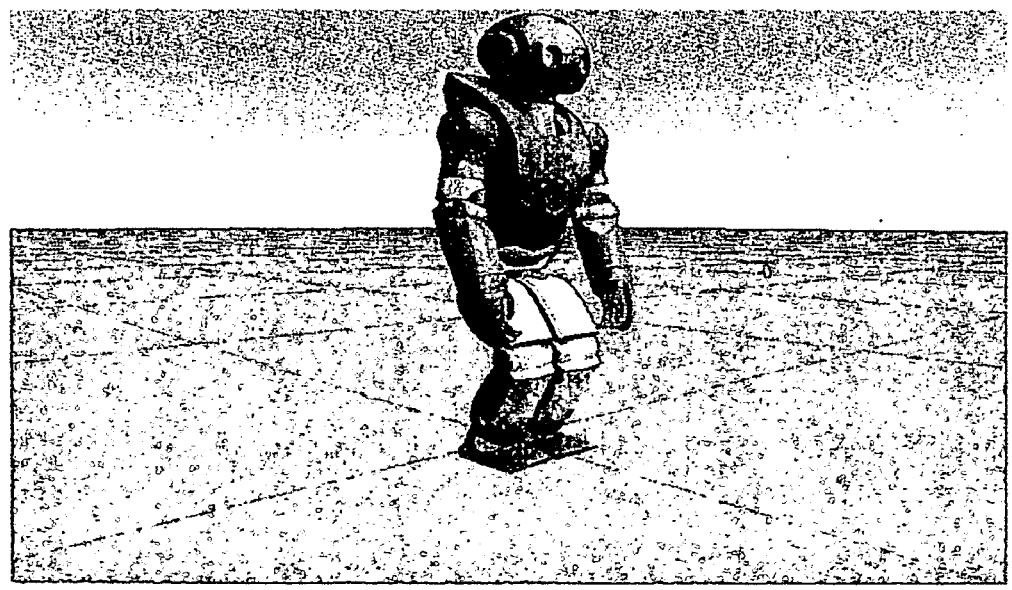
Figure 76:
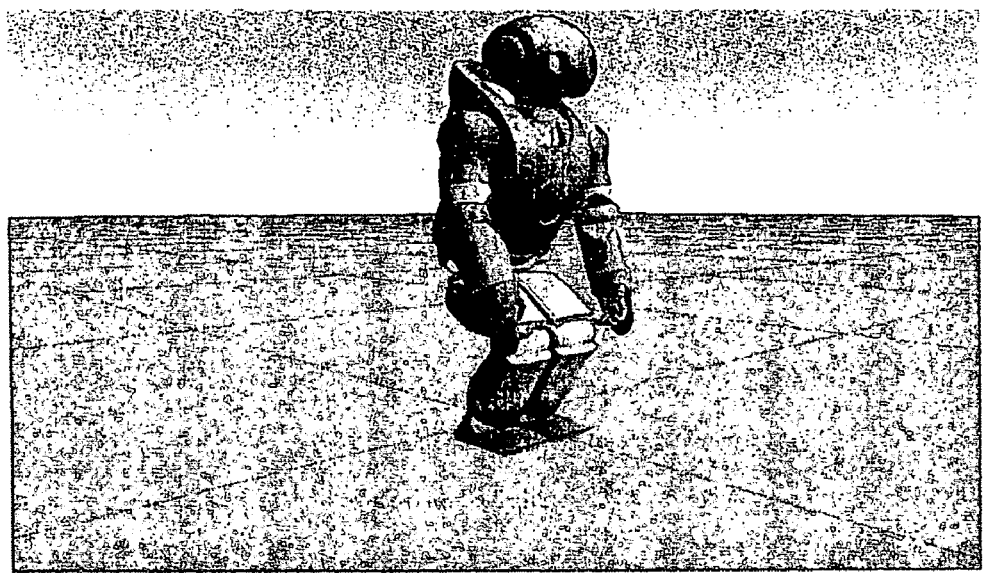
Figure 77:
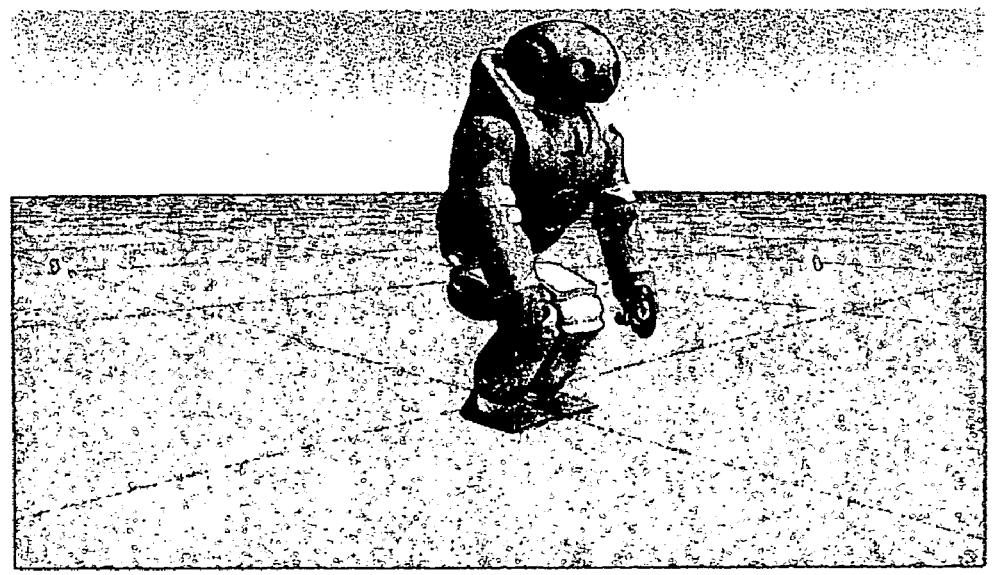
Figure 78:
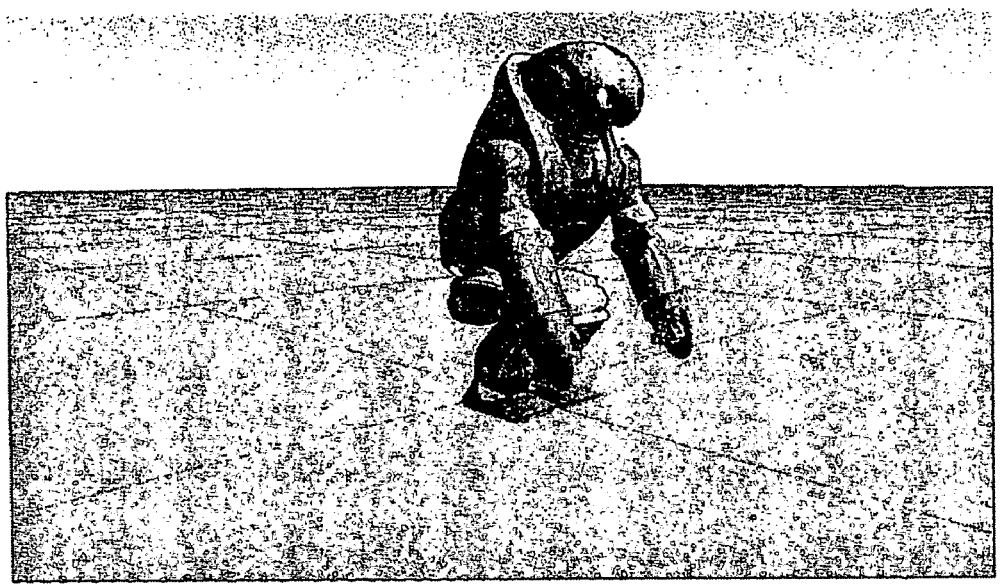
Figure 79:
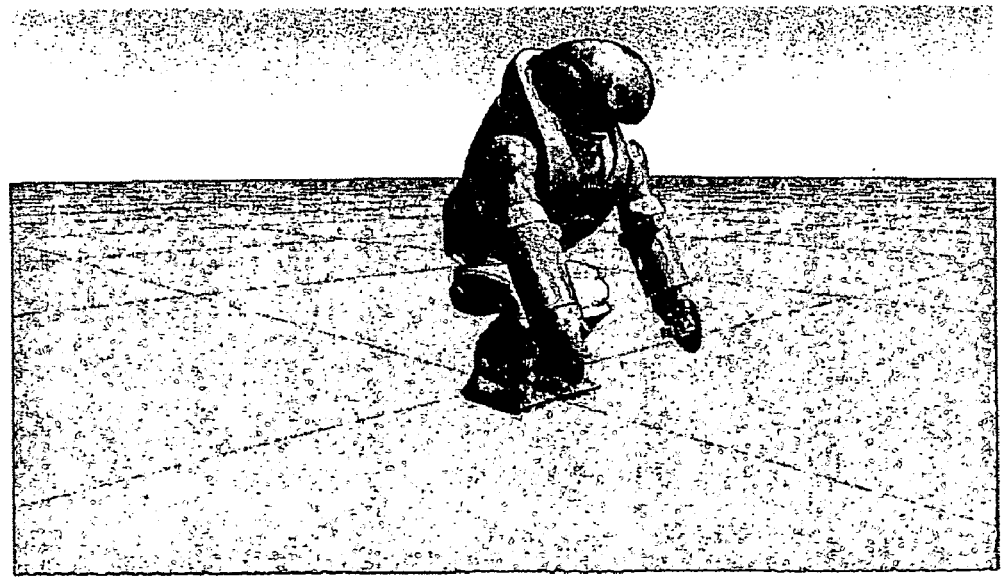
Figure 80:
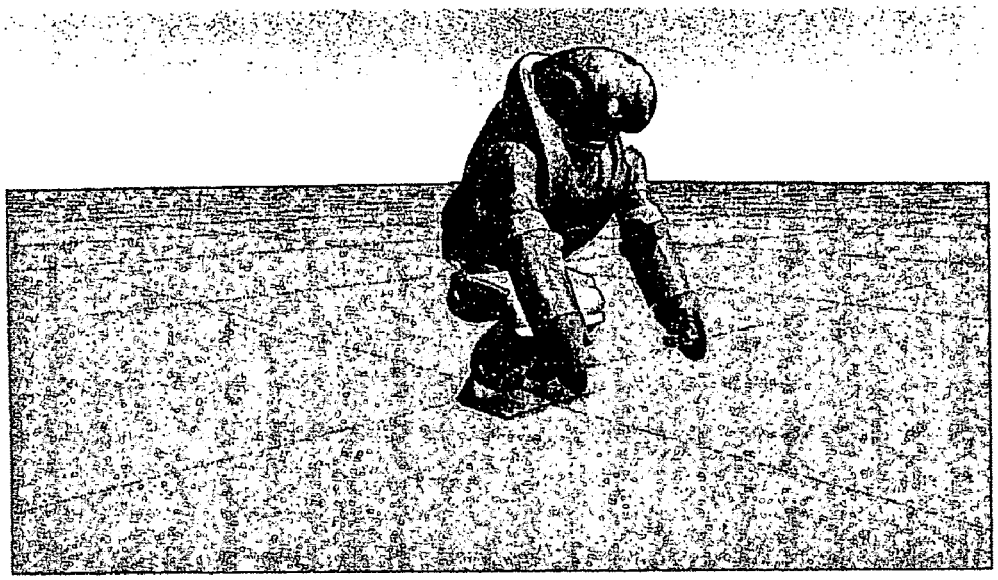
Figure 81:
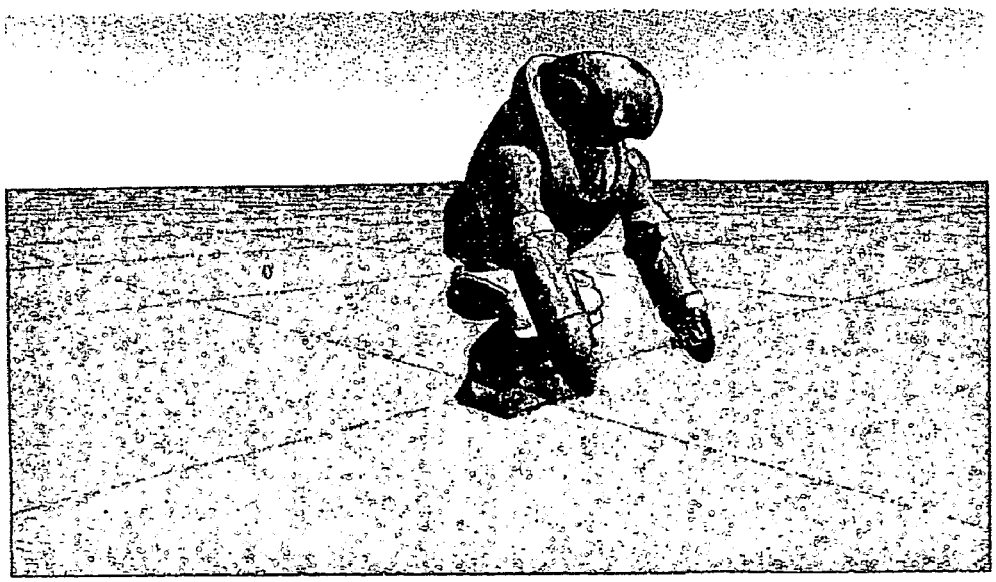
Figure 82:
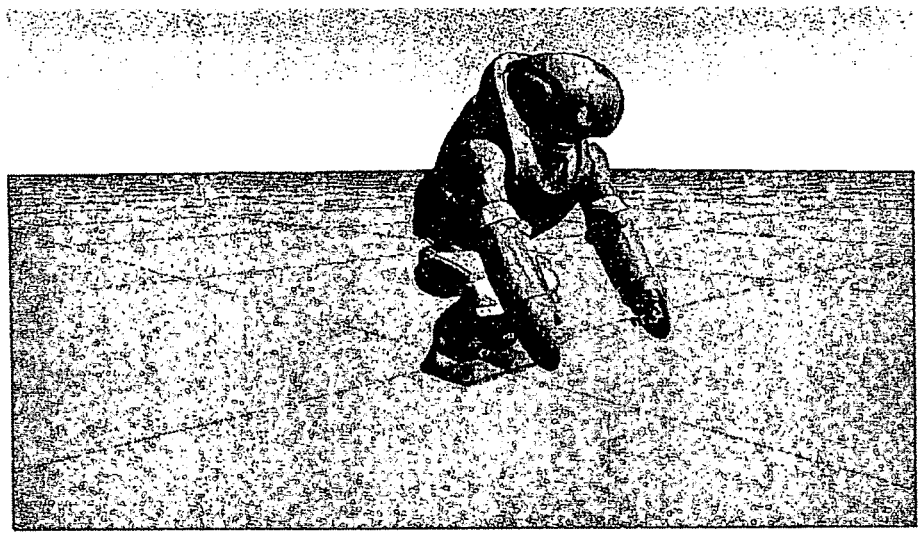
Figure 83:
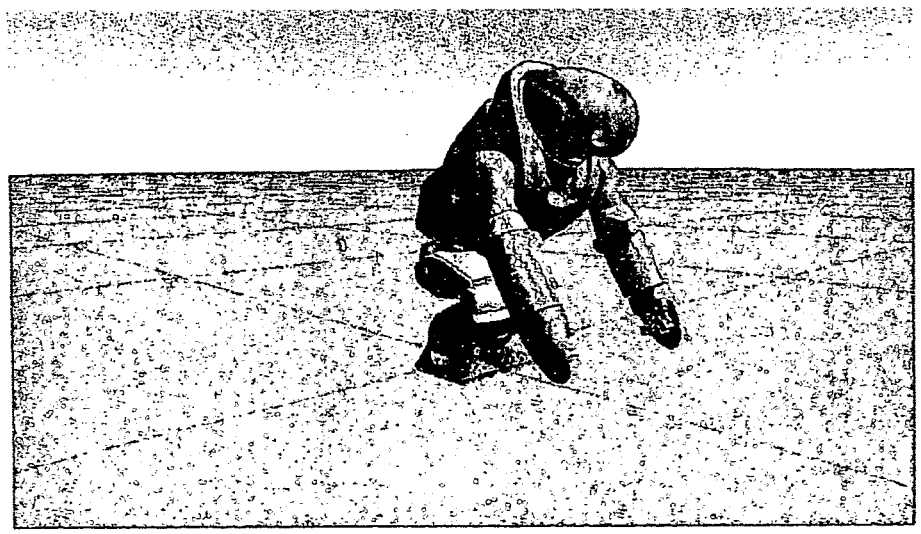
Figure 84:
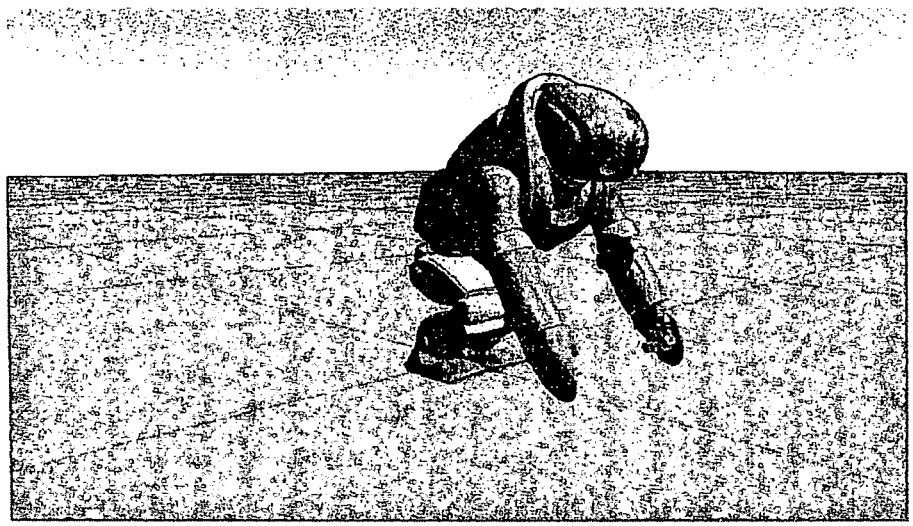
Figure 85:
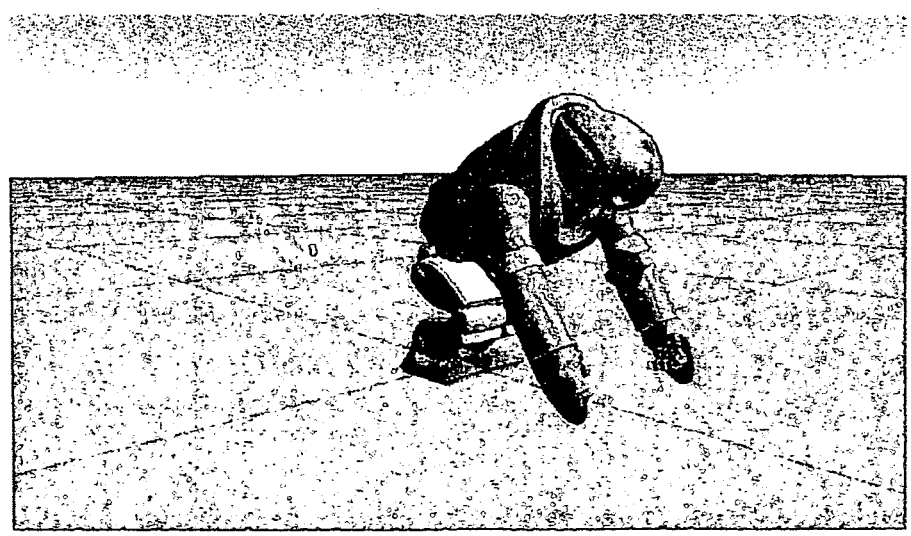
Figure 86:
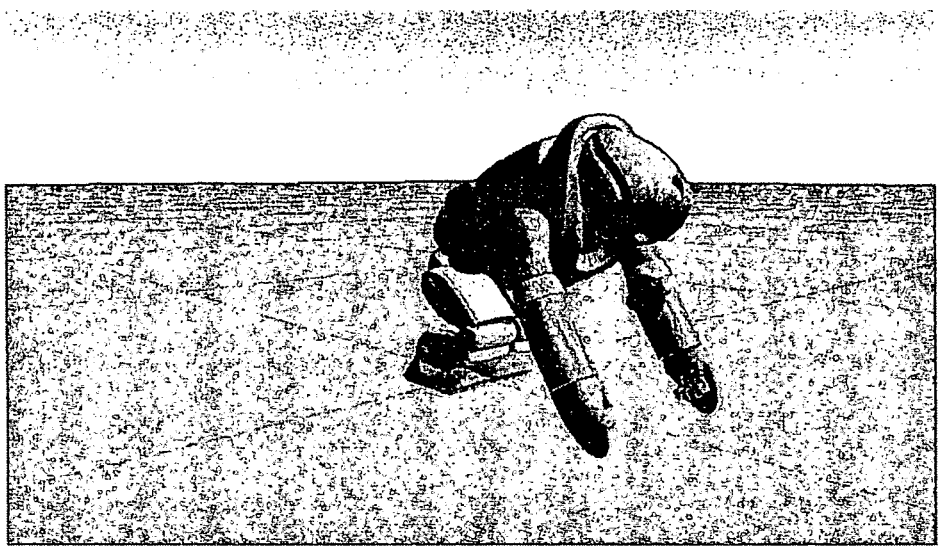
Figure 87:
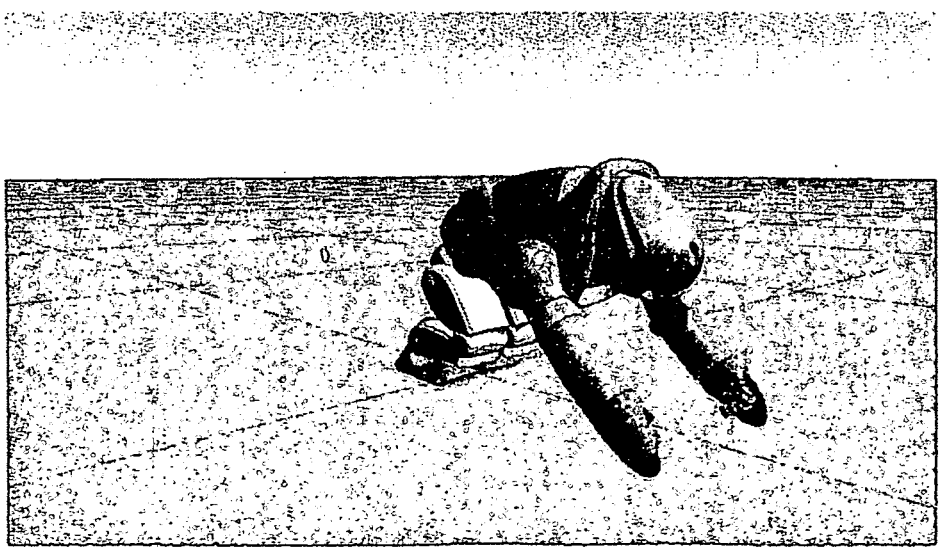
Figure 88:
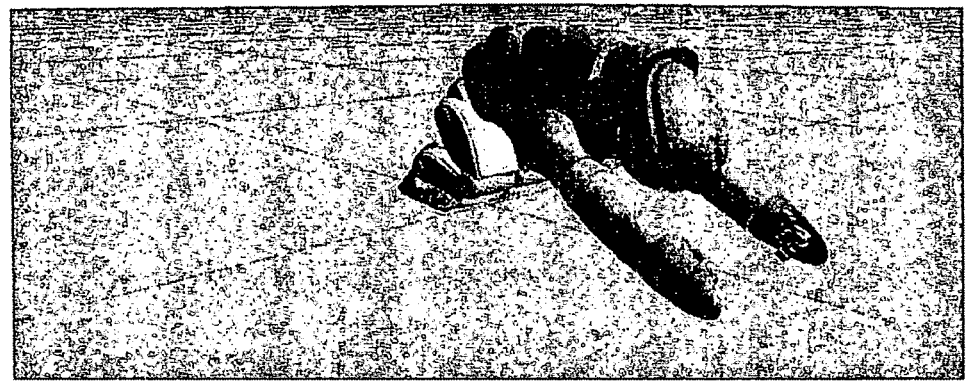

FIG. 56 illustrates a motion when the legged mobile robot 100, which is modeled as a link structure including a plurality of substantially parallel joint axes connected to each other in the heightwise direction such as a shoulder joint pitch axis 4, the trunk pitch axis 9, a hip joint pitch axis 12 and a knee pitch axis 14, tumbles toward a prone posture through synchronous and cooperative driving of the joint pitch axes.

It is assumed that the robot stands only with the sole which is a link end of the link structure ((1) of FIG. 56).

It is assumed that, at this time, because an external force or external force moment is applied, the moment error term T of the ZMP balance equations cannot be canceled any more and the ZMP is moved away from the ZMP stable region which is formed only from the sole. Then, in response to this, a tumbling motion is started while the ZMP is kept within the support polygon.

In the tumbling motion, a link which minimizes the variation amount $\Delta S/\Delta t$ of the area S of the support polygon of the body per time t is searched for, and a target landing point of a hand which minimizes the variation amount $\Delta S/\Delta t$ in a link including the hand is searched for. Then, it is determined whether or not it can be executed to land the selected link at the target landing point from restrictions of hardware of the body (such as movable angles of the joints, torque values of the joint actuators, joint forces, angular speeds, angular accelerations and so forth).

If the landing can be executed with the hardware of the body, then another link is landed in addition to the sole link landed already. Then, the ZMP is moved into a minimum support polygon formed from the landed links ((2) of FIG. 56).

Thereafter, the landing point is moved to expand the support polygon as far as the hardware of the body permits ((3) of FIG. 56).

Then, if it becomes impossible to move the landing point any more from restrictions the of hardware of the body such as movable angles of the joints, torque values of the joint actuators, joint forces, angular speeds, angular accelerations and so forth, then it is determined now whether or not it is possible to land a non-landed link sandwiched between the landed links.

If it is possible to land a non-landed link between the landed links from the hardware of the body, then the intermediate link is landed to increase the landed link number ((4) of FIG. 56).

Further, the landing point is moved to expand the support polygon as far as the hardware of the body permits it ((5) of FIG. 56).

Finally, one or more links from one end side of the link structure, which is formed from a plurality of substantially parallel joint axes connected to each other in the heightwise direction, and two or more links from the other end side of the link structure, are taken off from the floor while one or more links positioned intermediately between them are landed and the foot part is landed. Then, in this state, a posture in which the support polygon becomes maximum is formed while the ZMP is kept in the support polygon. If the potential energy of the body is minimum in the posture, then the tumbling motion is completed.

FIGS. 57 to 73 and FIGS. 74 to 90 illustrate a manner wherein the actual machine tumbles from a standing posture to a supine posture.

In this instance, a hand of an arm link including a shoulder joint pitch axis 4 is selected as the link which minimizes the variation amount $\Delta S/\Delta t$ of the area S of the support polygon of the body per time t, and a target landing point is searched for and the body is fallen forwardly (refer to FIGS. 57 to 70 and 74 to 87).

At this time, the body assumes a posture wherein the knee pitch axis 14 is folded in order to minimize the variation amount $\Delta S$ of the support polygon upon landing so that the place at which the hand is to be landed is set to a position nearer to the sole.

Then, a leg part link including the knee pitch axis 14 is selected as the link which minimizes the variation amount $\Delta S/\Delta t$ of the area S of the support polygon of the body, and a target landing point of the selected link is searched for and the body forwardly tumbles further deeply. At this time, since the foot part is landed already, the leg part is pivoted around the ankle pitch axis and the knee is landed onto the floor (refer to FIGS. 70 to 71 and 88 to 89).

Figure 89:
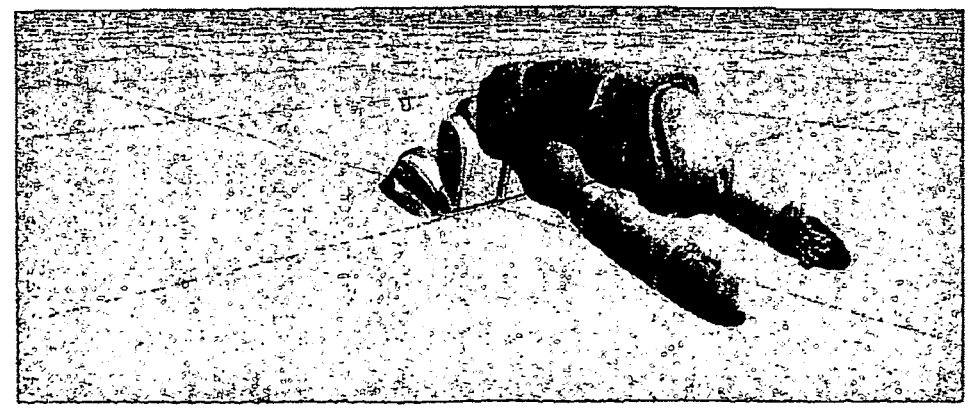
Figure 90:

Furthermore, the hand and the knee as the landed points (contact points) are moved so as to be spaced away from the sole to expand the support polygon as far as the hardware of the body permits (refer to FIGS. 72 and 89). As a result, the trunk part link also lands on the floor after the hand and the knee (refer to FIGS. 73 and 90). Since the potential energy of the body in this posture is minimum, the tumbling motion is completed.

F. Standing Up Operation from an On-Floor Posture

In order to perform activation from an on-floor posture such as a supine posture or a prone posture or for the sake of the self-completeness of operation that, when the legged mobile robot 100 tumbles, it autonomously stands up and resumes an operation, it is necessary for the legged mobile robot 100 to realize a standing up operation.

However, if the legged mobile robot 100 tries to stand up along an unplanned trajectory, then an excessively high external moment is applied and high output torque is required for the joint actuators. As a result, motors of an increased size are necessitated, and the driving power consumption increases as much. Further, the weight of the body increases and the production cost increases. The increase of the weight makes the standing up motion further difficult. Or, also such a situation may possibly occur that the stability in posture cannot be maintained because of an external moment which is generated in the process of a standing up motion or standing up itself is impossible.

Therefore, in the present embodiment, the legged mobile robot 100 performs a standing up motion formed from a motion pattern with which the external moment is minimized. This can be realized by combining postures, with each of which the ZMP support polygon is minimized, in a time series.

Further, the legged mobile robot 100 according to the present embodiment is a link structure wherein a plurality of pitch axes are connected to each other in series (but when viewed from a sideward direction) in the heightwise direction like a shoulder joint pitch axis 4, the trunk pitch axis 9, a hip joint pitch axis 12 and a knee pitch axis 14 (refer to FIG. 3). Therefore, the plurality of joint pitch axes 4 to 14 are driven synchronously and cooperatively in a predetermined sequence to realize a standing up motion according to a motion pattern which minimizes the ZMP support polygon.

F-1. Standing Up Operation from the Basic Supine Posture

Figure 91:
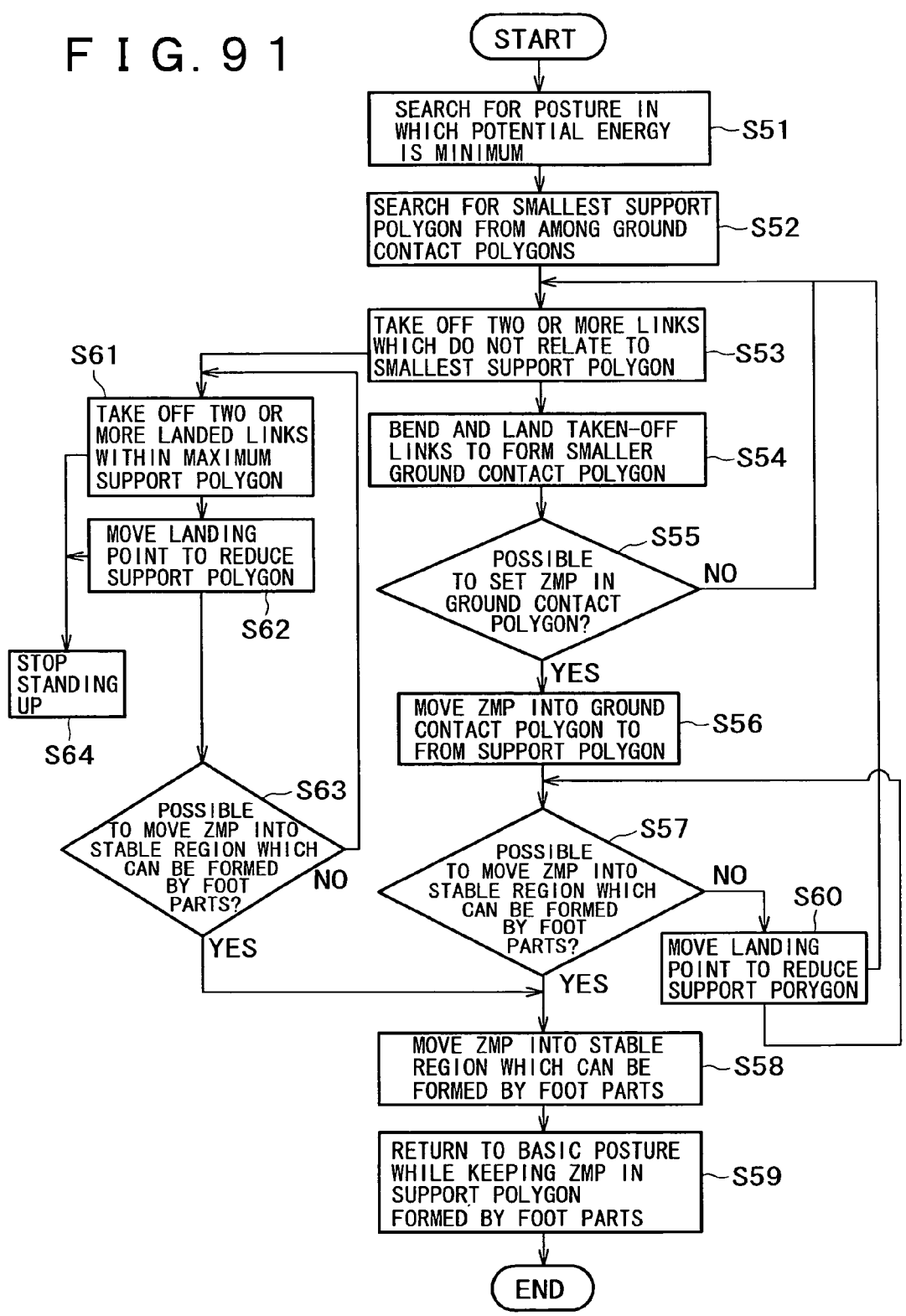
FIG. 91 is a flow chart illustrating a processing procedure when the legged mobile robot 100 according to the embodiment of the present invention performs a standing up motion through synchronous and cooperative driving of the shoulder joint pitch axis 4, trunk pitch axis 9, hip joint pitch axis 12 and knee joint pitch axis 14.

FIG. 91 illustrates a processing procedure when the legged mobile robot 100 according to the present embodiment performs a standing up motion by synchronously and cooperatively driving the shoulder joint pitch axes 4, trunk pitch axis 9, hip joint pitch axes 12 and knee pitch axes 14 in the form of a flow chart. Such a processing procedure as just mentioned is realized by executing a predetermined body motion control program by means of the main control section 81 to control driving of the components.

Figure 92:
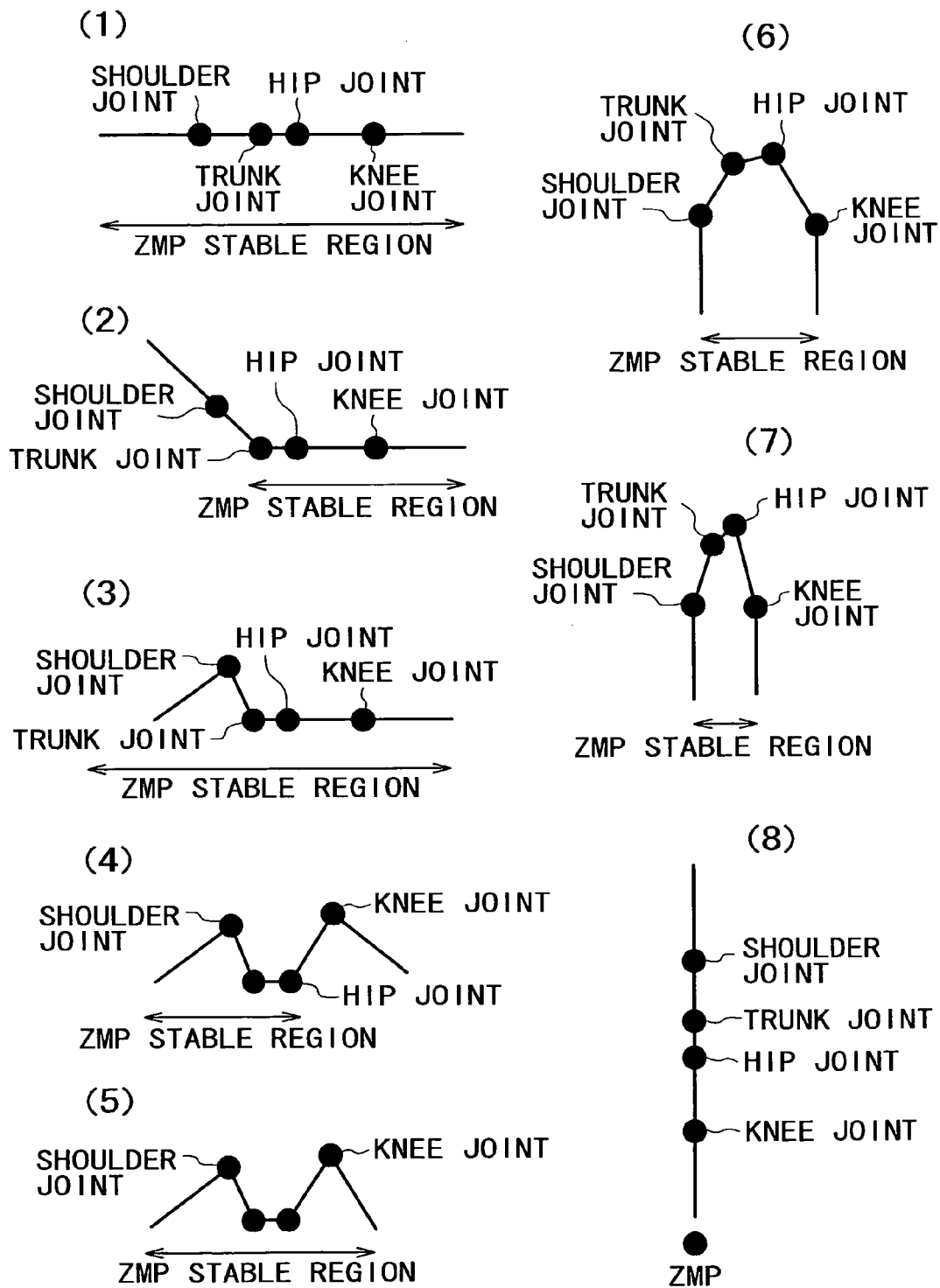
FIG. 92 is a view illustrating a manner wherein the legged mobile robot 100 according to the embodiment of the present invention performs a standing up motion from its supine posture through synchronous and cooperative driving of the shoulder joint pitch axis 4, trunk pitch axis 9, hip joint pitch axis 12 and knee joint pitch axis 14 in the form of a joint link model.

Meanwhile, FIG. 92 illustrates a manner wherein the legged mobile robot 100 according to the present embodiment performs a standing up motion from a supine posture by synchronously and cooperatively driving the shoulder joint pitch axes 4, trunk pitch axis 9, hip joint pitch axes 12 and knee pitch axes 14 in the form of a joint link model. It is to be noted that, while the legged mobile robot 100 according to the present embodiment includes the trunk pitch axis 9, a manner wherein a legged mobile robot of the type which does not include a trunk pitch axis performs a standing up motion from a supine posture by synchronous driving of a plurality of joint pitch axes is illustrated in FIG. 93. It is to be noted, however, that the position of the center of gravity of the entire body is set to a link which interconnects a trunk joint and a hip joint in the link structure shown in FIG. 93, and this link is hereinafter referred to as "gravity center link". It is to be noted that, although the "gravity center link" is used in a narrow sense with such a definition as just described, in a wide sense, it may be any link on which the position of the center of gravity of the entire body exists. For example, where the body does not include a trunk axis, a link including an end or the like of a trunk at which the center of gravity of the entire body exists corresponds to the last-mentioned link.

In the following, a standing up operation of the body from the basic supine posture is described with reference to the flow chart shown in FIG. 91.

Figure 94:
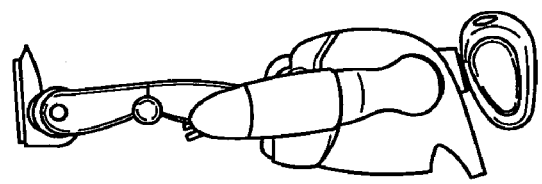
FIGS. 94 to 111 are side elevational views illustrating a manner wherein the legged mobile robot 100 stands up from its basic supine posture.
Figure 95:
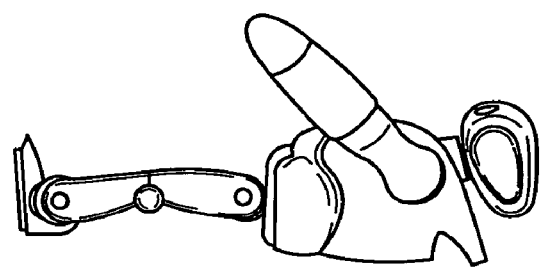
Figure 96:
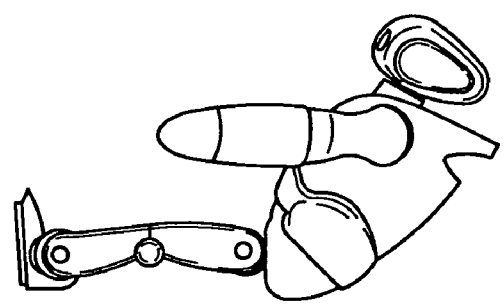
Figure 97:
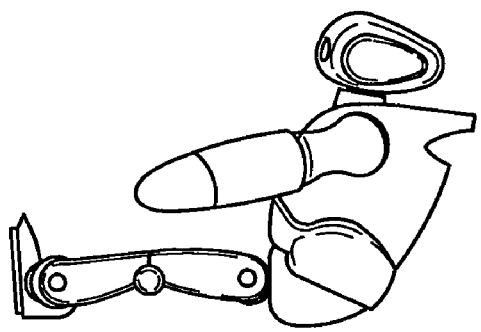
Figure 98:
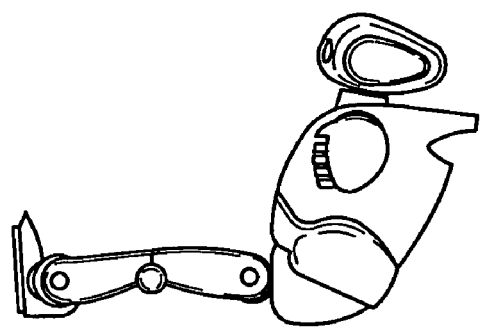
Figure 99:
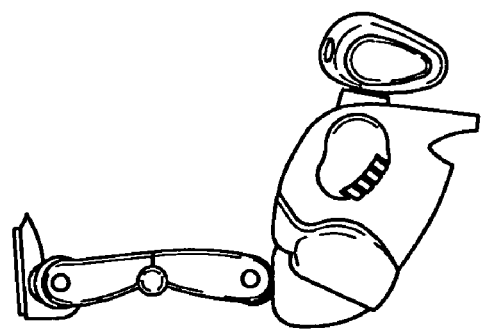
Figure 100:
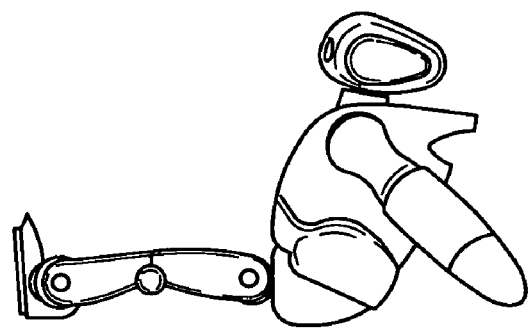
Figure 112:
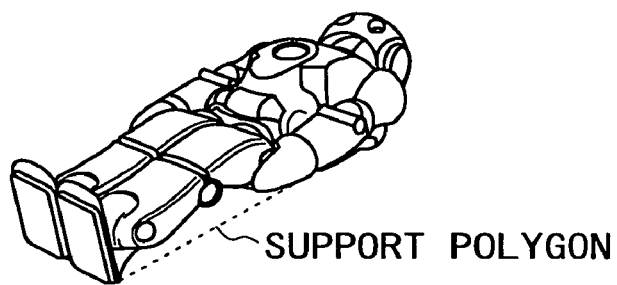
FIGS. 112 to 129 are perspective views illustrating the manner wherein the legged mobile robot 100 stands up from its basic supine posture.
Figure 113:
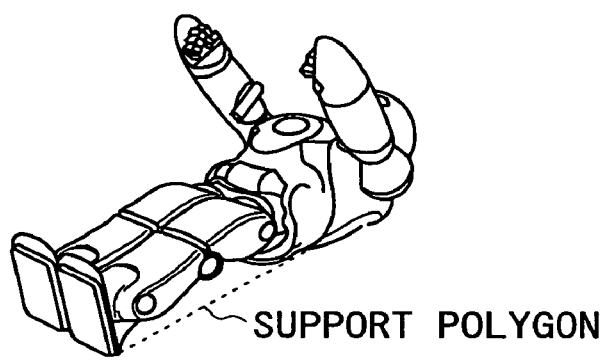
Figure 114:
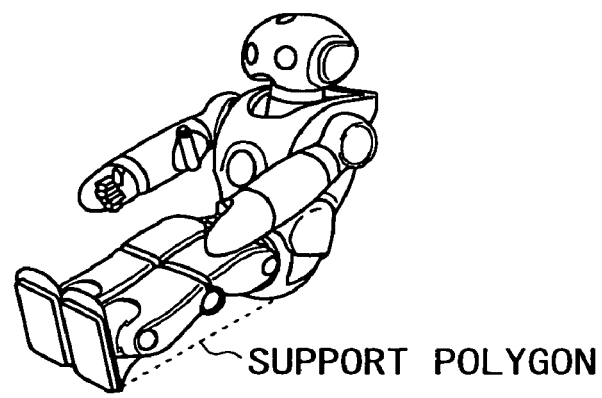
Figure 115:
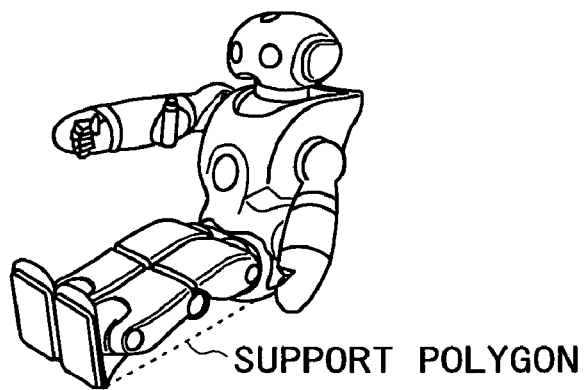
Figure 116:
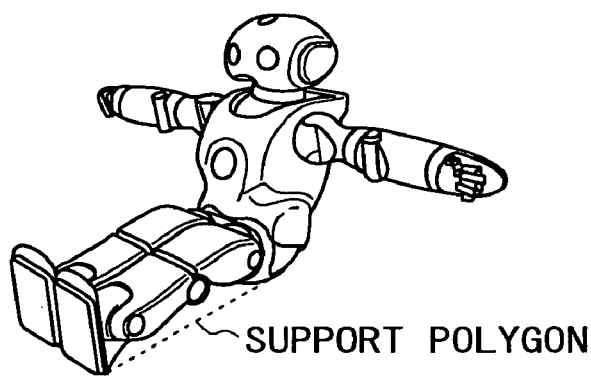
Figure 117:
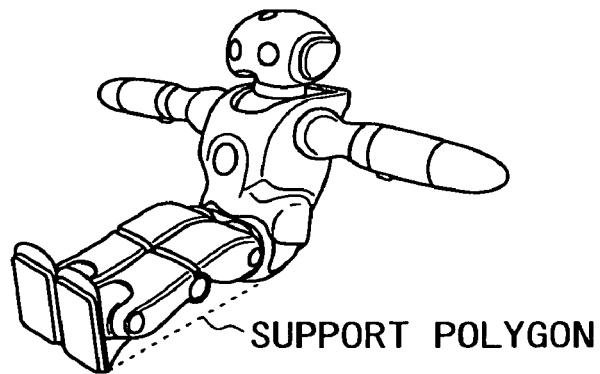
Figure 118:
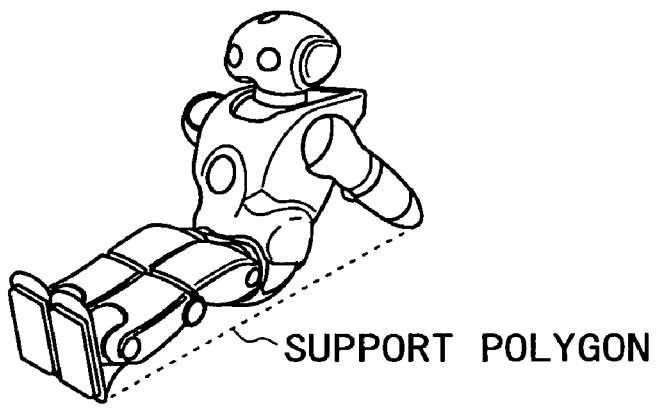

First, when the body is in an on-floor posture, the posture in which the potential energy is minimum is searched out (step S1). This posture corresponds to the basic supine posture, and in this posture, the links by which a shoulder joint pitch axis 4, the trunk pitch axis 9, a hip joint pitch axis 12 and a knee pitch axis 14 which are used for a standing up motion are connected to each other are all in a landed link (contacting to the floor) as seen in (1) of FIG. 92 and (1) of FIG. 93. A state of the actual machine at this time is shown in FIGS. 94 and 112. Since the posture which requires the lowest potential energy is taken, it is possible to measure the gradient or the shape of the road surface and confirm whether or not a standing up motion is possible.

The narrowest support polygon is searched out from among landed polygons formed from the landed links when the body is in the basic supine posture (step S52). At this time, it is determined whether or not a ZMP trajectory when at least two or more links from one end side of the body are taken off from the floor can be planned. The plannability of the ZMP can be determined taking movable angles of the link structure, torque values of the joint actuators interconnecting the links, joint forces, angular speeds, angular accelerations and so forth into consideration.

Thereafter, two or more links which do not relate to the narrowest support polygon from among the landed polygons are taken off from the floor (step S53).

The step S53 corresponds to (2) of FIG. 92 and (2) of FIG. 93. On the actual machine, the lower part of the body including the gravity center link for interconnecting the trunk joint and the hip joints is extracted as the support polygons, and two or more links from the shoulder joints to the trunk joints other than them are taken off as links which do not relate to the support polygon.

A motion of the actual machine at this time is illustrated in FIGS. 95 to 96 and 113 to 114. In the example illustrated, the opposite left and right arm parts are lifted, and then the trunk joint pitch axis actuator $A_9$ is driven to perform sitting up of the upper part of the body. Since the arm parts are lifted previously, the moment can be reduced to reduce the necessary maximum torque.

Then, one or more non-landed links from the one end side are bent to land an end portion of the links to form a narrower landed polygon (step S54).

The step S54 corresponds to (3) of FIG. 92 and (3) of FIG. 93. On the actual machine, while two or more links including the shoulder joints are taken off, they are bent around the shoulder joint pitch axis so that the hand which is an end portion of the links is landed. Then, the hand is gradually moved toward the trunk pitch axis which is the position of the gravity center of the body to form a landed polygon which is narrower than that in the original on-ground posture.

Figure 101:
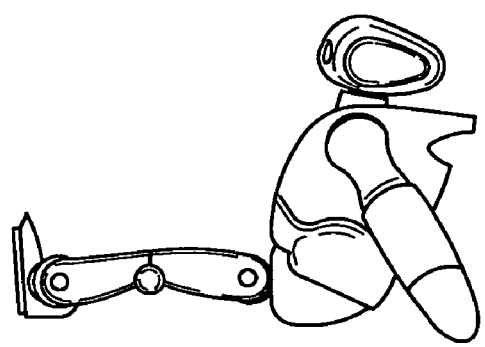
Figure 102:
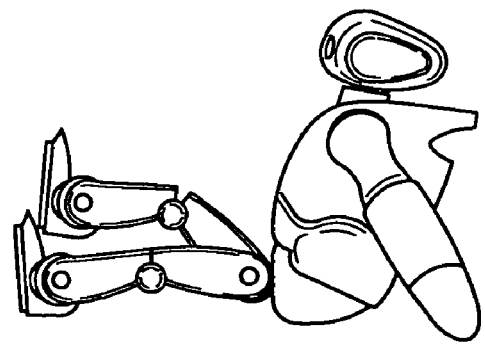
Figure 103:
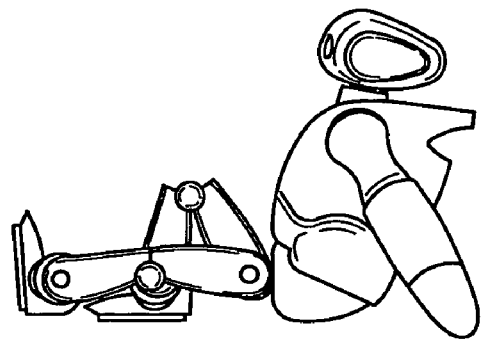
Figure 104:
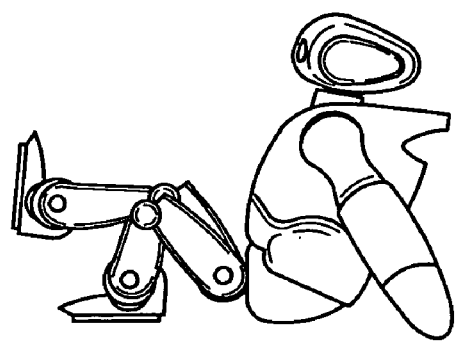
Figure 105:
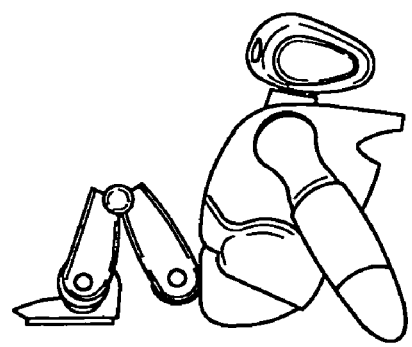
Figure 106:
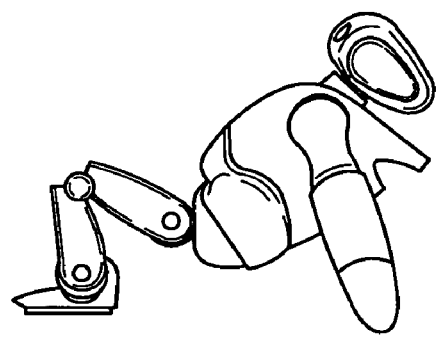
Figure 107:
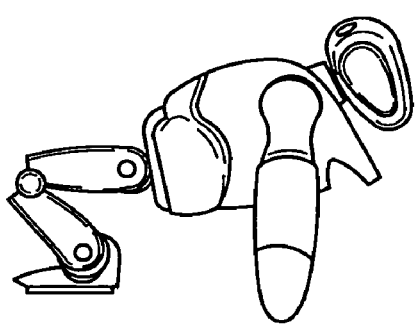
Figure 108:
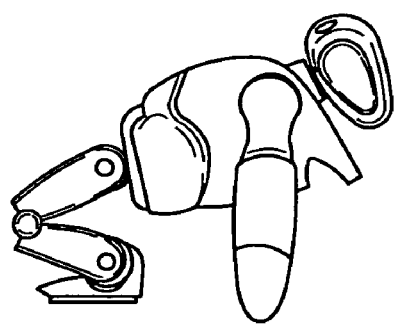
Figure 109:
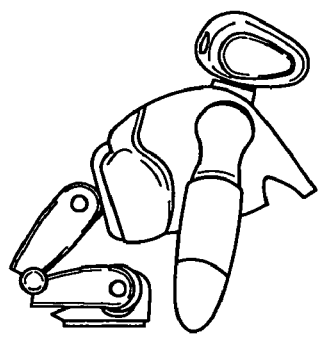
Figure 110:
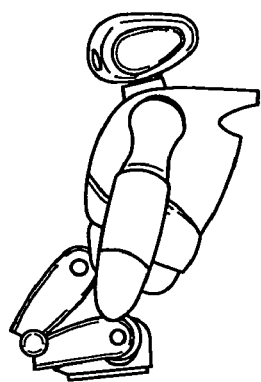
Figure 111:
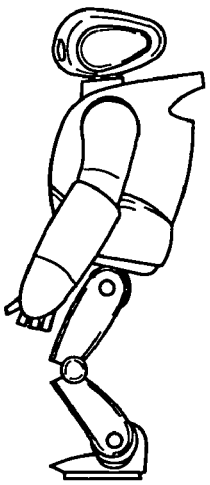
Figure 119:
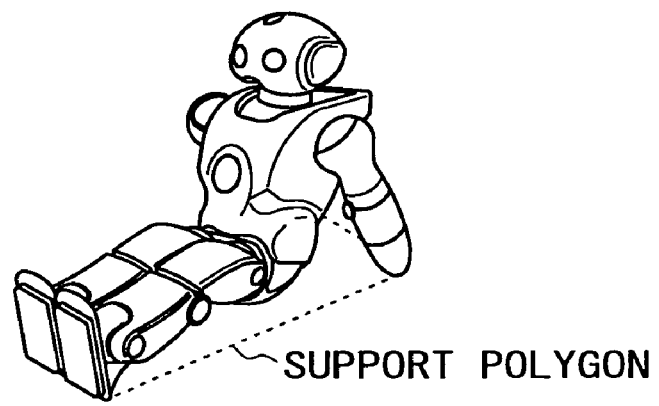
Figure 120:
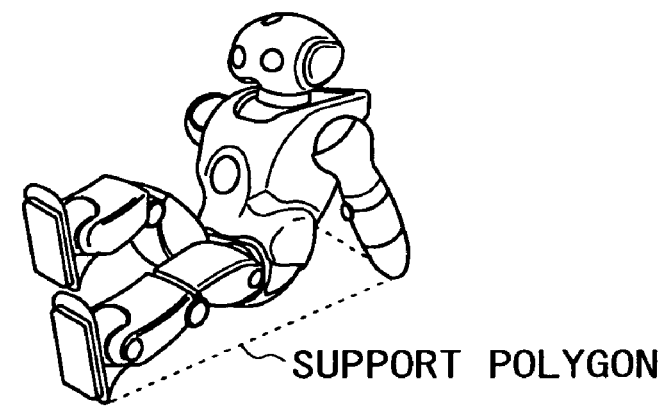
Figure 121:
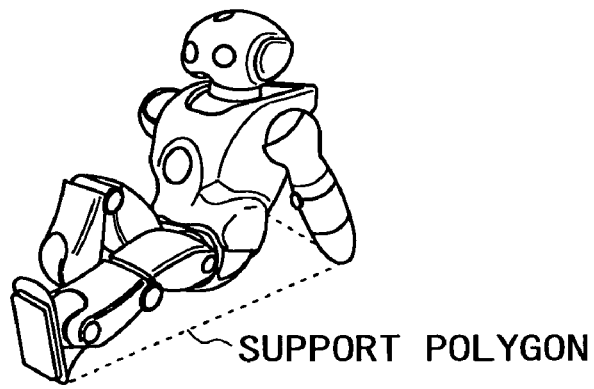
Figure 122:
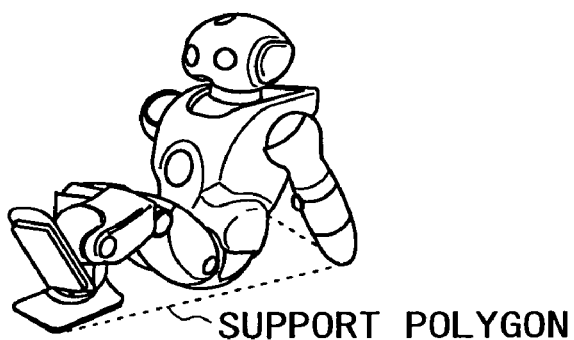
Figure 123:
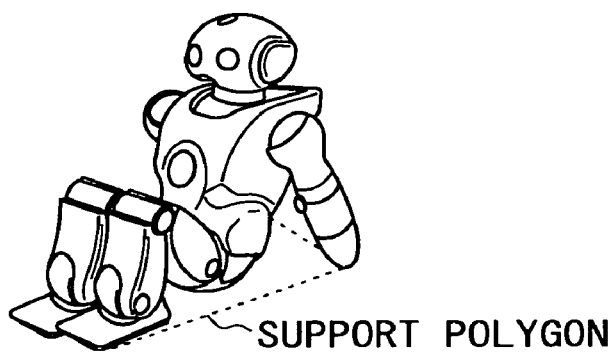
Figure 124:
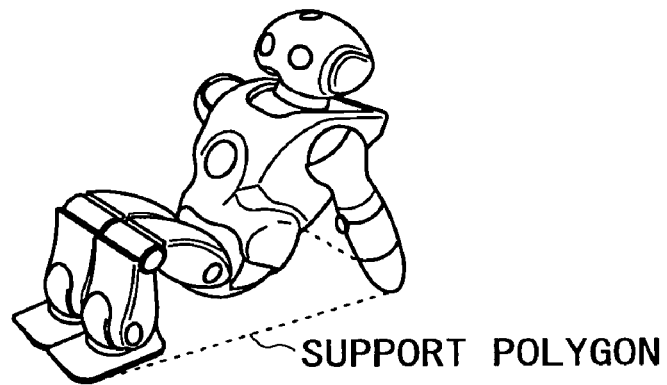
Figure 125:
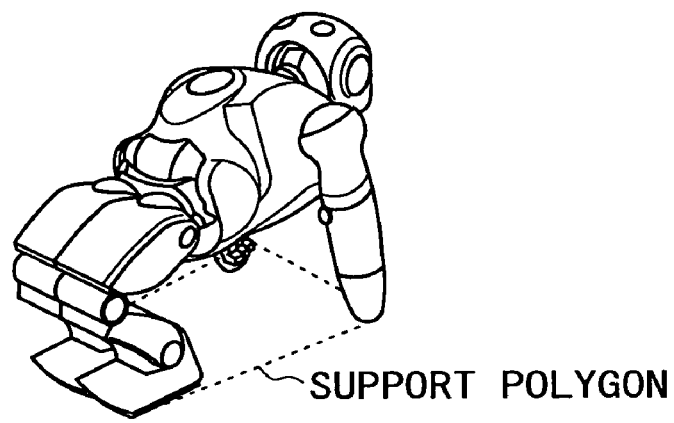
Figure 126:
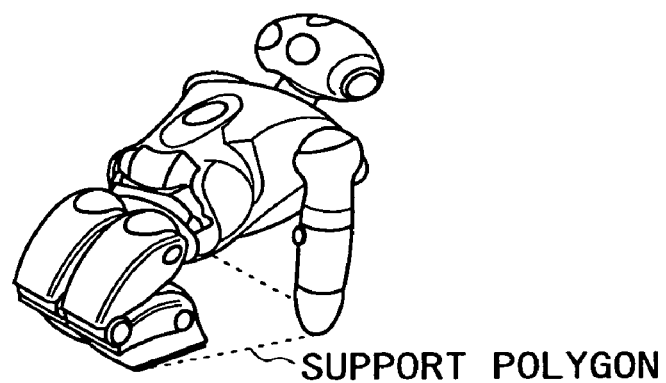
Figure 127:
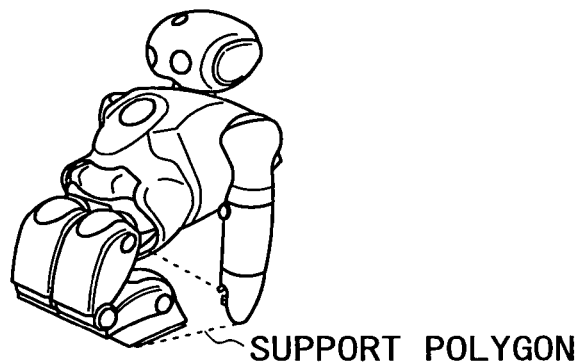
Figure 128:
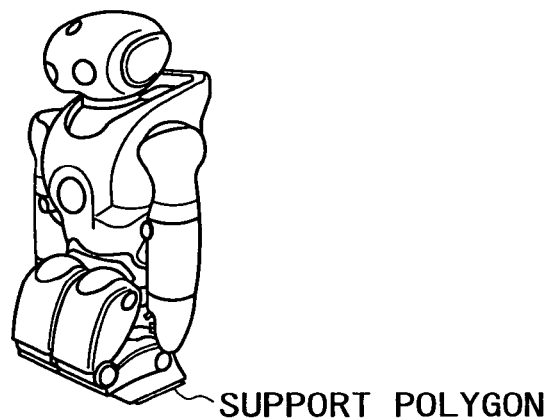
Figure 129:
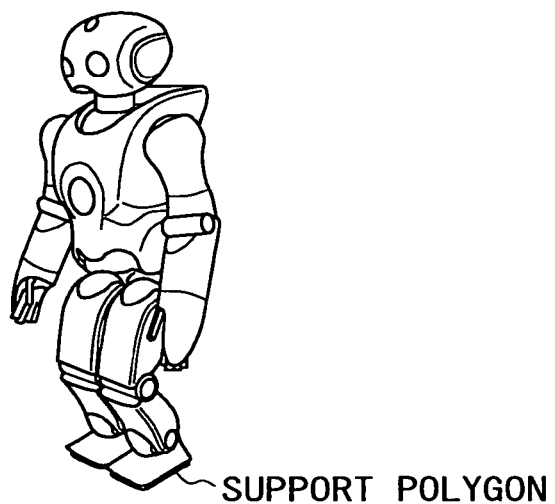

A motion of the actual machine at this time is illustrated in FIGS. 97 to 101 and 115 to 119. In the example illustrated, the left and right arm parts are first lifted sideways through driving of the left and right shoulder joint roll axes $A_5$, and then the directions of the arm parts are turned by 180 degrees once through driving of the upper arm yaw axes $A_6$ (FIGS. 98 to 99 and 116 to 117). Thereafter, the arm parts are gradually lowered through driving of the shoulder joint pitch axes $A_4$. Then, the hands are landed to form a narrower landed polygon (FIGS. 101 and 119).

After the new grounded polygon is formed in this manner, it is checked whether or not it is possible to set the ZMP in the landed polygon (step S55). This is determined taking movable angles of the link structure, torque values of the joint actuators which interconnect the links, joint forces, angular speeds, angular accelerations and so forth into consideration. Then, the ZMP is moved into the landed polygon to form a new support polygon (step S56).

Here, it is determined whether or not the support polygon is sufficiently narrow (step S57). In this determination, it is determined whether or not the gravity center link interconnecting the trunk pitch axis and the hip joint pitch axes can be taken off from the floor or whether or not the ZMP can be moved into the ZMP stable region formed only from the foot parts taking movable angles of the link structure, torque values of the joint actuators which interconnect the links, joint forces, angular speeds, angular accelerations and so forth into consideration. A detailed procedure for determining whether or not the support polygon is sufficiently narrow is hereinafter described.

It is considered that, according to the posture of the actual machine illustrated in FIGS. 101 and 119, the support polygon is not sufficiently narrow. Therefore, after the landed point is moved to reduce the support polygon (step S50), the processing returns to step S52 to re-try formation of a narrower support polygon.

The narrowest one of landed polygons formed by the landed links in the posture shown in FIGS. 101 and 119 is searched for (step S53). Now, it is determined whether or not a ZMP when at least two or more links from the other end side of the body are taken off from the floor can be planned. The plannability of a ZMP can be determined taking movable angles of the link structure, torque values of the joint actuators which interconnect the links, joint forces, angular speeds, angular accelerations and so forth into consideration.

Then, two or more links which do not relate to the narrowest support polygon from among the landed polygons are taken off from the floor (step S53). This corresponds to (4) to (5) of FIG. 92 and (4) to (5) of FIG. 93. On the actual machine, two or more links continuing from the other end side including the knee joint pitch axis are taken off as links which do not relate to the support polygon.

Then, one or more non-landed links from the one end side are folded to land an end portion of the links to form a narrower landed polygon (step S54).

A motion of the actual machine at this time is illustrated in FIGS. 102 to 105 and 120 to 123. In the example illustrated, the right leg is lifted first through driving of the hip joint pitch axis $A_{12}$ for the right leg, and then the right leg is bent through driving of the knee joint actuator $A_{14}$ to land the sole of the leg onto the floor. Then, the right leg is lifted through driving of the hip joint pitch axis $A_{12}$ for the right leg, and then the left leg is bent through driving of the knee joint actuator $A_{14}$ for the left leg to land the sole of the left leg. By gradually approaching the sole to the hip joint pitch axis 12 side which is the position of the center of gravity of the body, a landed polygon narrower than that in the original on-ground posture can be formed.

After the new landed polygon is formed in this manner, it is determined whether or not it is possible to set the ZMP in the landed polygon (step S55). This determination is performed taking movable angles of the link structure, torque values of the joint actuators which interconnect the links, joint forces, angular speeds, angular accelerations and so forth into consideration. Then, the ZMP is moved into the landed polygon to form a new support polygon (step S56).

Here, it is determined again whether or not the support polygon is sufficiently narrow (step S57). In this determination, it is determined whether or not the gravity center link interconnecting the trunk pitch axis and the hip joint pitch axes can be taken off from the floor or whether or not the ZMP can be moved into the ZMP stable region formed only from the foot parts taking movable angles of the link structure, torque values of the joint actuators which interconnect the links, joint forces, angular speeds, angular accelerations and so forth into consideration. It is determined that, in the posture of the actual machine shown in FIGS. 105 and 123, a sufficiently narrow support polygon is formed. As regards the angle of an arm when the support polygon is reduced, the angle defined by a normal extending from the axis of a shoulder toward the floor and a central axis of the arm is preferably within a predetermined angle based on the torque amount.

Then, in response to that the support polygon of the body has become sufficiently narrow, the gravity center link is taken off from the floor while the end portions of the opposite end links of the support polygon remain landed, and while the ZMP is kept within the support polygon formed by the landed links of the opposite end links, the distance between the end portions of the opposite end links which form the support polygon is reduced to move the ZMP to the other end side of the link structure (step S58). This corresponds to (6) to (7) of FIG. 92 and (6) to (7) of FIG. 93.

On the actual machine, the gravity center link which interconnects the trunk pitch axis and the hip joint pitch axis is taken off from the floor while the hands and the soles as the end portions of the opposite end links of the landed polygon remain landed, and the distance between the hands and the soles is gradually reduced to move the ZMP toward the sole. A motion of the actual machine at this time is illustrated in FIGS. 106 to 109 and 124 to 127.

Then, in response to that the ZMP enters the landed polygon formed only from a number of landed links smaller than a second predetermined number from the other end of the link structure, a number of links greater than a first predetermined number from the one end side of the link structure are taken off from the floor while the ZMP remains accommodated in the landed polygon and are then expanded in the lengthwise direction to complete the standing up motion (step S59). This corresponds to (8) of FIG. 92 and (8) of FIG. 93.

On the actual machine, in response to that the ZMP enters the landed polygon formed from the soles, the links from the shoulder joint pitch axes 4 to the ankle pitch axes 14 are taken off from the floor while the ZMP is kept accommodated in the landed polygon and are expanded in the lengthwise direction to complete the standing up motion. A motion of the actual machine at this time is illustrated in FIGS. 110 to 111 and 128 to 129.

When the non-landed links are expanded in the lengthwise direction at the final stage of standing up, it assures a high efficiency in motion of the body to positively use the knee joint pitch axes having a comparatively great mass operation amount to perform the motion.

It is to be noted that, if two or more links which do not relate to the smallest support polygon cannot be taken off from the floor at step S53, then it is tried to take off two or more landed links which are positioned on the inner side of a maximum support polygon (step S61).

If the process at step S61 cannot be executed, then the standing up motion is stopped (step S64). On the other hand, if the process at step S61 can be executed successfully, then the landing point is moved to further reduce the support polygon (step S62).

If the process at step S62 cannot be executed, then the standing up operation is stopped (step S64). If the process at step 62 can be executed successfully, then it is checked whether or not the ZMP can be moved into a stable region which can be formed from the soles (step S63). A detailed procedure for determining whether or not the support polygon is sufficiently narrow is hereinafter described. If the ZMP cannot be moved into the stable region, then the processing returns to step S61 to repetitively execute a similar process for reducing the support polygon. On the other hand, if the ZMP can be moved into the stable region, then the processing advances to step S58 to perform a returning motion to the basic posture.

Incidentally, at steps S53 to S54, a motion of stretching the left and right arm parts sideways using the shoulder roll axes as seen in FIGS. 97 to 98 and 115 to 116 in order to land the left and right hands onto the floor rearward of the body to form a narrower landed polygon. This wastefully increases the volume used to allow the legged mobile robot 100 to perform a standing up motion. Therefore, the series of motions illustrated in FIGS. 96 to 101 and 113 to 119 may be replaced by motions illustrated in FIGS. 130 and 131 of causing the elbow pitch axes to effect bending in place of causing the shoulder roll axis to move so that the left and right hands may be landed with a smaller used volume rearward of the body.

Figure 173:
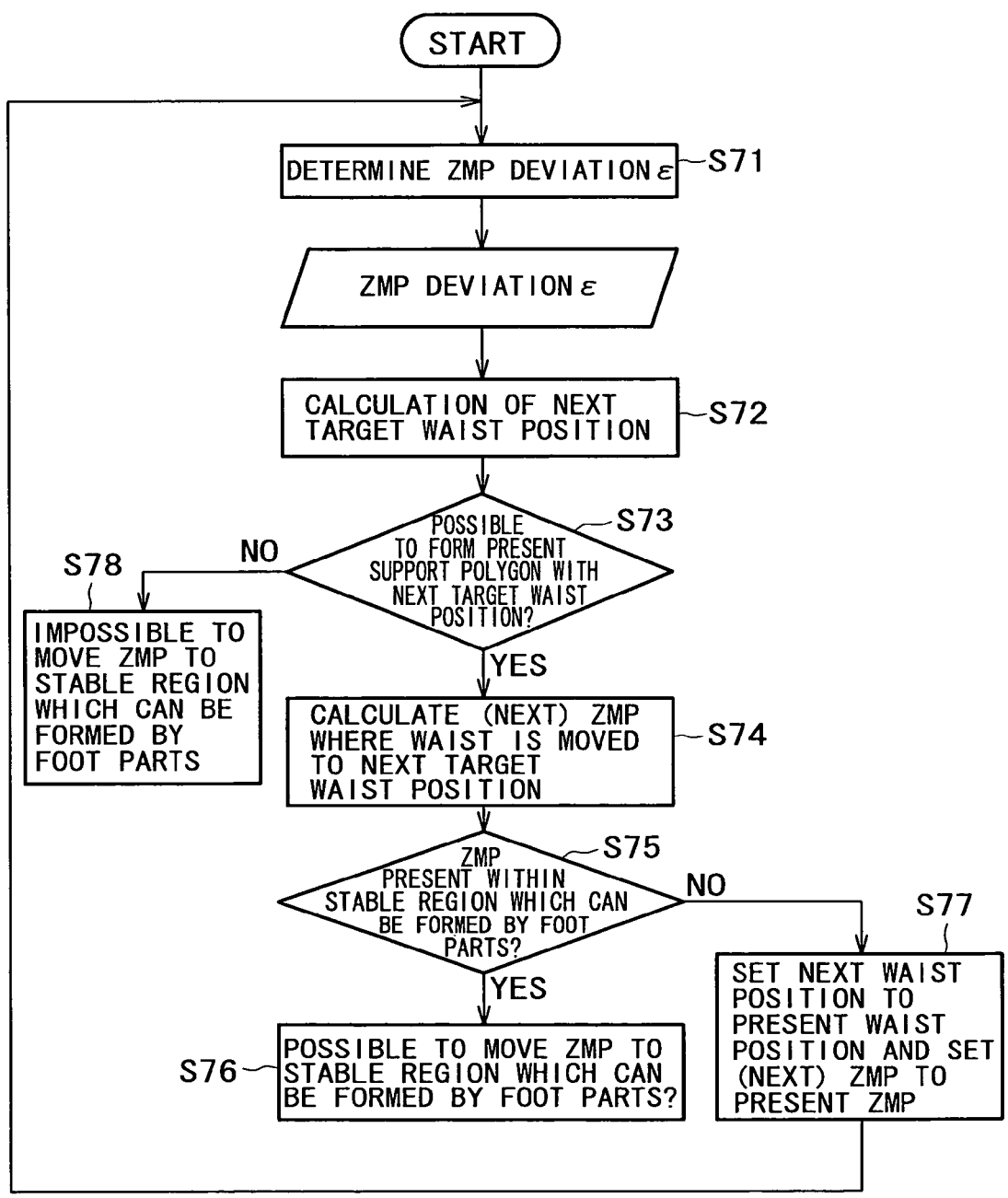
FIG. 173 is a flow chart illustrating a processing procedure for determining whether or not a sufficiently narrowed support polygon is obtained.

In the procedure of the standing up motion described above, it is necessary to determine at steps S57 and S63 whether or not the support polygon is sufficiently narrow. FIG. 173 illustrates a processing procedure for determining whether or not the support polygon is sufficiently narrow in the form of a flow chart.

First, a ZMP deviation $\epsilon(\epsilon_x, \epsilon_y, \epsilon_z)$, that is, a difference between the center position $(x_0, y_0, z_0)$ of the stable region which can be formed from the foot parts and the ZMP position (x, y, z) at present, is determined (step S71).

Then, the ZMP deviation $\epsilon(\epsilon_x, \epsilon_y, \epsilon_z)$ is multiplied by a predetermined gain $G(G_x, G_y, G_z)$ and the product is added to the position $r(r_{hx(t)}, r_{hy(t)}, r_{hz(t)})$ of the waist at present to obtain a target waist position $r(r_{hx(t+\Delta t)}, r_{hy(t+\Delta t)}, r_{hy(t+\Delta t)})$ $(=r(r_{hx(t)}, r_{hy(t)}, r_{hz(t)})+G(G_x, G_y, G_z)+\epsilon(\epsilon_x, \epsilon_y, \epsilon_z))$ at next time $t=t+\Delta t$ (step S72).

Then, it is determined whether or not the present support polygon can be formed at the next target waist position (step S73). This determination is performed by calculating a next target waist position while the landed points of the landed links are maintained. In other words, inverse kinetic calculation is performed from the waist position and the landed positions, and if a result of the calculation exhibits that the angle is within a movable angle and the torque is within the allowable torque of the joint actuators, then it is determined that the formation of the present support polygon at the next target waist position can be realized.

If the present support polygon cannot be formed at the next target waist position, then it is determined that it is impossible to move the ZMP into the stable region which can be formed by the foot parts, and the entire processing routine is ended.

On the other hand, if the present support polygon can be formed at the next target waist position, then the ZMP when the waist is moved to the next target waist position (that is, a next ZMP) is calculated (step S74).

Then, it is determined whether or not the ZMP exists within the stable region which can be formed by the foot parts (step S75). If a result of the determination is in the affirmative, then it is determined that the ZMP can be moved into the stable region which can be formed by the foot parts (step S76), and the entire processing routine is ended. On the other hand, if the result of the determination is in the negative, then the next waist position is set to the present waist position and the next ZMP is set to the present ZMP, whereafter the processing returns to step S71 to repetitively execute similar processes.

It is to be noted that, in the example of the motion illustrated in FIGS. 130 and 131, where the length of the upper arm is represented by $l_1$, the length of the forehand by $l_2$, the shoulder roll angle by $\alpha$, the elbow pitch angle by $\beta$, the length from the shoulder to the hand by $l_{12}$, the angle defined by a line interconnecting the shoulder and the hand by $\gamma$, and the height of the shoulder by h (FIG. 132), within the period of the motion of landing the left and right hands onto the floor rearward of the body, the hands do not collide with the floor at all by causing the elbow pitch axes 7 to operate so as to satisfy the following expressions:

$$l_2 = l_1 \cos \alpha + l_2 \sin(\alpha + \beta - 90)$$

$$l_{12} \sin \gamma < h$$

Further, the standing up motion pattern illustrated in FIG. 92 indicates a standing up motion of the legged mobile robot whose body is modeled into a link structure wherein a shoulder joint pitch axis, the trunk pitch axis, a hip joint pitch axis and a knee pitch axis are connected in the heightwise direction. In FIG. 133, a standing up motion of the legged mobile robot is illustrated with the legged mobile robot generalized into a link structure wherein a plurality of joint axes substantially parallel to each other and each having a joint degree-of-freedom are connected to each other in the lengthwise direction.

The link structure shown in FIG. 133 is formed by connecting a plurality of substantially parallel joint axes each having a joint degree-of-freedom in the lengthwise direction. A standing up motion from an on-floor posture wherein all of the links are landed on the floor is realized using links A, B, C, D, E and F.

It is to be noted, however, that, while each of the links A to F need not necessarily be a single link but actually includes a plurality of links connected to each other through a joint axis or axes, it is assumed that, within a period of a standing up motion, the joint axis or axes do not operate and the straightness between the links is maintained so that they act as if they were a single link. For example, the link A includes the first to hth links from an end of the link structure; the link B includes links from a link next to the hth link to the ith link; the link C includes links from a link next to the ith link to the jth link; the link D includes links from a link next to the jth link to the kth link; the link E includes links from a link next to the kth link to the lth link; and the link F includes links from a link next to the lth link to the mth link (or the link at the other end of the link structure).

First, a landed polygon is formed between the Fth link and the Ath link and the ZMP is set within the landed polygon ((1) of FIG. 133).

Then, the ZMP is set within a landed polygon between the Eth link and the Ath link ((2) of FIG. 133). At this time, a movement of the Fth link such as to take off two or more links from the end of the link structure from the floor may be used.

Then, a narrower landed polygon is newly formed between the Fth link and the Ath link and the ZMP is set within the landed polygon ((3) of FIG. 133). For example, the Fth link in a taken-off state is bent so that an end portion thereof is landed onto the floor to form a new landed polygon.

Then, a landed polygon is formed newly between the Fth link and the Dth or Cth link, and the ZMP is set within the landed polygon ((4) of FIG. 133). At this time, a movement of the Ath link such as to take off two or more links from the other end of the link structure from the floor may be used.

Thereafter, the Dth link is landed to newly form a landed polygon from the Fth link and the Ath link, and the ZMP is set within the landed polygon ((5) of FIG. 133). For example, the Ath link in a taken-off state is bent so that an end portion thereof is landed onto the floor to form a new landed polygon.

Then, a landed polygon is newly formed from the Fth link and the Ath link, and the ZMP is set within the landed polygon ((6) of FIG. 133). For example, the Dth link in a landed state (contacting to the floor) is taken off from the floor while the opposite end points of the link structure are kept landed.

Thereafter, the end points of both end links F and A are registered with each other to move the ZMP into the support polygon which is formed only from the Ath link ((7) of FIG. 133).

Finally, the links are moved into the basic standing posture while the ZMP is kept set within the support polygon formed only from the Ath link ((8) of FIG. 133).

F-2. Standing Up Operation from the Basic Prone Posture

Figure 134:
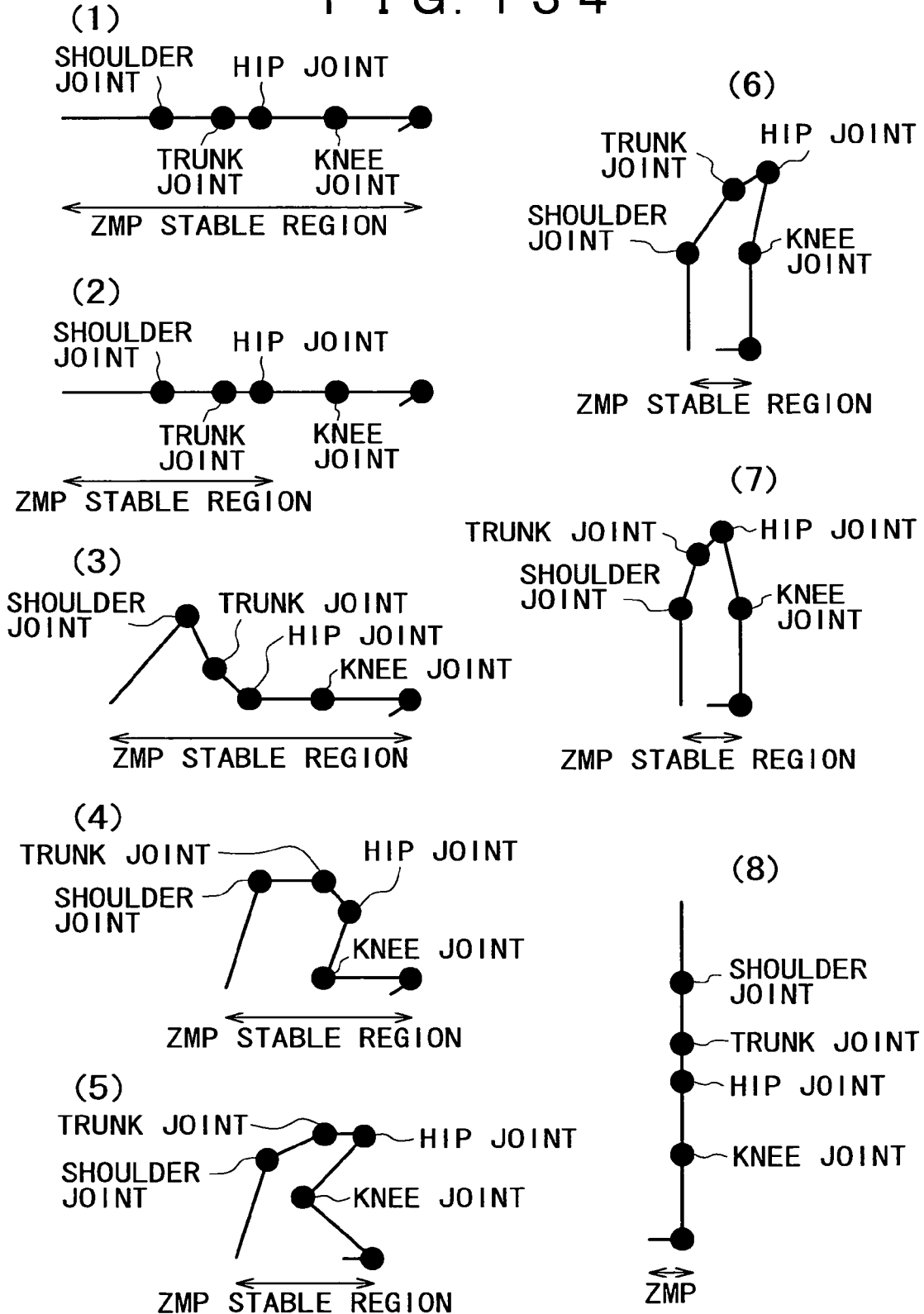
FIG. 134 is a view illustrating a manner wherein the legged mobile robot 100 according to the embodiment of the present invention performs a standing up motion from its prone posture through synchronous and cooperative driving of the shoulder joint pitch axis 4, trunk pitch axis 9, hip joint pitch axis 12 and knee joint pitch axis 14 in the form of a joint link model.

FIG. 134 illustrates a manner wherein the legged mobile robot 100 according to the present embodiment performs a standing up motion through synchronous and cooperative driving of the shoulder joint pitch axes 4, trunk pitch axis 9, hip joint pitch axes 12 and knee joint pitch axes 14 in the form of a joint link model.

The legged mobile robot 100 according to the present embodiment can stand up also from a prone posture thereof in accordance with the processing procedure illustrated in the form of a flow chart in FIG. 91 basically similarly as in the case wherein it starts up from a supine posture. In the following, a standing up operation of the body from the basic prone posture is described with reference to the flow chart shown in FIG. 91.

Figure 135:
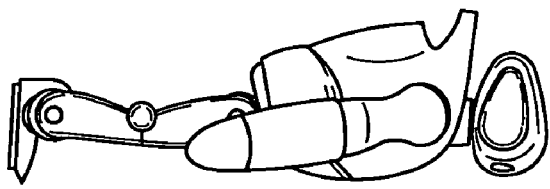
FIG. 135 is a side elevational view illustrating a manner wherein the legged mobile robot 100 stands up from its basic spine posture.
Figure 136:
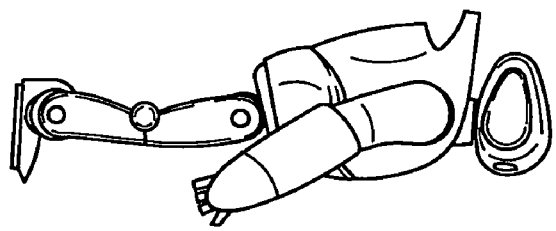
Figure 137:
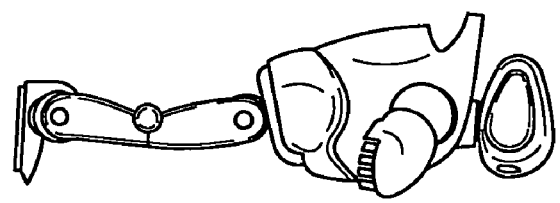

First, the body assumes a posture in which the potential energy is in the minimum in an on-floor posture (step S51). This posture corresponds to the basic supine posture, and in this posture, the links by which a shoulder joint pitch axis 4, the trunk pitch axis 9, a hip joint pitch axis 12 and an ankle pitch axis 14 which are used for a standing up motion are connected to each other are all in a landed state as seen in (1) of FIG. 134. A state of the actual machine at this time is shown in FIGS. 135 and 154.

The narrowest support polygon is searched out from among landed polygons formed from the landed links when the body is in the basic supine posture (step S52). At this time, it is determined whether or not a ZMP when at least two or more links from one end side of the body are taken off from the floor can be planned. The plannability of the ZMP can be determined taking movable angles of the link structure, torque values of the joint actuators interconnecting the links, joint forces, angular speeds, angular accelerations and so forth into consideration.

Thereafter, two or more links which do not relate to the narrowest support polygon from among the landed polygons are taken off from the floor (step S53). The step S53 corresponds to (2) of FIG. 134. On the actual machine, the lower part of the body including the gravity center link for interconnecting the trunk joint and the hip joints is extracted as the support polygons, and two or more links from the shoulder joints to the trunk joints are taken off as links which do not relate to the support polygon.

Figure 138:
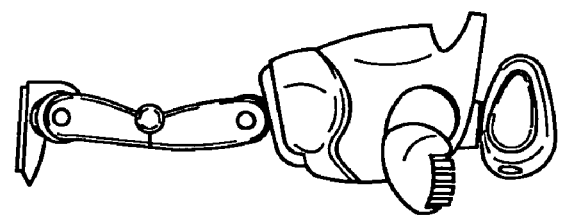
Figure 139:
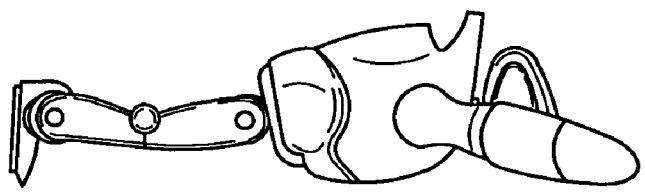
Figure 140:
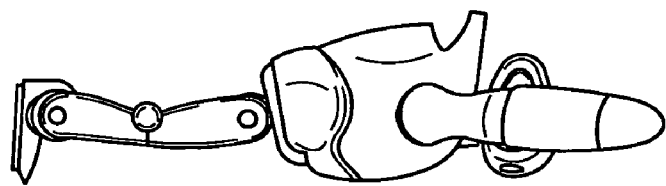
Figure 141:
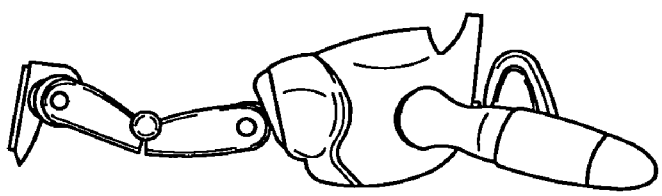
Figure 142:
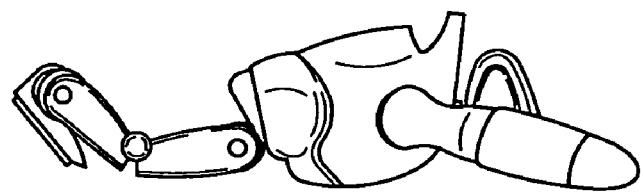
Figure 143:
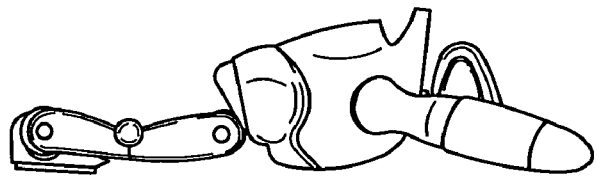
Figure 157:
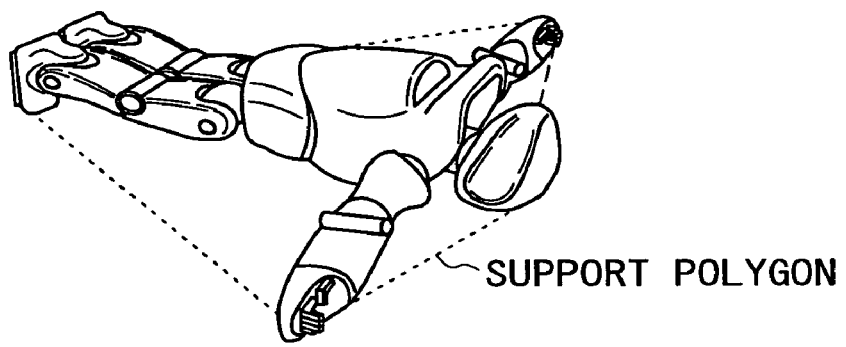
Figure 158:
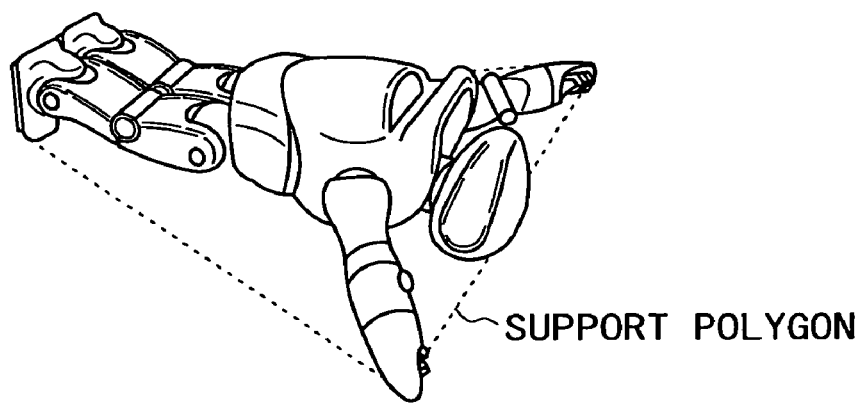
Figure 159:
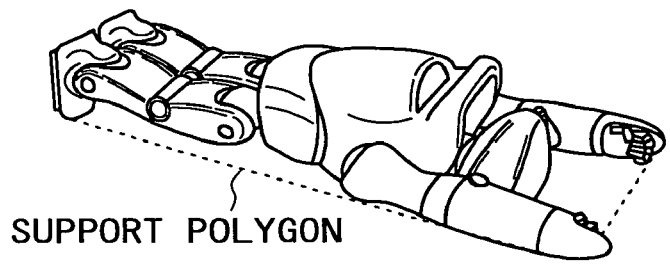
Figure 160:
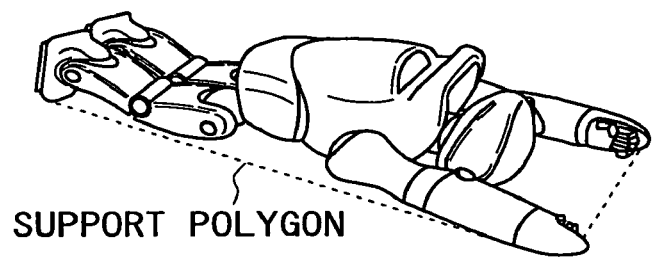
Figure 161:
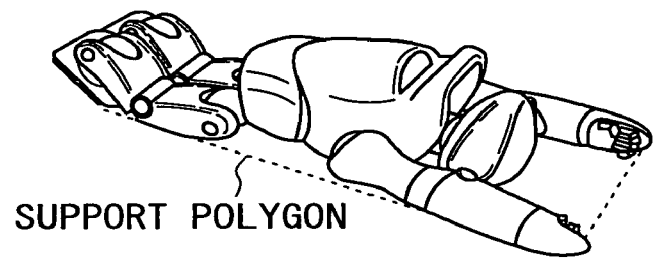
Figure 162:
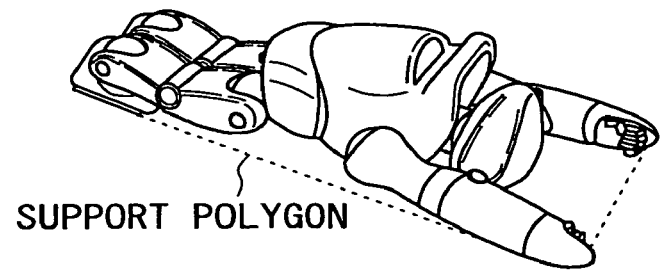
Figure 163:
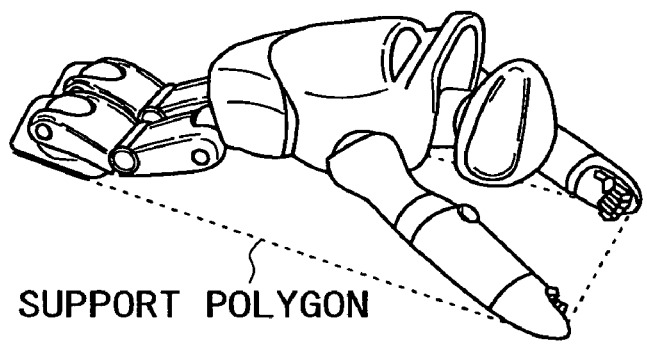
Figure 164:
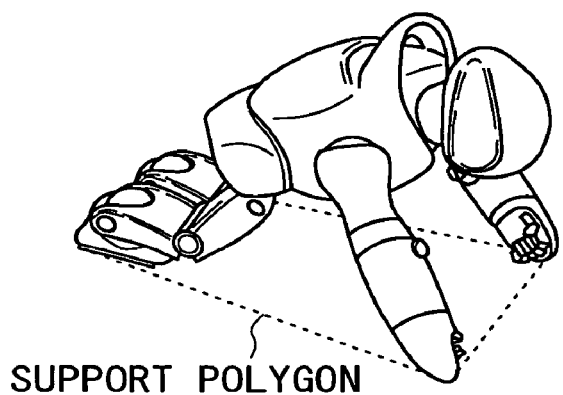
Figure 165:
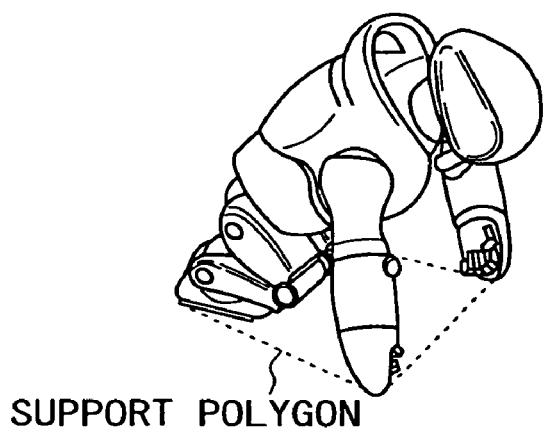
Figure 166:
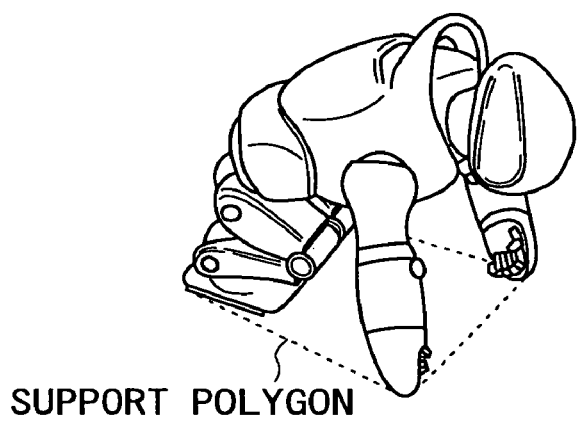
Figure 167:
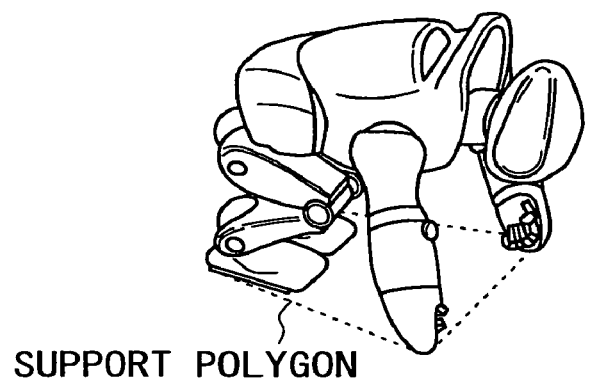
Figure 168:
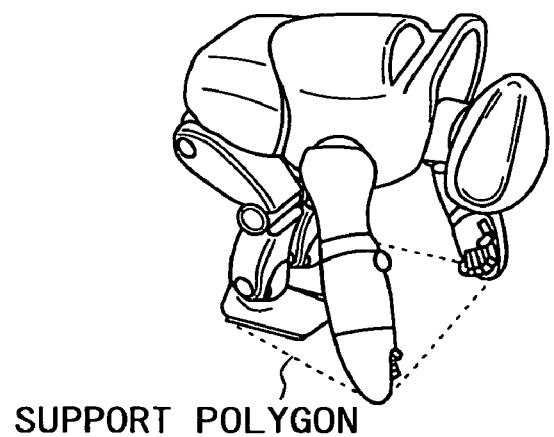
Figure 169:
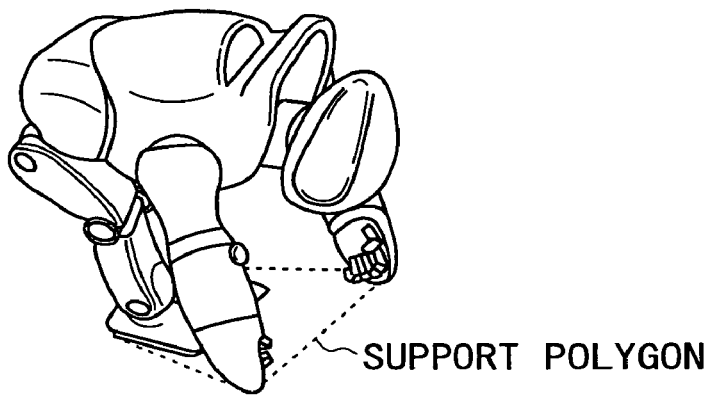
Figure 170:
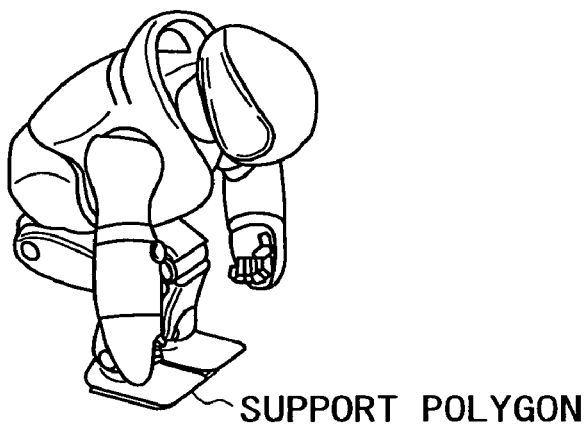
Figure 171:
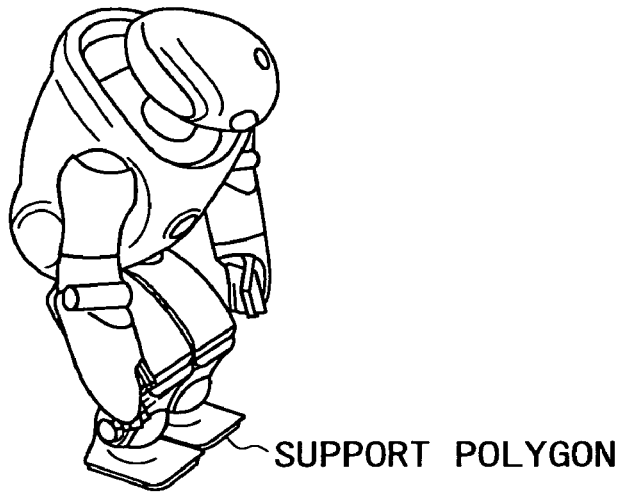
Figure 172:
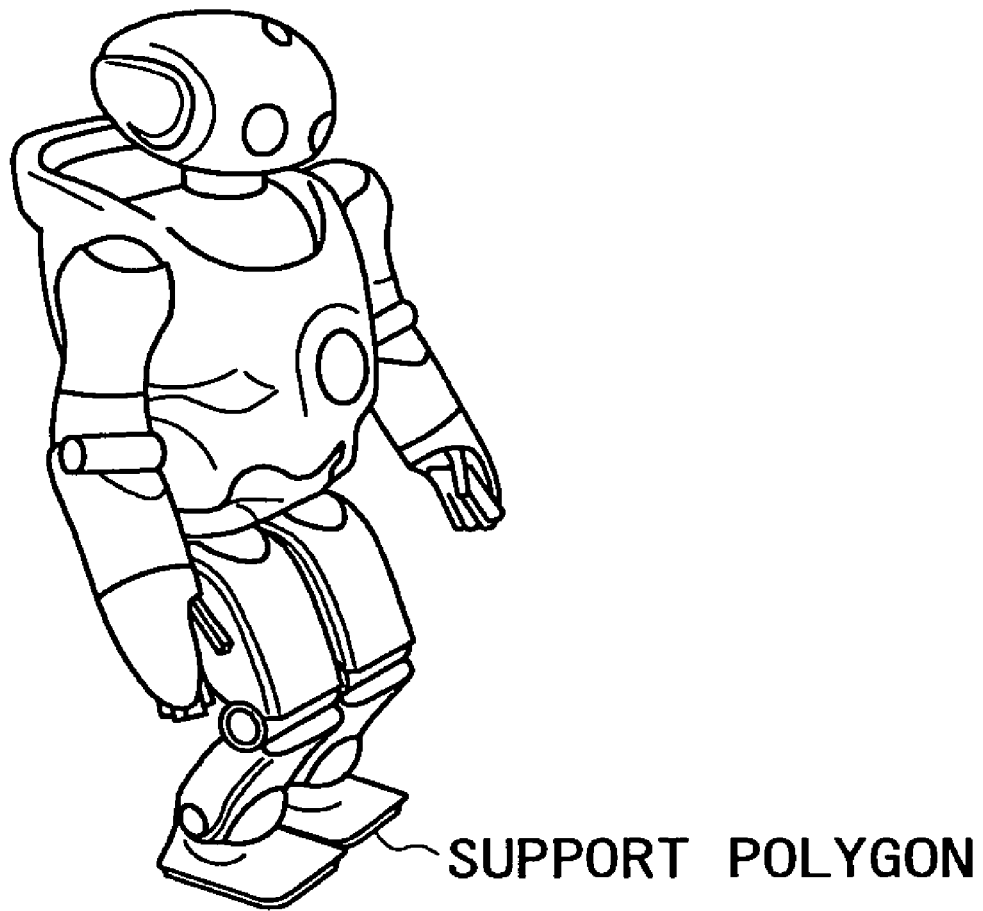

A motion of the actual machine at this time is illustrated in FIGS. 136 to 144 and 155 to 163. In the example illustrated, the shoulder roll axis actuators $A_5$ for the opposite left and right arm parts are rendered operative to pivot the arm parts approximately by 90 degrees around the shoulder roll axes along the floor (FIGS. 136 to 137 and 155 to 156). Then, the upper arm yaw axis actuators $A_6$ are rendered operative to pivot the arm parts approximately by 180 degrees around the upper arm yaw axes (FIGS. 138 and 157). Further, the shoulder roll axis actuators $A_5$ are rendered operative to pivot the arm parts approximately by 90 degrees around the shoulder roll axes along the floor until the arm parts are moved to the side faces of the head part (FIGS. 138 to 141 and 157 to 160).

In the series of motions illustrated in FIGS. 136 to 141 and 165 to 170, each of the left and right arm parts draws a semi-circle. At this time, it is possible to detect presence or absence of an obstacle on the floor around the body to secure a safe working region necessary for a stating up motion.

Then, one or more non-landed links from the one end side are bent to land an end portion of the links to form a narrower landed polygon (step S54). The step S54 corresponds to (3) of FIG. 134.

After the new landed polygon is formed, it is checked whether or not it is possible to set the ZMP in the landed polygon (step S55). This is determined taking movable angles of the link structure, torque values of the joint actuators which interconnect the links, joint forces, angular speeds, angular accelerations and so forth into consideration. Then, the ZMP is moved into the landed polygon to form a new support polygon (step S56).

On the actual machine, while the body is in a state wherein the left and right arm parts remain extended straightly with the elbow pitch axes 7 fixed, the shoulder pitch axis actuators $A_4$, trunk pitch axis actuator $A_9$, hip joint pitch axes $A_{12}$ and knee joint pitch axis actuators $A_{14}$ are rendered operative to form a support polygon formed from a closed link posture wherein the hands and the opposite left and right knees are landed (FIGS. 142 to 144 and 161 to 163).

Figure 144:
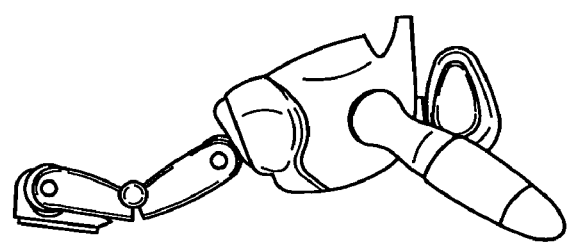
Figure 145:
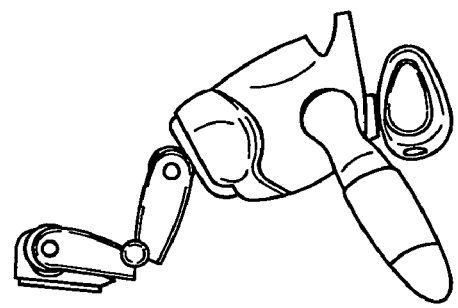
Figure 146:
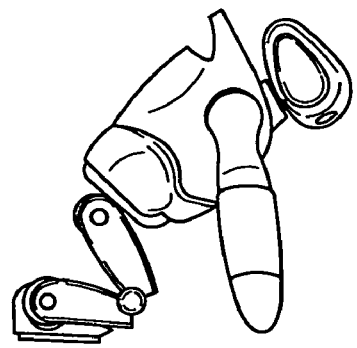
Figure 147:
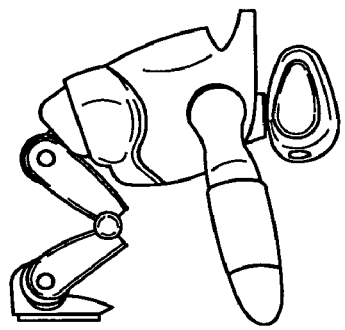
Figure 148:
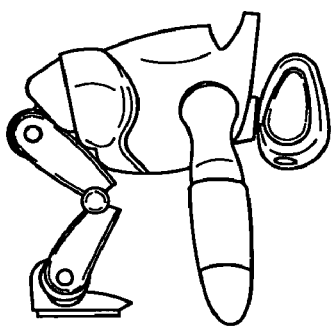
Figure 149:
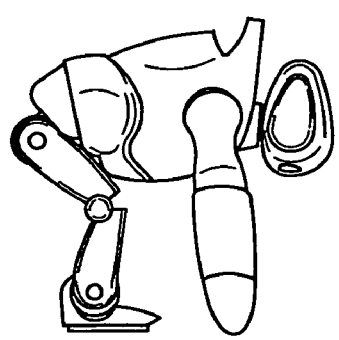
Figure 150:
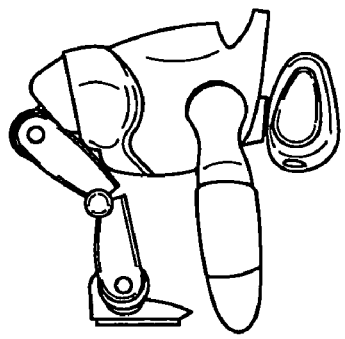
Figure 151:
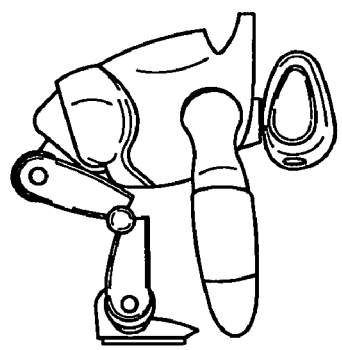
Figure 152:
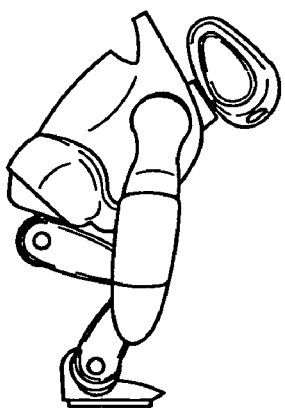
Figure 156:
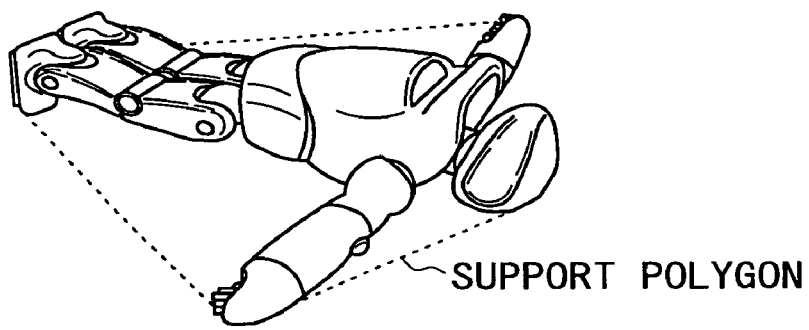

In the posture of the actual machine shown in FIGS. 144 and 153, the support polygon is not sufficiently narrow. Therefore, the landed points are moved to reduce the support polygon (step S60). As regards the angle of the arms when the support polygon is reduced, the angle defined by a normal extending from the axis of each shoulder toward the floor and the center axis of each arm is preferably within a predetermined angle based on the torque amount.

On the actual machine, while the left and right arm parts remains extended straightly, the hands are gradually moved toward the soles which are the other landed points to form a narrower support polygon (FIGS. 145 to 148 and 164 to 167).

Here, it is determined whether or not the support polygon is sufficiently narrow (step S57). In this determination, it is determined whether or not the gravity center link interconnecting the trunk pitch axis and the hip joint pitch axes can be taken off from the floor or whether or not the ZMP can be moved into the ZMP stable region formed only from the foot parts taking movable angles of the link structure, torque values of the joint actuators which interconnect the links, joint forces, angular speeds, angular accelerations and so forth into consideration. Where the actual machine assumes the posture illustrated in FIGS. 148 and 165, it is determined that a sufficiently narrow support polygon is formed.

Then, in response to that the support polygon of the body has become sufficiently narrow, while the ZMP is kept within the support polygon formed by the landed links of the opposite end links, the distance between the end portions of the opposite end links which form the support polygon is reduced to move the ZMP to the other end side of the link structure (step S58). This corresponds to (6) to (7) of FIG. 134.

On the actual machine, while the hands and the soles as the end portions of the opposite end links of the landed polygon remain landed on the floor, the distance between the hands and the soles is gradually reduced to move the ZMP toward the soles. A motion of the actual machine at this time is illustrated in FIGS. 149 to 150 and 168 to 169.

Then, in response to that the ZMP enters the landed polygon formed only from a number of landed links smaller than a second predetermined number from the other end of the link structure, a number of links greater than a first predetermined number from the one end side of the link structure are taken off from the floor while the ZMP remains accommodated in the landed polygon and are then expanded in the lengthwise direction to complete the standing up motion (step S59). This corresponds to (8) of FIG. 134.

On the actual machine, in response to that the ZMP enters the landed polygon formed from the soles, the links from the shoulder joint pitch axes 4 to the knee pitch axes 14 are taken off from the floor while the ZMP is kept accommodated in the landed polygon and are expanded in the lengthwise direction to complete the standing up motion. A motion of the actual machine at this time is illustrated in FIGS. 151 to 153 and 170 to 172.

When the non-landed links are expanded in the lengthwise direction at the final stage of standing up, it assures a high efficiency in motion of the body to positively use the knee joint pitch axes having a comparatively great mass operation amount to perform the motion.

F-3. Other Examples of a Standing Up Operation

In the standing up operation illustrated in FIG. 91, postures with which the ZMP support polygon is minimized are combined in a time series to perform a standing up operation having a motion pattern with which the external moment is minimized. This standing up motion makes use of a step changing motion of the hand parts and the foot parts within the process wherein a smaller support polygon is successively formed. However, in order to realize a step changing motion, it is necessary for the hand parts or the foot parts to be spaced away from the floor, and two or more links which do not relate to the support polygon must be present. Depending upon the posture of the body, however, it is sometimes impossible to perform a step changing motion. In this instance, the standing up motion itself results in failure (step S64 of FIG. 91).

In contrast, where it is impossible to perform a step changing motion of the hand parts or the foot parts in the process wherein a smaller support polygon is successively formed, the possibility that a standing up motion results in failure can be reduced by making use of a dragging movement of the hand parts or the foot parts. In the following, description is given of a standing up operation which makes use of a step changing motion and a dragging motion of the hand parts and/or the foot parts in the process wherein a smaller support polygon is successively formed.

Figure 174:
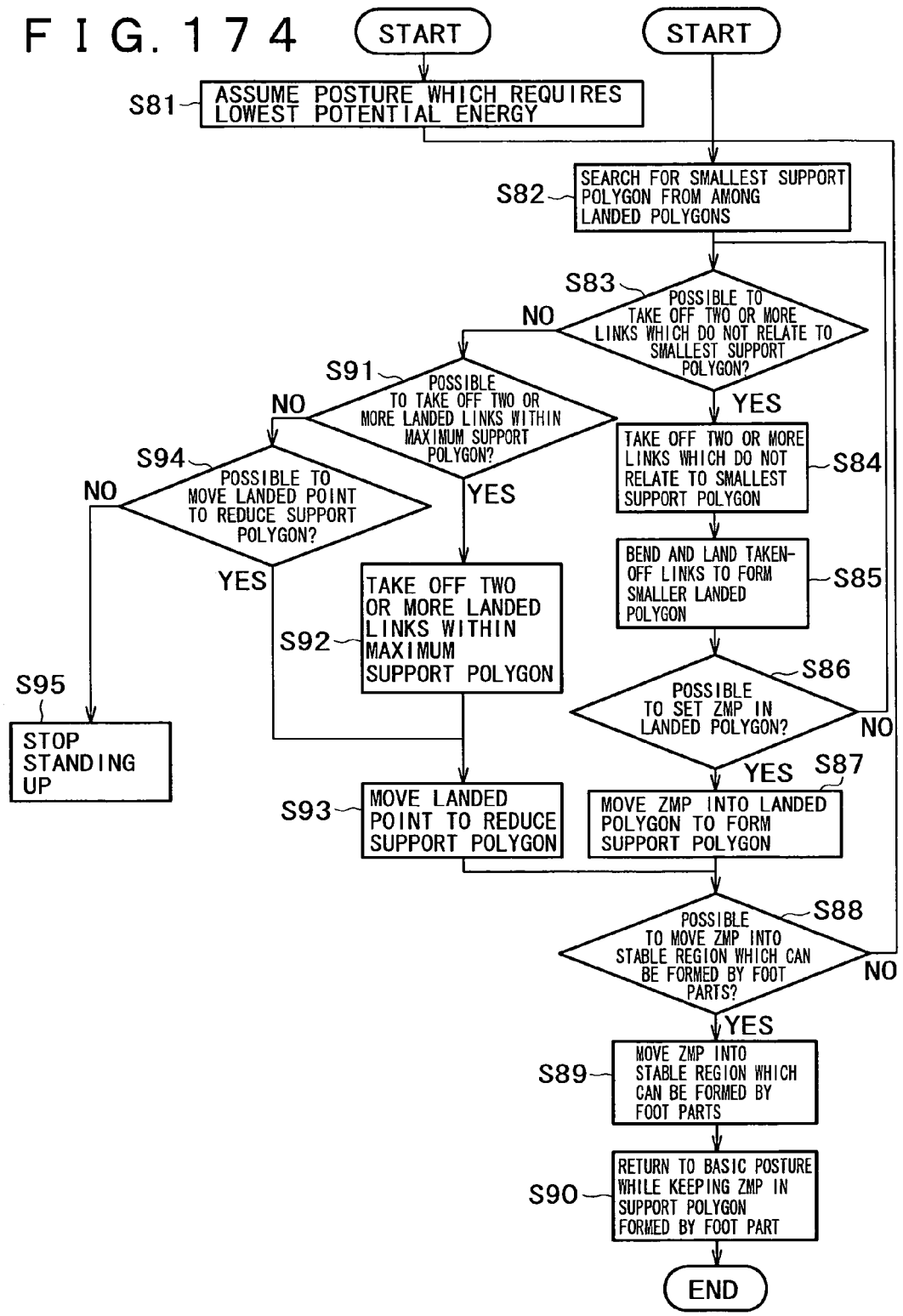
FIG. 174 is a flow chart illustrating a standing up operation which makes use of a dragging motion and a step changing motion of hand parts and foot parts.

FIG. 174 illustrates a standing up operation which makes use of a step changing motion and a dragging motion of the hand parts and/or the foot parts in the form of a flow chart. In the following, the procedure of the standing up motion is described. FIGS. 175 to 191 successively illustrate a manner wherein the body performs standing up from the basic prone posture thereof making use of a step changing motion or a dragging motion of the hand parts or the foot parts. In the following description, the figures are referred to suitably.

Figure 175:
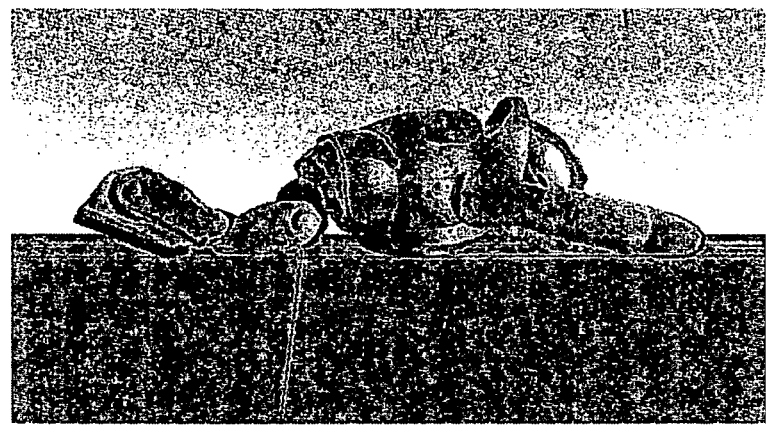
FIGS. 175 to 191 are side elevational views illustrating a manner wherein the legged mobile robot 100 stands up from its basic prone posture while making use of a dragging motion and a step changing motion of the hand parts and the foot parts.
Figure 176:
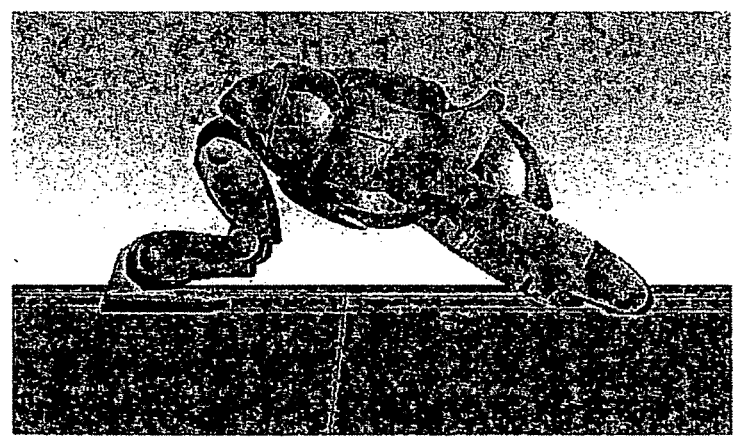
Figure 177:
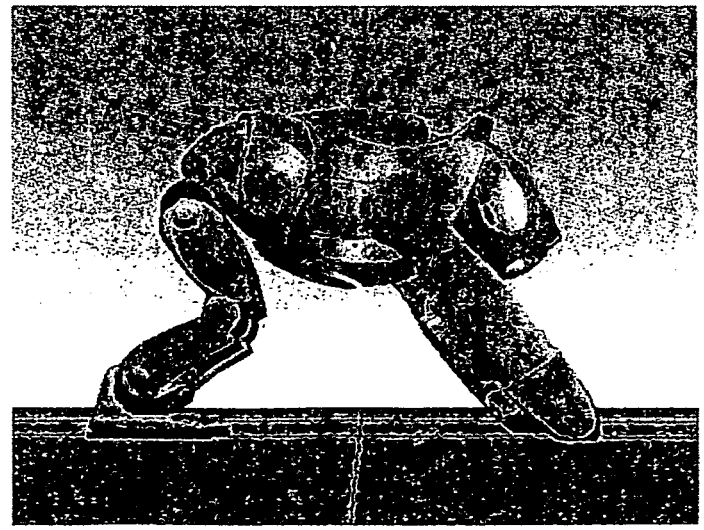
Figure 178:
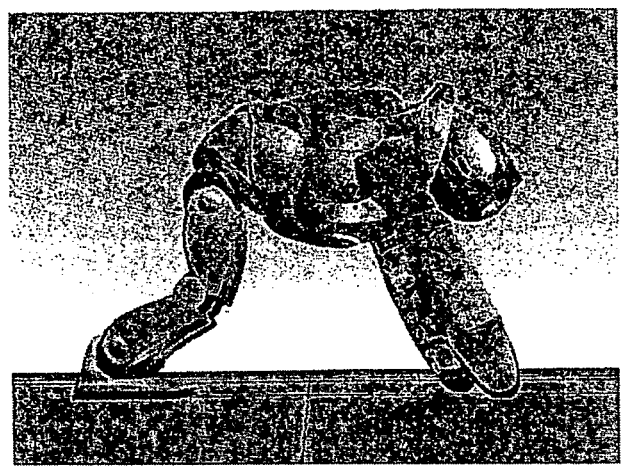
Figure 179:
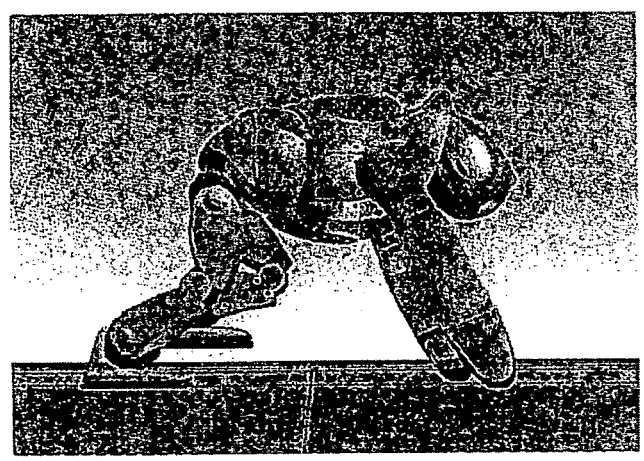
Figure 180:
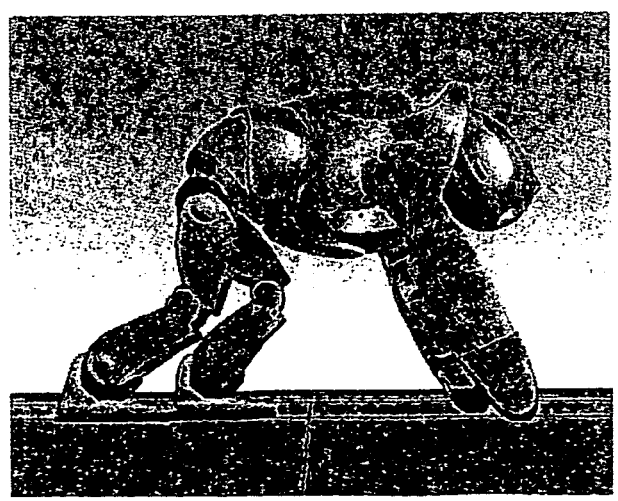
Figure 181:
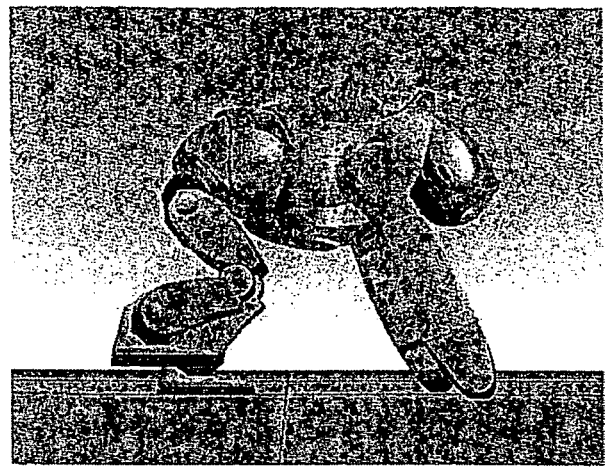
Figure 182:
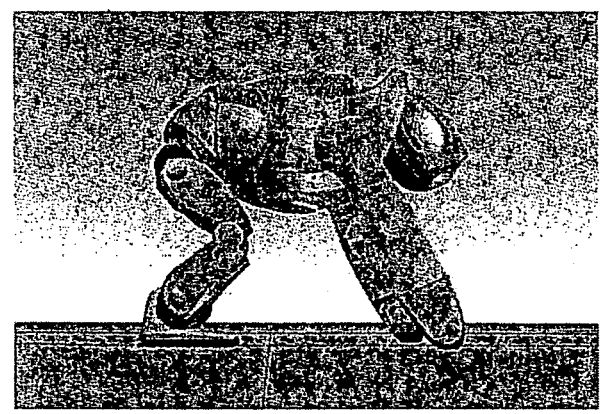
Figure 183:
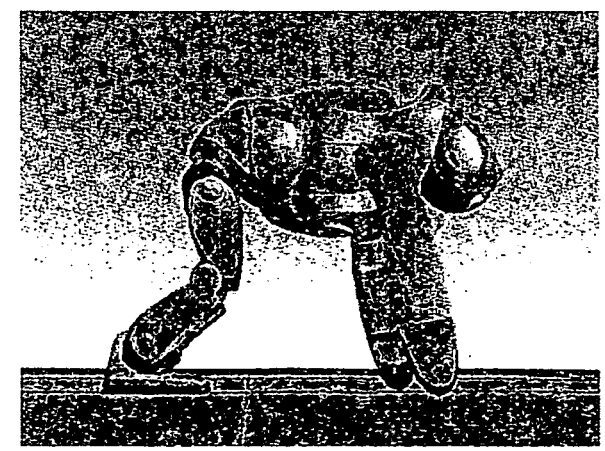
Figure 184:
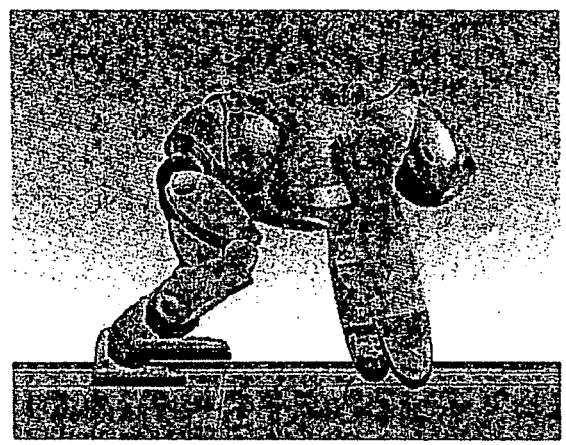
Figure 185:
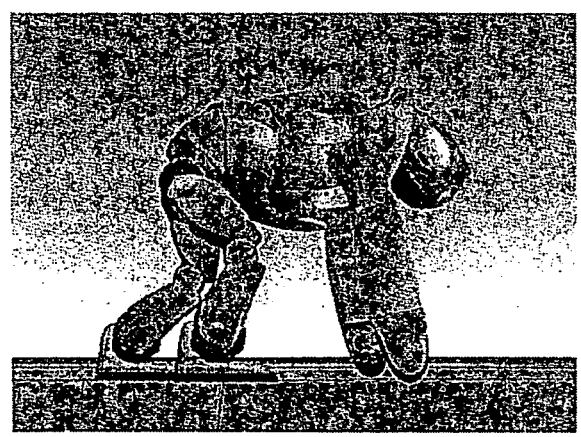
Figure 186:
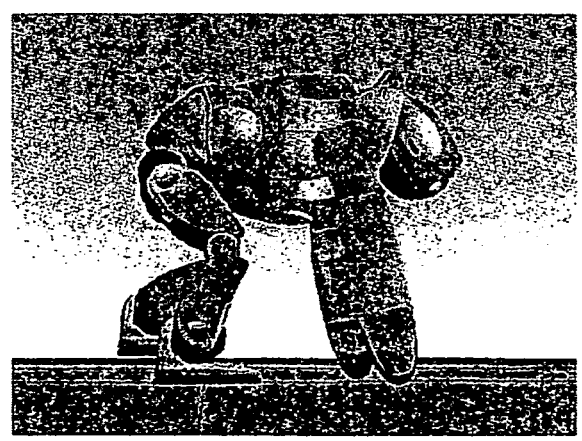
Figure 187:
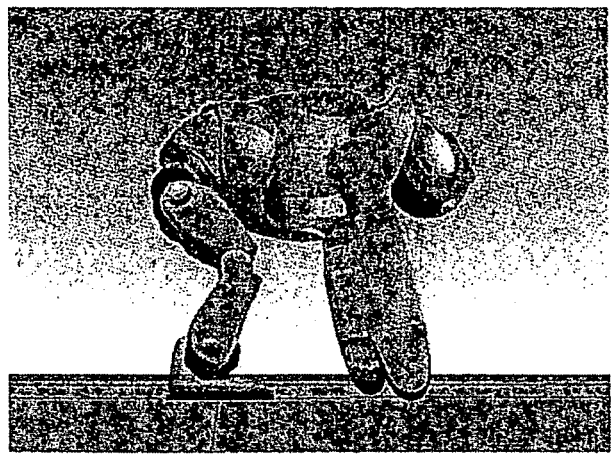

First, the body assumes a posture in which the potential energy is in the minimum in an on-floor posture (step S81). This posture corresponds to the basic prone posture, and a state of the actual machine at this time is shown in FIG. 175.

It is to be noted, however, that, when standing up is performed continuously to a tumbling motion, the step S81 can be omitted to complete the standing up motion in shorter time (hereinafter described).

The narrowest support polygon is searched out from among landed polygons formed from the landed links when the body is in the basic prone posture (step S82). At this time, it is determined whether or not a ZMP when at least two or more links from one end side of the body are taken off from the floor can be planned. The plannability of the ZMP can be determined taking movable angles of the link structure, torque values of the joint actuators interconnecting the links, joint forces, angular speeds, angular accelerations and so forth into consideration.

Here, it is determined whether or not two or more links which do not relate to the narrowest support polygon can be taken off from the floor (step S83). If two or more links which do not relate to the narrowest support polygon can be taken off from the floor, then the processing advances to step S84 so that formation of a smaller landed polygon by a step changing motion of the hand parts or the foot parts is performed. On the other hand, if two or more links which do not relate to the narrowest support polygon cannot be taken off from the floor, then the processing advances to step S91 so that formation of a smaller landed polygon is performed making use of a dragging motion of the hand parts or the foot parts.

At step S84, two or more links which do not relate to the smallest support polygon are taken off from the floor. Further, the non-landed links are bent and landed to form a smaller landed polygon (step S85).

For example, while the robot which is in the process of standing up with the opposite hands and feet landed on the floor changes the steps of the left foot and the right foot in FIGS. 179 to 181 and 184 to 186, the non-landed links are bent and landed to the floor to make an attempt to form a smaller landed polygon as seen in FIGS. 175, 182 to 183, 185 and 187.

Then, after the new landed polygon is formed, it is checked whether or not it is possible to set the ZMP in the landed polygon (step S86). This is determined taking movable angles of the link structure, torque values of the joint actuators which interconnect the links, joint forces, angular speeds, angular accelerations and so forth into consideration. Then, the ZMP is moved into the landed polygon to form a new support polygon (step 87). If it is not possible to set the ZMP in the landed polygon, then the processing returns to step S83, at which it is checked again which one of a step changing motion and a dragging motion of the hand parts or the foot parts should be executed.

Here, it is determined whether or not the support polygon is sufficiently narrow (step S88). In this determination, it is determined whether or not the gravity center link interconnecting the trunk pitch axis and the hip joint pitch axes can be taken off from the floor or whether or not the ZMP can be moved into the ZMP stable region formed only from the foot parts taking movable angles of the link structure, torque values of the joint actuators which interconnect the links, joint forces, angular speeds, angular accelerations and so forth into consideration.

Then, in response to that the support polygon of the body has become sufficiently narrow, while the ZMP is kept within the support polygon formed by the landed links of the opposite end links, the distance between the end portions of the opposite end links which form the support polygon is reduced to move the ZMP to the other end side of the link structure (step S89).

Figure 188:
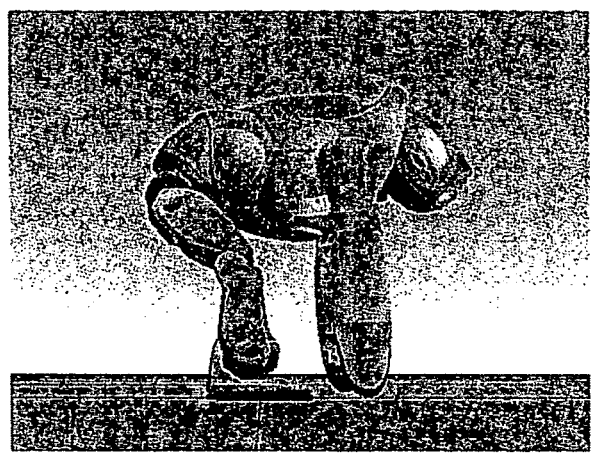
Figure 189:
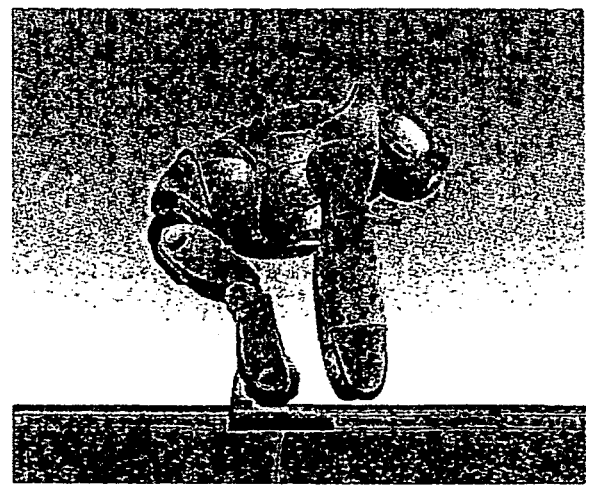

On the actual machine, while the hands and the soles as the end portions of the opposite end links of the landed polygon remain landed on the floor, the distance between the hands and the soles is gradually reduced to move the ZMP toward the soles. A motion of the actual machine at this time is illustrated in FIGS. 188 to 189.

Then, in response to that the ZMP enters the landed polygon formed only from a number of landed links smaller than a second predetermined number from the other end of the link structure, a number of links greater than a first predetermined number from the one end side of the link structure are taken off from the floor while the ZMP remains accommodated in the landed polygon and are then expanded in the lengthwise direction to complete the standing up motion (step S90).

Figure 190:
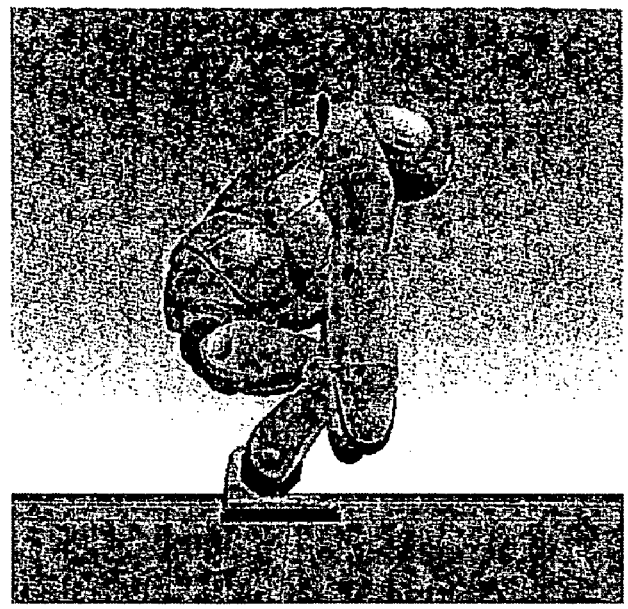
Figure 191:

On the actual machine, in response to that the ZMP enters the landed polygon formed from the soles, the links from the shoulder joint pitch axes 4 to the ankle pitch axes 14 are taken off from the floor while the ZMP is kept accommodated in the landed polygon and are expanded in the lengthwise direction to complete the standing up motion. A motion of the actual machine at this time is illustrated in FIGS. 190 to 191.

When the non-landed links are expanded in the lengthwise direction at the final stage of standing up, it assures a high efficiency in motion of the body to positively use the knee joint pitch axes having a comparatively great mass operation amount to perform the motion.

On the other hand, if it is determined at step S83 that two or more links which do not relate to the smallest support polygon cannot be taken off from the floor, then it is checked whether or not two or more landed links which are positioned on the inner side of the maximum support polygon can be taken off from the floor in order to perform a dragging motion of the hand parts or the foot parts (step S91).

Here, if two or more landed links which are positioned on the inner side of a maximum support polygon cannot be taken off from the floor, then it is determined whether or not the landed points can be moved further to reduce the support polygon. If the support polygon cannot be reduced, then the standing up motion is stopped (step S95). In other words, the standing up motion results in failure.

On the other hand, if two or more landed links which are positioned on the inner side of the maximum support polygon can be taken off from the floor, then two or more landed links which are positioned on the inner side of the maximum support polygon are taken off from the floor (step S92), and the landed points are moved making use of a dragging motion of the hand parts or the foot parts to reduce the support polygon (step S93).

For example, as seen in FIGS. 176 to 178 and 187 to 188, the robot which is in the process of standing up with the opposite hands and feet landed on the floor drags the opposite hands toward the feet while the opposite hands are kept landed on the floor to gradually decrease the support polygon.

Thereafter, it is determined whether or not the support polygon is sufficiently narrow (step S88). Then, in response to that the support polygon of the body has become sufficiently narrow, while the ZMP is kept within the support polygon formed by the landed links of the opposite end links, the distance between the end portions of the opposite end links which form the support polygon is reduced to move the ZMP to the other end side of the link structure (step S89).

Then, in response to that the ZMP enters the landed polygon formed only from a number of landed links smaller than a second predetermined number from the other end of the link structure, a number of links greater than a first predetermined number from the one end side of the link structure are taken off from the floor while the ZMP remains accommodated in the landed polygon and are then expanded in the lengthwise direction to complete the standing up motion (step S90).

Figure 199:
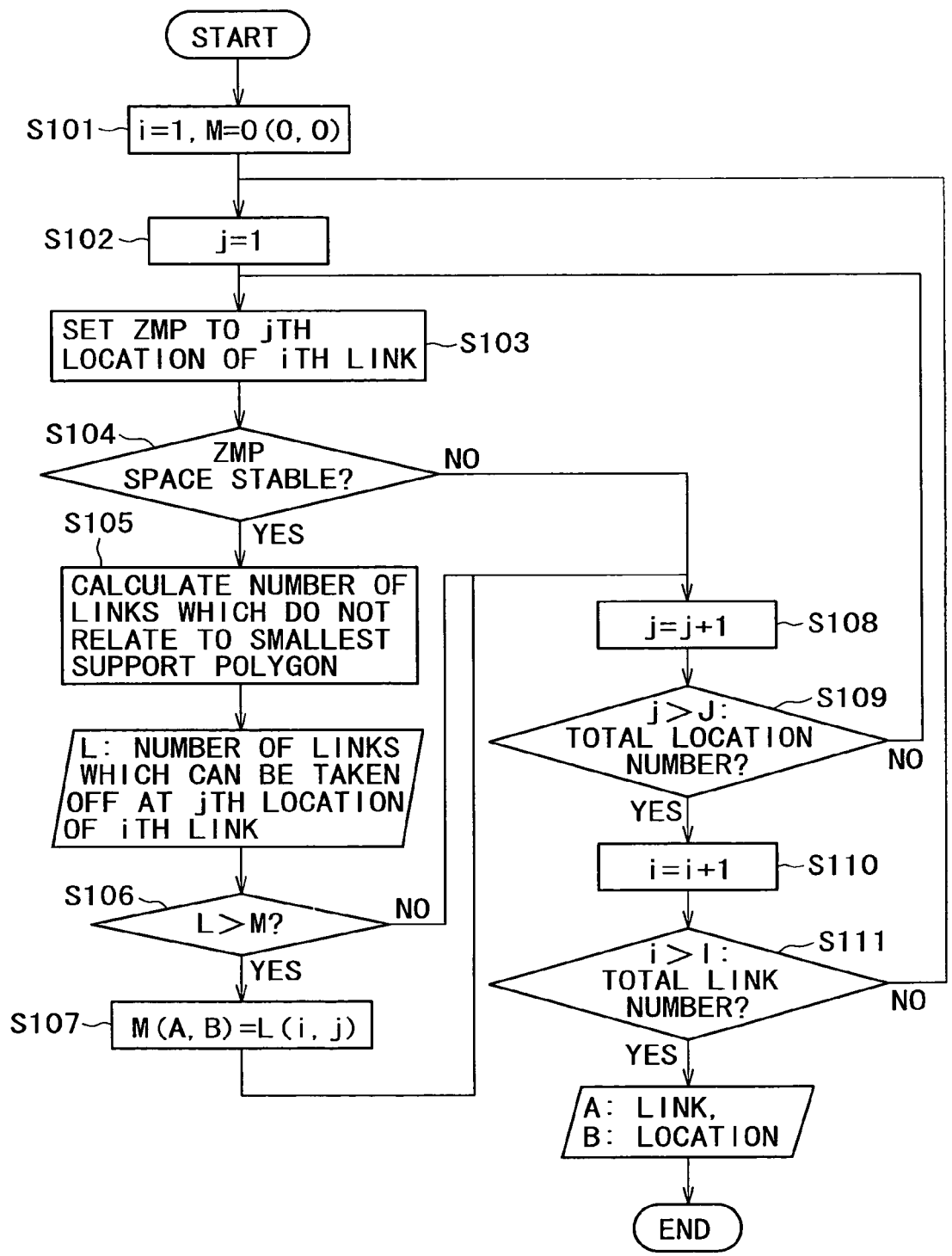
FIG. 199 is a flow chart illustrating a processing procedure for searching for a link and a location of the link at which the number of links which do not relate to the smallest support polygon is maximum.

FIG. 199 illustrates a detailed processing procedure for searching for a link having a maximum number of links which do not relate to the smallest support polygon and a location of the link at step S83 in the form of a flow chart.

First at steps S101 and S102, variables i and j and an array type variable M are initialized. Then, a ZMP is set to the jth location of the ith link (step S103).

Here, it is determined whether or not the ZMP space is stable (step S104). If the ZMP space is stable, then the number of links which do not relate to the smallest support polygon is calculated (step S105), and L is substituted into the number of links which can be taken off at the jth location of the ith link. Then, if L is greater than M (step S106), then L(i, j) is substituted into M(A, B) (step S107).

On the other hand, when the ZMP space is not stable, when L is not greater than M or after L(i, j) is substituted into M(A, B), j is incremented by 1 (step S108), and then it is determined whether or not j exceeds the total location number J (step S109). If j does not yet exceed the total location number J, then the processing returns to step S103 to repetitively execute similar processes to those described above.

Then, i is incremented by 1 (step S110), and then it is determined whether or not i is greater than the total link number I (step S111). If i is not greater than the total link number, then the processing returns to step S102 to repetitively execute processes similar to those described above.

If i is greater than the total link number I, then the link is substituted into A and the location is substituted into B, and then the present processing routine is ended.

As described hereinabove, when standing up is performed continuously to a tumbling operation, the step S81 can be omitted to complete the standing up operation in reduced time.

For example, where the center of gravity of the body exists at the waist portion, the ZMP can be set to a location at which the number of links which do not relate to the smallest support polygon is maximum. After such tumbling and landing motions, all of those links which can be take off from the floor are taken off. In particular, both of the lower limbs and the trunk are moved upwardly to take off the upper part of the body and the lower limbs from the floor simultaneously while the foot parts, the hand parts and so forth are landed onto the floor. By this, a smaller landed polygon can be formed at a reduced number of steps. Consequently, an efficient standing up movement at a higher speed can be realized.

FIGS. 192 to 198 illustrate a series of motions of the body when a standing up motion is performed continuously to a tumbling motion.

A tumbling movement toward the rear of the body is started as seen in FIGS. 192 to 193 from a standing posture shown in FIG. 192, and the waist portion at which the center of gravity of the body exists is landed onto the floor as seen in FIG. 194.

In the example illustrated in FIG. 194, the ZMP is set to the body part at which the number of links which do not relate to the smallest support polygon is maximum. Further, it is characteristic that the tumbling movement ends not in the basic prone posture but in a state wherein the leg parts are taken off from the floor, differently from the example described hereinabove with reference to FIGS. 23 to 38 and 39 to 55.

In the succeeding standing up motion, all of those links which can be taken off from the floor, that is, the leg parts and the body parts, are taken off from the floor as seen in FIG. 195 to start the standing up motion. Here, the pitch axis actuators for the hip joints and/or the trunk are driven to cause the upper part of the body to sit up as seen in FIGS. 196 to 197. The hip joint pitch axis actuator $A_{12}$ for the right leg is driven to raise the right leg, and the knee joint pitch axis actuators $A_{14}$ for the right leg is driven to bend the right leg so that the sole of the right leg is landed. Then, the hip joint pitch axis actuator $A_{12}$ for the leg is driven to raise the right leg, and the knee joint pitch axis actuators $A_{14}$ for the left leg is driven to bend the left leg so that the sole of the right leg is landed. By gradually moving the sole toward the hip joint pitch axis 12 side which is the position of the center of the gravity of the body in this manner, a narrower landed polygon than that in the original on-floor posture can be formed as seen in FIG. 198.

When a standing up motion is performed continuously to a tumbling movement, a smaller landed polygon can be formed at a reduced number of steps when compared with that of the example described hereinabove with reference to FIGS. 23 to 38 and 39 to 55. In other words, it should be recognized that, with the embodiment just described, a narrower landed polygon can be formed more efficiently and a standing up movement can be performed at a higher speed.

Supplement:

The present invention has been described in detail above with reference to a particular embodiment. However, it is apparent that those skilled in the art may modify or alter the embodiment without departing from the spirit and the scope of the present invention.

The subject matter of the present invention is not necessarily limited to products called "robot". In particular, the present invention can be applied similarly to any mechanical apparatus which makes use of electrical or mechanical actions to perform a movement similar to a motion of a human being even if it is a product which belongs to any other industrial field such as, for example, a toy.

In summary, the present invention has been disclosed by way of illustration, and the disclosed contents of the present specification shall not be interpreted restrictively. In order to determine the subject matter of the present invention, the claims appearing at the top of the specification should be referred to.

INDUSTRIAL APPLICABILITY

According to the present invention, a superior legged mobile robot and a superior tumbling motion controlling method for a legged mobile robot can be provided by which damage which may otherwise be given to the robot can be reduced as much as possible by motion control of an entire body including not only the leg parts but also the body and the arm parts during tumbling and dropping.

Further, according to the present invention, a superior motion controlling apparatus and motion controlling method for a legged mobile robot and a superior robot apparatus can be provided by which the robot can autonomously restore its standing posture from an on-floor posture such as a supine posture or a prone posture.

Furthermore, according to the present invention, a superior motion controlling apparatus and motion controlling method for a legged mobile robot and a superior robot apparatus can be provided by which the robot can restore its standing posture from an on-floor posture such as a supine posture or a prone posture through a stabilized motion with comparatively low torque.

The invention claimed is:

1. A motion controlling apparatus for a legged mobile robot which includes movable legs and performs a legged operation in a standing posture thereof, characterized in that
said legged mobile robot has a plurality of postures or states, and that
said motion controlling apparatus comprises:
first means for calculating an area S of a support polygon formed from landed points of a body of said legged mobile robot and a floor;
second means for calculating the variation $\Delta S/\Delta t$ of the area S of the support polygon per time $\Delta t$; and
third means for determining a motion of said body when the posture or state is to be changed based on the area S of the support polygon or the variation rate $\Delta S/\Delta t$ of the area S.

2. A motion controlling apparatus for a legged mobile robot according to claim 1, characterized in that said third means includes:
landed location searching means for searching for a landed location upon tumbling of said legged mobile robot based on the variation per time $\Delta t$ of the area S of the support polygon formed from the landed points of said body and the floor;
target landing point setting means for setting a target landing point at which the location selected by said landed location searching means should be landed so that the variation $\Delta S/\Delta t$ per time $\Delta t$ of the area S of the support polygon formed from the landed points of said body and the floor may be minimized; and
location landing means for landing the location selected by said landed portion searching means at the target landing point set by said target landing point setting means.

3. A motion controlling apparatus for a legged mobile robot according to claim 2, further comprising:
support polygon expansion means for moving the landed portion so that the support polygon newly formed by landing of the location selected by said location landing means may be further expanded.

4. A motion controlling apparatus for a legged mobile robot according to claim 2, characterized in that
the landing operation of the portion by said landed portion searching means and said target landing point setting means and/or the expansion operation of the support polygon by said support polygon expansion means are performed repetitively.

5. A motion controlling apparatus for a legged mobile robot according to claim 2, characterized in that
said legged mobile robot is formed from a link structure wherein a plurality of substantially parallel joint axes having a joint degree-of-freedom are connected to each other in a lengthwise direction, and
said target landing point setting means sets a location at which a link with which the number of non-landed links is maximized exists as a target.

6. A motion controlling apparatus for a legged mobile robot according to claim 1, characterized in that
said legged mobile robot is formed from a link structure wherein a plurality of substantially parallel joint axes having a joint degree-of-freedom are connected to each other in a lengthwise direction, and
said third means includes:
means for searching, when said legged mobile robot returns from its tumbling state, for the narrowest support polygon formed from the least number of links from among landed polygons formed, in an on-floor posture of said legged mobile robot in which two or more links including a gravity center link positioned at the center of gravity of said body are landed on the floor, from the landed links;
means for taking off the landed links in the landed polygons except those of the searched out support polygon;
means for bending two or more continuous ones of non-landed links until end portions of the end links land onto the floor to form a narrower landed polygon; and
means for taking off a number of links greater than a first predetermined number from one end side of said link structure to stand said body uprightly in response to that the support polygon is sufficiently narrow.

7. A motion controlling apparatus for a legged mobile robot according to claim 6, characterized in that
said means for searching for the support polygon extracts a landed link which can be taken off from the floor while a zero moment point remains plannable.

8. A motion controlling apparatus for a legged mobile robot according to claim 6, characterized in that said means for searching for the support polygon searches for a narrower support polygon while keeping the gravity center link in the landed state.

9. A motion controlling apparatus for a legged mobile robot according to claim 6, characterized in that said means for standing said body uprightly determines whether or not the gravity center link can be taken off in a state wherein the end portions of the opposite end links of the landed polygon are landed thereby to determine whether or not the support polygon is sufficiently narrow.

10. A motion controlling apparatus for a legged mobile robot according to claim 6, characterized in that said means for standing said body uprightly includes:

means for taking off the gravity center link from the floor in a state wherein the end portions of the opposite end links of the support polygon are landed;

means for reducing the distance between the end portions of the opposite end links of the support polygon in a state wherein the gravity center link is taken off to move a zero moment point to the other end side of said link structure; and means for taking off, in response to that the zero moment point enters a landed polygon formed only from a number of landed links smaller than a second predetermined number from the other end of said link structure, a number of links greater than a first predetermined number from the one end side of said link structure while the zero moment point is kept accommodated in the landed polygon to expand the non-landed links in the lengthwise direction.

11. A motion controlling apparatus for a legged mobile robot according to claim 10, characterized in that said means for expanding the non-landed links in the lengthwise direction operates positively using a joint degree-of-freedom having a comparatively great mass operation amount.

12. A motion controlling apparatus for a legged mobile robot according to claim 6, characterized in that said link structure includes at least shoulder joint pitch axes, a trunk pitch axis, hip joint pitch axes and knee pitch axes connected to each other in the heightwise direction of said body.

13. A motion controlling apparatus for a legged mobile robot according to claim 12, characterized in that said means for searching for the support polygon extracts two or more continuous links extending from one end side of said link structure which includes at least the shoulder joint pitch axes as links which can be taken off from the floor while the zero moment point remains plannable.

14. A motion controlling apparatus for a legged mobile robot according to claim 12, characterized in that said means for searching for the support polygon searches for a narrower support polygon while a link which interconnects said trunk pitch axis and said hip joint pitch axes is kept as the gravity center link in the landed state.

15. A motion controlling apparatus for a legged mobile robot according to claim 12, characterized in that said means for forming a narrower landed polygon bends the non-landed links around said shoulder joint pitch axes to land the hands which are an end portion of one of the end links onto the floor.

16. A motion controlling apparatus for a legged mobile robot according to claim 15, characterized in that, where the length of the upper arms is represented by $l_1$, the length of the forehands by $l_2$, the shoulder roll angle by $\alpha$, the elbow pitch angle by $\beta$, the length from the shoulders to the hands by $l_{12}$, the angle defined by a line interconnecting each of the shoulders and a corresponding one of the hands by $\gamma$, and the height of the shoulders by h, each of the arm parts operates so as to satisfy the following expressions:

$l_{12} = l_1 \cos \alpha + l_2 \sin (\alpha+\beta-90)$ $l_{12} \sin \gamma < h$.

17. A motion controlling apparatus for a legged mobile robot according to claim 12, characterized in that said means for searching for the support polygon extracts two or more continuous links extending from the other end side of said link structure and including at least said knee joint pitch axes as the links which can be taken off from the floor while the zero moment point remains plannable.

18. A motion controlling apparatus for a legged mobile robot according to claim 12, characterized in that said means for forming a narrower landed polygon bends the non-landed links around said knee joint pitch axes to land the soles which are end portions of the end links of said link structure.

19. A motion controlling apparatus for a legged mobile robot according to claim 12, characterized in that said means for standing said body uprightly determines whether or not the gravity center link which interconnects said trunk pitch axis and said hip joint pitch axes can be taken off from the floor in a state wherein the hands and the soles as the end portions of the opposite end links of the landed polygon to determine whether or not the support polygon is sufficiently narrow.

20. A motion controlling apparatus for a legged mobile robot according to claim 12, characterized in that said means for standing said body uprightly includes:

means for taking off the gravity center link which interconnects said trunk pitch and said hip joint pitch axes from the floor in a state wherein the hands and the soles as the end portions of the opposite end links of the landed polygon are landed;

means for contracting the distance between the hands and the soles as the end portions of the opposite end links of the landed polygon in a state wherein the gravity center link is taken off from the floor to move the zero moment point to the soles; and means for taking off, in response to that the zero moment point enters the landed polygon formed from the soles, the links from said shoulder pitch axes to said knee pitch axes while the zero moment point is kept accommodated in the landed polygon to expand the non-landed links in the lengthwise direction to stand said body uprightly.

21. A motion controlling apparatus for a legged mobile robot according to claim 20, characterized in that said means for expanding the non-landed links in the lengthwise direction operates positively using said knee joint pitch axes having a comparatively great mass operation amount.

22. A motion controlling apparatus for a legged mobile robot according to claim 6, characterized in that said means for producing a narrower landed polygon selectively utilizes one of a step changing motion and a dragging motion on the floor of the hand parts or the foot parts in response to whether it is possible to take off two or more of the links which do not relate to the smallest support polygon from the floor to form a narrower landed polygon.

23. A motion controlling method for a legged mobile robot which includes movable legs and performs a legged operation in a standing posture thereof, characterized in that
said legged mobile robot has a plurality of postures or states, and that
said motion controlling method comprises:
a first step of calculating an area S of a support polygon formed from landed points of a body of said legged mobile robot and a floor;
a second step of calculating the variation $\Delta S/\Delta t$ of the area S of the support polygon per time $\Delta t$; and
a third step of determining a motion of said body when the posture or state is to be changed based on the area S of the support polygon or the variation rate $\Delta S/\Delta t$ of the area S.

24. A motion controlling method for a legged mobile robot according to claim 23, characterized in that said third step includes:
a landed location searching step for searching for a landed location upon tumbling of said legged mobile robot based on the variation per time $\Delta t$ of the area S of the support polygon formed from the landed points of said body and the floor;
a target landing point setting step of setting a target landing point at which the location selected at the landed location searching step should be landed so that the variation $\Delta S/\Delta t$ per time $\Delta t$ of the area S of the support polygon formed from the landed points of said body and the floor may be minimized; and
a location landing step of landing the location selected at the landed portion searching step at the target landing point set at the target landing point setting step.

25. A motion controlling method for a legged mobile robot according to claim 24, further comprising:
a support polygon expansion step for moving the landed portion so that the support polygon newly formed by landing of the location selected at the location landing step may be further expanded.

26. A motion controlling method for a legged mobile robot according to claim 24, characterized in that
the landing operation of the portion at the landed portion searching step and the target landing point setting step and/or the expansion operation of the support polygon at the support polygon expansion step are performed repetitively.

27. A motion controlling method for a legged mobile robot according to claim 24, characterized in that
said legged mobile robot is formed from a link structure wherein a plurality of substantially parallel joint axes having a joint degree-of-freedom are connected to each other in a lengthwise direction, and
the target landing point setting step sets a location at which a link with which the number of non-landed links is maximized exists as a target.

28. A motion controlling method for a legged mobile robot according to claim 23, characterized in that
said legged mobile robot is formed from a link structure wherein a plurality of substantially parallel joint axes having a joint degree-of-freedom are connected to each other in a lengthwise direction, and
the third step includes the steps of:
searching, when said legged mobile robot returns from its tumbling state, for the narrowest support polygon formed from the least number of links from among landed polygons formed, in an on-floor posture of said legged mobile robot in which two or more links including a gravity center link positioned at the center of gravity of said body are landed on the floor, from the landed links;
taking off the landed links in the landed polygons except those of the searched out support polygon;
bending two or more continuous ones of non-landed links until end portions of the end links land onto the floor to form a narrower landed polygon; and
taking off a number of links greater than a first predetermined number from one end side of said link structure to stand said body uprightly in response to that the support polygon is sufficiently narrow.

29. A motion controlling method for a legged mobile robot according to claim 28, characterized in that,
at the step of searching for the support polygon, a landed link which can be taken off from the floor while a zero moment point remains plannable is extracted.

30. A motion controlling method for a legged mobile robot according to claim 28, characterized in that,
at the step of searching for the support polygon, a narrower support polygon is searched for while keeping the gravity center link in the landed state.

31. A motion controlling method for a legged mobile robot according to claim 28, characterized in that
it is determined at the step of standing said body uprightly whether or not the gravity center link can be taken off from the floor in a state wherein the end portions of the opposite end links of the landed polygon are landed thereby to determine whether or not the support polygon is sufficiently narrow.

32. A motion controlling method for a legged mobile robot according to claim 28, characterized in that,
at the step of standing said body uprightly,
the gravity center link is taken off from the floor in a state wherein the end portions of the opposite end links of the support polygon are landed, and the distance between the end portions of the opposite end links of the support polygon is reduced to move a zero moment point to the other end side of said link structure, and,
in response to that the zero moment point enters a landed polygon formed only from a number of landed links smaller than a second predetermined number from the other end of said link structure, a number of links greater than a first predetermined number from the one end side of said link structure are taken off from the floor while the zero moment point is kept accommodated in the landed polygon to expand the non-landed links in the lengthwise direction.

33. A motion controlling method for a legged mobile robot according to claim 32, characterized in that,
at the step of expanding the non-landed links in the lengthwise direction, a joint degree-of-freedom having a comparatively great mass operation amount is positively used for the operation.

34. A motion controlling method for a legged mobile robot according to claim 28, characterized in that
said link structure includes at least shoulder joint pitch axes, a trunk pitch axis, hip joint pitch axes and knee pitch axes connected to each other in the heightwise direction of said body.

35. A motion controlling method for a legged mobile robot according to claim 34, characterized in that,
at the step of searching for the support polygon, two or more continuous links extending from one end side of said link structure which includes at least the shoulder joint pitch axes are extracted as links which can be taken off from the floor while the zero moment point remains plannable.

36. A motion controlling method for a legged mobile robot according to claim 34, characterized in that,
at the step of searching for the support polygon, a narrower support polygon is searched for while a link which interconnects said trunk pitch axis and said hip joint pitch axes is kept as the gravity center link in the landed state.

37. A motion controlling method for a legged mobile robot according to claim 34, characterized in that,
at the step of forming a narrower landed polygon, the non-landed links are bent around said shoulder joint pitch axes to land the hands which are an end portion of one of the end links onto the floor.

38. A motion controlling method for a legged mobile robot according to claim 37, characterized in that,
where the length of the upper arms is represented by $l_1$, the length of the forehands by $l_2$, the shoulder roll angle by $\alpha$, the elbow pitch angle by $\beta$, the length from the shoulders to the hands by $l_{12}$, the angle defined by a line interconnecting each of the shoulders and a corresponding one of the hands by $\gamma$, and the height of the shoulders by h, each of the arm parts operates so as to satisfy the following expressions:

$$l_{12}=l_1 \cos \alpha + l_2 \sin (\alpha+\beta-90)$$

$$l_{12} \sin \gamma < h.$$

39. A motion controlling method for a legged mobile robot according to claim 34, characterized in that,
at the step of searching for the support polygon, two or more continuous links extending from the other end side of said link structure and including at least said knee joint pitch axes are extracted as the links which can be taken off from the floor while the zero moment point remains plannable.

40. A motion controlling method for a legged mobile robot according to claim 34, characterized in that,
at the step of forming a narrower landed polygon, the non-landed links are bent around said knee joint pitch axes to land the soles which are end portions of the end links of said link structure.

41. A motion controlling method for a legged mobile robot according to claim 34, characterized in that
it is determined at the step of standing said body uprightly whether or not the gravity center link which interconnects said trunk pitch axis and said hip joint pitch axes can be taken off from the floor in a state wherein the hands and the soles as the end portions of the opposite end links of the landed polygon to determine whether or not the support polygon is sufficiently narrow.

42. A motion controlling method for a legged mobile robot according to claim 34, characterized in that,
at the step of standing said body uprightly,
the gravity center link which interconnects said trunk pitch and said hip joint pitch axes is taken off from the floor in a state wherein the hands and the soles as the end portions of the opposite end links of the landed polygon are landed and the distance between the hands and the soles as the end portions of the opposite end links of the landed polygon is reduced in a state wherein the gravity center link is taken off from the floor to move the zero moment point to the soles, and, in response to that the zero moment point enters the landed polygon formed from the soles, the links are taken off from said shoulder pitch axes to said knee pitch axes while the zero moment point is kept accommodated in the landed polygon to expand the non-landed links in the lengthwise direction to stand said body uprightly.

43. A motion controlling method for a legged mobile robot according to claim 42, characterized in that,
at the step of expanding the non-landed links in the lengthwise direction, said knee joint pitch axes having a comparatively great mass operation amount are used positively for the operation.

44. A motion controlling method for a legged mobile robot according to claim 28, characterized in that,
at the step of producing a narrower landed polygon, one of a step changing motion and a dragging motion on the floor of the hand parts or the foot parts is selectively utilized in response to whether it is possible to take off two or more of the links which do not relate to the smallest support polygon from the floor to form a narrower landed polygon.

45. A legged mobile robot which includes movable legs and performs a legged operation in a standing posture thereof, comprising:
external force detection means for detecting application of an external force to a body of said legged mobile robot;
zero moment point trajectory planning means for disposing a zero moment point at which moments applied to said body balance each other on or on the inner side of a side of a support polygon formed from a sole landed point and a floor based on a result of the detection by said external force detection means; and
tumbling motion execution means for executing a tumbling motion of said body in response to that the disposition of the zero moment point in the support polygon by said zero moment point trajectory planning means is rendered difficult or impossible by the external force applied to said body.

46. A legged mobile robot according to claim 45, characterized in that
said external force detection means detects the external force applied to said body using a floor reactive force sensor or an acceleration sensor disposed on each of the soles or an acceleration sensor disposed at a position of the waist of the body.

47. A motion controlling method for a legged mobile robot which includes movable legs and performs a legged operation in a standing posture thereof, comprising:
an external force detection step of detecting application of an external force to a body of said legged mobile robot;
a zero moment point trajectory planning step of disposing a zero moment point at which moments applied to said body balance each other on or on the inner side of a side of a support polygon formed from a sole landed point and a floor based on a result of the detection at the external force detection step; and
a tumbling motion execution step of executing a tumbling motion of said body in response to that the disposition of the zero moment point in the support polygon by said zero moment point trajectory planning means is rendered difficult or impossible by the external force applied to said body.

48. A motion controlling method for a legged mobile robot according to claim 47, characterized in that,
at the external force detection step, the external force applied to said body is detected using a floor reactive force sensor or an acceleration sensor disposed on each of the soles or an acceleration sensor disposed at a position of the waist of the body.

49. A motion controlling apparatus for a legged mobile robot which includes movable legs and performs a legged operation in a standing posture thereof, comprising:
means for calculating an impact moment applied to a body of said legged mobile robot at each stage upon tumbling of said body;
means for calculating an impact force applied to said body from the floor at each stage upon tumbling;
means for calculating an area S of a support polygon formed from a landed point of said body and the floor;
first landed location searching means for selecting a next landed location so that the area S of the support polygon may be minimized or fixed; and
second landed location searching means for selecting a next landed location so that the area S of the support polygon may be increased.

50. A motion controlling apparatus for a legged mobile robot according to claim 49, characterized in that
a tumbling motion of said body is performed by said second landed location searching means if the impact force applied to said body from the floor is within a predetermined tolerance, but a tumbling motion of said body is performed by said first landed location searching means if the impact force is outside the predetermined tolerance.

51. A motion controlling method for a legged mobile robot which includes movable legs and performs a legged operation in a standing posture thereof, comprising:
a step of calculating an impact moment applied to a body of said legged mobile robot at each stage upon tumbling of said body;
a step of calculating an impact force applied to said body from the floor at each stage upon tumbling;
a step of calculating an area S of a support polygon formed from a landed point of said body and the floor;
a first landed location searching step of selecting a next landed location so that the area S of the support polygon may be minimized or fixed; and
a second landed location searching step of selecting a next landed location so that the area S of the support polygon may be increased.

52. A motion controlling method for a legged mobile robot according to claim 51, characterized in that
a tumbling motion of said body is performed by the second landed location searching step if the impact force applied to said body from the floor is within a predetermined tolerance, but a tumbling motion of said body is performed by the first landed location searching step if the impact force is outside the predetermined tolerance.

53. A motion controlling apparatus for controlling a series of motions relating to tumbling and standing up of a body of a legged mobile robot which includes movable legs and performs a legged operation in a standing posture thereof, characterized in that
said legged mobile robot is formed from a link structure wherein a plurality of substantially parallel joint axes having a joint degree-of-freedom are connected to each other in a lengthwise direction, and
said motion controlling apparatus comprises:
means for searching for the narrowest support polygon formed from a minimum number of links from among landed polygons formed from landed links in an on-floor posture wherein two or more links including a gravity center link at which the center of gravity of said body is positioned are landed on a floor upon tumbling of said legged mobile robot;
means for setting a zero moment point at a location at which the number of links which do not relate to the smallest support polygon is maximized to perform a tumbling motion;
means for searching for a link or links which can be taken off from the floor in the tumbling posture of said body; and
means for taking off all of the links which can be taken off from the floor to perform a standing up motion.

54. A motion controlling method for controlling a series of motions relating to tumbling and standing up of a body of a legged mobile robot which includes movable legs and performs a legged operation in a standing posture thereof, characterized in that
said legged mobile robot is formed from a link structure wherein a plurality of substantially parallel joint axes having a joint degree-of-freedom are connected to each other in a lengthwise direction, and
said motion controlling method comprises the steps of:
searching for the narrowest support polygon formed from a minimum number of links from among landed polygons formed from landed links in an on-floor posture wherein two or more links including a gravity center link at which the center of gravity of said body is positioned are landed on a floor upon tumbling of said legged mobile robot;
setting a zero moment point at a location at which the number of links which do not relate to the smallest support polygon is maximized to perform a tumbling motion;
searching for a link or links which can be taken off from the floor in the tumbling posture of said body; and
taking off all of the links which can be taken off from the floor to perform a standing up motion.

55. A robot apparatus having a trunk part, leg parts connected to said trunk part and arm parts connected to said trunk part, comprising:
support polygon detection means for detecting a first support polygon formed from a plurality of end portions of said leg parts, trunk part and/or arm parts at which said leg parts, trunk part and/or arm parts are landed on a floor;
support polygon changing means for bending said leg parts toward said trunk part to reduce the area of the first support polygon;
zero moment point motion controlling means for determining whether or not a zero moment point which is positioned in the changed first support polygon can be moved into a landed polygon formed from the soles of said leg parts; and
control means for moving, when said zero moment point motion controlling means determines that the zero moment point can be moved, the zero moment point from within the first support polygon into the landed polygon formed by the soles and changing the posture of said robot apparatus from a tumbling posture to a basic posture while the zero moment point is maintained within the landed polygon.

56. A robot apparatus which includes at least a body, one or more arm links connected to an upper portion of said body each through a first joint (shoulder), a first leg link connected to a lower portion of said body through a second joint (hip joint), and a second leg link connected to an end of said second leg link through a third joint (knee), comprising:

means for landing ends of said arm links and a foot part at an end of said second leg link to form a first support polygon;

means for moving said second joint upwardly higher than said third joint in a normal direction to the floor while the ends of said arm links and said foot part are kept landed, decreasing the area of the first support polygon and moving a zero moment point into a landed polygon formed from said foot part; and means for standing a body of said robot apparatus uprightly while the zero moment point is kept in the landed polygon formed from said foot part.

* * * * *